(12) United States Patent
Tsuchiya et al.

(10) Patent No.: US 7,535,008 B2
(45) Date of Patent: May 19, 2009

(54) RADIATION IMAGING SYSTEM AND NUCLEAR MEDICINE DIAGNOSIS INSTRUMENT THEREFOR

(75) Inventors: Katsutoshi Tsuchiya, Hitachi (JP); Tsuneaki Kawaguchi, Kashiwa (JP); Yuichi Morimoto, Hitachinaka (JP); Masatoshi Tanaka, Kashiwa (JP); Hiroshi Kitaguchi, Naka (JP); Kazuma Yokoi, Hitachi (JP); Takafumi Ishitsu, Hitachi (JP); Naoki Kubo, Sapporo (JP); Nagara Tamaki, Sapporo (JP)

(73) Assignees: Hitachi, Ltd., Tokyo (JP); National University Corporation Hokkaido University, Sapporo (JP)

( * ) Notice: Subject to any disclaimer, the term of this patent is extended or adjusted under 35 U.S.C. 154(b) by 0 days.

(21) Appl. No.: 11/836,448

(22) Filed: Aug. 9, 2007

(65) Prior Publication Data
US 2008/0078937 A1  Apr. 3, 2008

(30) Foreign Application Priority Data
Sep. 29, 2006  (JP) .............................. 2006-268157

(51) Int. Cl.
*G01T 1/166* (2006.01)
(52) U.S. Cl. .................................... 250/363.1; 250/366
(58) Field of Classification Search .............. 250/363.1, 250/505.1, 366
See application file for complete search history.

(56) References Cited

U.S. PATENT DOCUMENTS

| | | | | |
|---|---|---|---|---|
| 3,107,276 A | * | 10/1963 | Cohen | 348/162 |
| 4,419,585 A | * | 12/1983 | Strauss et al. | 250/505.1 |
| 4,752,691 A | * | 6/1988 | Hawman | 250/363.1 |
| 2004/0200965 A1 | | 10/2004 | Umegaki et al. | |

FOREIGN PATENT DOCUMENTS

| | | |
|---|---|---|
| JP | 9-236667 | 7/1997 |
| JP | 2003-222676 | 8/2003 |
| JP | 2004-317130 | 11/2004 |

OTHER PUBLICATIONS

"Technology of Nuclear Medicine", Japanese Society of Radiological Technology, Apr. 30, 2002, ohm, Ltd.

* cited by examiner

*Primary Examiner*—Constantine Hannaher
(74) *Attorney, Agent, or Firm*—Mattingly & Malur, PC

(57) ABSTRACT

A radiation imaging system is configured by a collimator 30A including a detector 21 with a discrete detection pixel corresponding with a pixel and a plurality of radiation passages 31 and looks into a plurality of detectors 21 through one radiation passage 31 to set a step width of rotation around a rotation center axis X1 only for an angle θp made by lines provided by connecting a center detector 21 of the radiation passage 31 and the adjacent two detectors 21. In the case of generating a flat plane projection image for one direction, radio-graphing is carried out on a projection image in a plurality of predetermined angle positions (−θp, 0, +θp) in the circumferential direction of the rotation center axis X1 and thereby one plane projection image is obtained.

21 Claims, 31 Drawing Sheets

RADIATION IMAGING SYSTEM AND NUCLEAR MEDICINE DIAGNOSIS INSTRUMENT THEREFOR

BACKGROUND OF THE INVENTION (1) Field of the Invention

The present invention relates to a radiation imaging system which takes in incident radiation distribution and a nuclear medicine diagnosis instrument therefor and, in particular, relates to radio-graphing middle and high energy γ rays.

(2) Description of related art

As a radiation measuring apparatus applied in the medical field, a nuclear medicine diagnosis instrument such as a γ camera apparatus and a Single Photon Emission Computed Tomography (SPECT) apparatus is used. Those apparatuses are systems consisting of a detector which detects γ rays and a collimator which regulates the direction of the γ rays entering the detector. For the detector used in those apparatuses, a scintillator and a photomultiplier tube are nearly always combined together. A scintillator used in those apparatuses is generally a sheet of large crystal. An NaI (Tl) scintillator is widely used for a gamma camera apparatus and a SPECT apparatus. A scintillator emits light in response to incident radiations and amplifies those faint lights with a plurality of photomultiplier tubes to detect the radiations. Determination on detection positions of radiations is carried out by implementing arithmetic operations on the center of gravity from output signals of a plurality of photomultiplier tubes. That is, a scintillator is a measuring apparatus having positional analogue output. A scintillator has thickness around 9 mm to 15 mm. Due to scintillation light distribution as a result of reaction of the incident γ rays and statistical dispersion due to the arithmetic operation on the center of gravity with a photomultiplier tube, space resolution (intrinsic resolution) of the detector itself is limited to approximately 3 mm.

On the other hand, in the recent years, a γ camera ("Technology of Nuclear Medicine", pp. 79-80, Japanese Society of Radiological Technology, Apr. 30, 2002, Ohm, Ltd.) with a CSI (Tl) scintillator of a discrete detection pixel unit corresponding with an image pixel or so-called pixel type and with photodiodes and a pixel type semiconductor detector ("Technology of Nuclear Medicine", pp. 76-77, Japanese Society of Radiological Technology, Apr. 30, 2002, Ohm, Ltd.) capable of directly converting radiations into electrical signals and the like, that is, a nuclear medicine diagnosis instrument having positional digital outputs is being developed. A semiconductor detector with width of 1.4 mm configuring one detection pixel is also being developed. The width can be approximately 1 mm as the value corresponding to intrinsic resolution.

As a collimator, a parallel porous (parallel hole) collimator with a great number of elongated radiation passages arrayed in parallel to allow only incident γ rays perpendicular to the detector plane to pass and to obtain projection of a radio-graphed object.

In those gamma camera apparatuses and those SPECT apparatuses the shape of a collimator and thickness of a detector to be required are different depending on energy of γ-ray to be radio-graphed. For the parallel hole collimators for low energy γ-ray radio-graphing for $^{99m}$Tc (140 keV) being γ-ray source used for general purposes, the hole diameter of the aperture passing γ rays is around 1 to 2 mm; a septum between radiation passages restraining incident components of γ rays into the adjacent radiation passage is thin with around 0.2 to 0.3 mm and length of the radiation passage is around 30 to 50 mm.

On the other hand, middle and high energy γ rays from a γ-ray source in the intensity of $^{67}$Ga (300 keV) and $^{131}$I (367 keV) provides significant γ-ray penetrating power. Therefore, thickness of a septum is required to be 1 to 2 mm for restraining penetration of incident γ rays to the adjacent radiation passage. In addition, in order to compensate sensitivity reduction due to decrease in the area of an opening of the collimator, the hole diameter of the aperture is set larger to the level of 4 mm. In addition, length of depth in the direction of the incident γ rays of the detector is desired to be made thick compared with that for low energy γ rays for attaining sufficient detection sensitivity. A generally-purposed NaI scintillator detector for low energy γ rays with 10-mm thickness and a one for high energy γ rays with 20-mm thickness are used.

Comparing a high resolution parallel hole collimator [LEHR collimator (LEHR: Low Energy High Resolution)] for low energy γ rays with a generally-purposed parallel hole collimator [HEGP collimator (HEGP: High Energy-General Purpose)] for middle and high energy γ rays, the hole shape of the aperture of the collimator is hexagon in the both cases. However, the HEGP collimator is extremely thicker than the LEHR collimator in septum, larger than the LEHR collimator in hole diameter and longer than the LEHR collimator in length of depth of detector. As for high energy γ-ray radio-graphing, length of depth of the detector gets longer. Therefore, intrinsic resolution of the detector itself gets worse. In addition, the hole diameter of the aperture of the collimator is wide. Therefore a point source is wider than the LEHR collimator in radio-graphing distribution to deteriorate space resolution significantly.

On the other hand, radio-graphing distribution of a volume source is expressed as overlapping of a set of point source response function of each aperture and is obtained as approximately uniform shape in a LEHR collimator. However, in the a HEGP collimator, the shadows of septa appear on the radio-graphing distribution and give rise to decrease in picture quality to constitute a critical obstacle for diagnostic imaging. In addition, the thick septum causes decrease in aperture of the collimator to drop sensitivity.

The problem of such parallel hole collimator is that the holes are essentially tightly arranged and septum thickness is required in order to collimate the incident γ rays. Since septum thickness is thin for γ-ray radio-graphing with the low energy, influence on space resolution falls within an ignorable range. But for γ-ray radio-graphing with high energy, the problems of that system become apparent, making application of the collimator difficult.

A pinhole collimator is a collimator not influenced by such septum thickness. An object of a pinhole collimator is to obtain high space resolution by enlarging radio-graphing. However, there are problems that a pinhole collimator is narrower than parallel hole collimator in radio-graphing view range; resolution is deteriorated in the periphery of view range to deform an image; and sensitivity is not good. The radio-graphing view range is determined by a range viewable from the detector plane through the holes in the aperture (viewing angle). The smaller viewing angle makes the view range narrower. In the case of radio-graphing a point source, the more obliquely enters the incident γ rays, the longer gets distance crossing the detector; and the wider becomes the radio-graphing distribution in the periphery of the radio-graphing view range. In order to reduce deformation in the periphery of radio-graphing view range due to oblique entrance into the detector, it is necessary to limit the aperture angle of the hole. Therefore, distance from the detector to the hole gets longer than in the case of the parallel collimator. The hole diameter of the hole is small and the distance is long.

Therefore, in a lot of cases, the pinhole collimator is less intensified than the parallel collimator in sensitivity.

In the case of using the pinhole collimator in γ-ray radiographing with high energy, an increase in length of depth in the γ-ray incident direction of the detector intensifies deformation more in the periphery of the radio-graphing view range. Therefore, in order to improve that, the aperture angle in the collimator aperture is squeezed more to make distance between the aperture and the detector longer, resulting in the radio-graphing view range getting much smaller to decrease sensitivity. Moreover, in the case where the shape of a longitudinal section of the aperture is a knife edge shape, high-energy γ-ray penetration takes place in the portion where shielding gets weak in the periphery of the aperture; and the effective hole diameter gets larger than the physical hole diameter of the aperture. It is difficult to obtain desired high resolution even if enlargement in radio-graphing is carried out. That will squeeze the aperture angle as well to lengthen distance between the detector and the aperture to reduce sensitivity more.

In view of the above described problems, a subject of the present invention is to solve such problems and an object hereof is to provide a radiation imaging system, which is not influenced by a hole diameter of a collimator such as the above described conventional parallel hole collimator and septum thickness but has a view approximately equivalent to the size of the detector group and excellent resolution and sensitivity approximately equivalent to low energy γ-ray radio-graphing in middle and high energy γ-ray radio-graphing, and a nuclear medicine diagnosis instrument therefor.

BRIEF SUMMARY OF THE INVENTION

In order to solve the above described problems, the present invention is a radiation imaging system comprising a camera part capable of rotating around a first rotation center axis as a center, the camera part including a collimator in which a plurality of radiation passages are formed on its incident plane side; and a plurality of radiation detectors for detecting radiations passing through the radiation passage for the respective radiation passages, wherein the radiation passage of the collimator has an aperture section on the incident plane side of the radiation is narrowed down so that the section toward the radiation detector side is shaped to get broadened; the radiation detectors of a predetermined size are arranged in plurality in a rotation direction relative to the respective radiation passages; and the camera part carries out radio-graphing in a plurality of angle positions for the first rotation center axis set corresponding with the size of the radiation detector in the rotation direction at an occasion of radio-graphing a projection image from one direction.

In addition, a nuclear medicine diagnosis instrument with the radiation imaging system comprises a data processing apparatus for processing and imaging radiation detection signals, wherein the data processing apparatus uses a plurality of data sets radio-graphed in a plurality of angle positions for the first rotation center axis in the process of imaging the projection image from one direction.

According to the present invention, a radiation imaging system which is nearly as excellent as a low-energy γ-ray radio-graphing in resolution and sensitivity for high-energy γ-ray radio-graphing and a nuclear medicine diagnosis instrument therefor can be provided.

Other objects, features and advantages of the invention will become apparent from the following description of the embodiments of the invention taken in conjunction with the accompanying drawings.

DETAILED DESCRIPTION OF THE INVENTION

Embodiments of the present invention will be described below. The present invention is especially effective in a gamma camera and a SPECT apparatus. At first, a method of use as a gamma camera and, subsequently, a method of use as a SPECT apparatus will be described. A first embodiment and a second embodiment illustrate configuration examples with respectively different collimators using the principle of the present invention and describe an application as a gamma camera. A third embodiment describes an application for a method of radio-graphing with a SPECT apparatus exploiting the properties of the collimator of the present invention to the maximum extent. A fourth embodiment describes low-energy γ-ray radio-graphing. A fifth embodiment describes a variation on the structure of the collimator of the present invention.

First Embodiment

Next, a gamma camera apparatus being a nuclear medicine diagnosis instrument according to the first embodiment of the present invention will be described with reference to FIG. 1 and FIG. 2 and subsequently a SPECT apparatus will be described.

Figure 1:
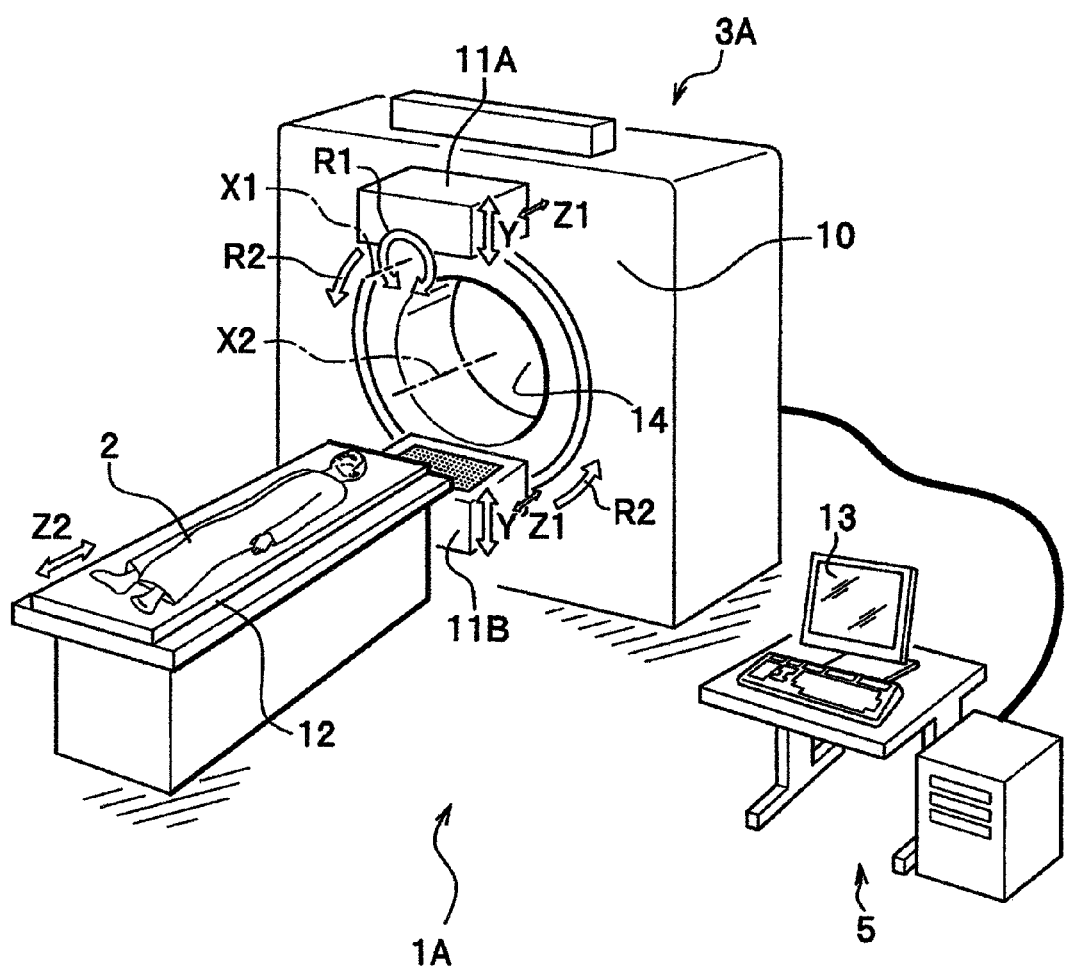
FIG. 1 is an entire perspective view illustrating a nuclear medicine diagnosis instrument (gamma camera apparatus) according to a first embodiment of the present invention.

As illustrated in FIG. 1, a nuclear medicine diagnosis instrument 1A is configured to include a radiation imaging system 3A, a data processing apparatus 5 and a bed 12 carrying a subject 2. The radiation imaging system 3A is configured by including a gantry 10 and a camera part 11 (11A and 11B in the drawing) retained by the gantry 10. Hereinafter, as far as nothing is stipulated in advance, the camera parts 11A and 11B will be referred to as the camera part 11.

The camera part 11 includes a rotation center axis X1 (first rotation center axis) which is parallel to the body axis of the subject 2 and perpendicular to the axis passing through the center (the center of the view) of the incident plane for the camera part 11 and perpendicular to the incident plane in a portion retained by the gantry 10. The camera part 11 is capable of rotating in the direction designated by an arrow R1 and is capable of rotating (orbiting) around the above described aperture 14 as designated by an arrow R2 around a rotation center axis X2 (second rotation center axis) of a cylindrical aperture 14 in the center portion of the gantry 10 as a center of rotation. FIG. 1 illustrates the rotation center axis X1 and the arrow R1 designating the rotation direction only for the camera part 11A. However, the camera part 11B is likewise. Moreover, the camera part 11 is movable as designated by an arrow Y inward and outward along the radius direction of the rotation center axis X2 and is movable in the direction of the rotation center axis X1 (body axis direction of the subject 2) as designated by an arrow Z1 only by a predetermined distance.

In addition, in FIG. 1, the camera parts 11A and 11B are arranged so as to face to make 180° with each other and are retained by the gantry 10 but can be arranged to make 90°, for example, with each other within a range so as not to interfere with each other. The camera parts 11A and 11B can also be arranged to make a line in a planar state.

A base of the bed 12 illustrated in FIG. 1 is set so that the body axis of the subject 2 corresponds approximately with the above described rotation center axis X2. The base includes a built-in drive mechanism not illustrated in the drawing capable of driving the bed 12 to thereby slide the subject 2 in the direction of the body axis as designated by an arrow Z2. The bed 12 can be set in any position in the body axis direction within the aperture 14 of the gantry 10.

The data processing apparatus 5 is configured by including a display apparatus 13, a memory part not illustrated in the drawing, image processing part and the like. An image processing part of the data processing apparatus 5 takes in radiation detection signals of the radiation detector (hereinafter to be referred to briefly as detector) 21 (see FIG. 2) of the camera part 11 together with ID information signals of the detector 21; takes in the angular position signals around the rotation center axis X1 of the camera part 11; takes in the angular position signals around the rotation center axis X2 of the respective camera parts 11A and 11B of the camera part 11; carries out imaging processing; generating a plane projection image; displays the image on the display apparatus 13; and stores the image in the memory part.

Radiation pharmaceutical, for example, pharmaceutical containing $^{99m}$Tc with a half-life of 6 hours, is administered to the subject 2, who is then placed on the bed 12. γ rays discharged from the $^{99m}$Tc inside the body undergo radio-graphing with the camera part 11 retained in the gantry 10.

Figure 2:
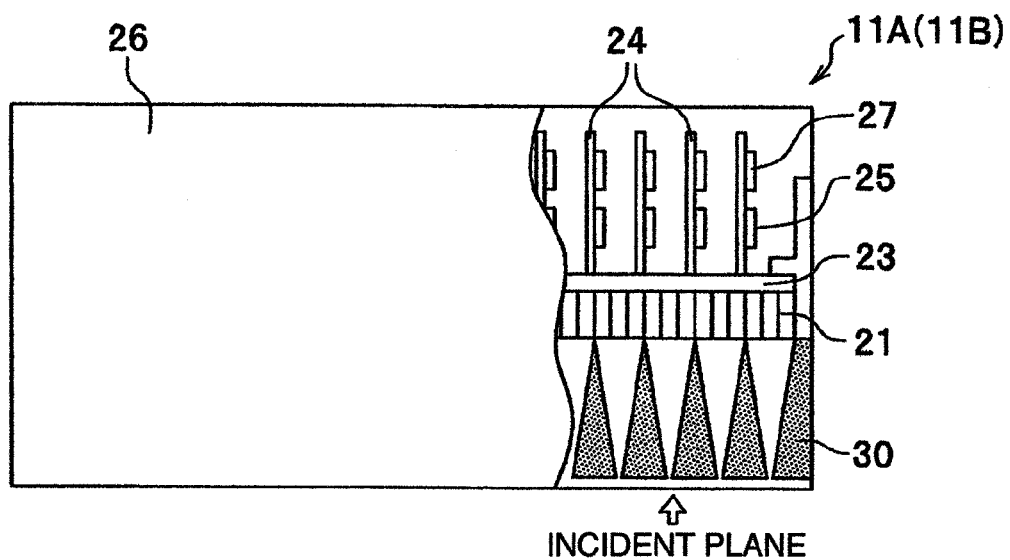
FIG. 2 is a partial section illustrating a camera part of a radiation imaging system.

As described in FIG. 2, the camera part 11 (camera parts 11A and 11B in FIG. 2) includes a collimator 30 and a great number of detectors 21 in a built-in manner. The collimator 30 selects γ rays entering the incident plane of the collimator 30 by allowing only γ rays in a certain direction among γ rays discharged from the body interior of the subject 2 to pass. The γ rays having passed the collimator 30 are detected by a great number of detectors 21 arranged in a flat plane on a detector substrate 23. The camera part 11 is provided with an ASIC substrates 24 on which an integrated circuit (ASIC) 25 for signal-processing γ ray detection signals from the detector 21 and an FPGA (Field Programmable Gate array) 27 and the like are mounted. The γ ray detection signals travels through the detector substrates 23 and the ASIC substrates 24, the ASIC 25 and the FPGA 27 measure crest values and detection time points of the γ ray detection signals and output the digital information thereof and the ID information of the detector 21 that has detected γ rays to the data processing apparatus 5. Those collimators 30, the detector substrate 23 and the ASIC substrates 24 are covered by a shield enclosure 26 made of steel, lead and the like, for example, except the incident plane of the collimator 30 and are shielded from light, γ rays and electromagnetic waves. The incident plane is covered by metal plate member made of aluminum and the like apt to allow γ rays to penetrate and is shielded from light and electromagnetic waves.

In FIG. 2, the collimator 30 is illustrated in a collective manner. However, in the coming description, the collimator 30 will be described under different reference numeral based on the difference in shape.

Next, the shape of the collimator 30 being a feature of the present embodiment and the arrangement of the detectors 21 will be described in detail. At first, the detector 21 in the present embodiment will be described.

(Radiation Detector)

Figure 3:
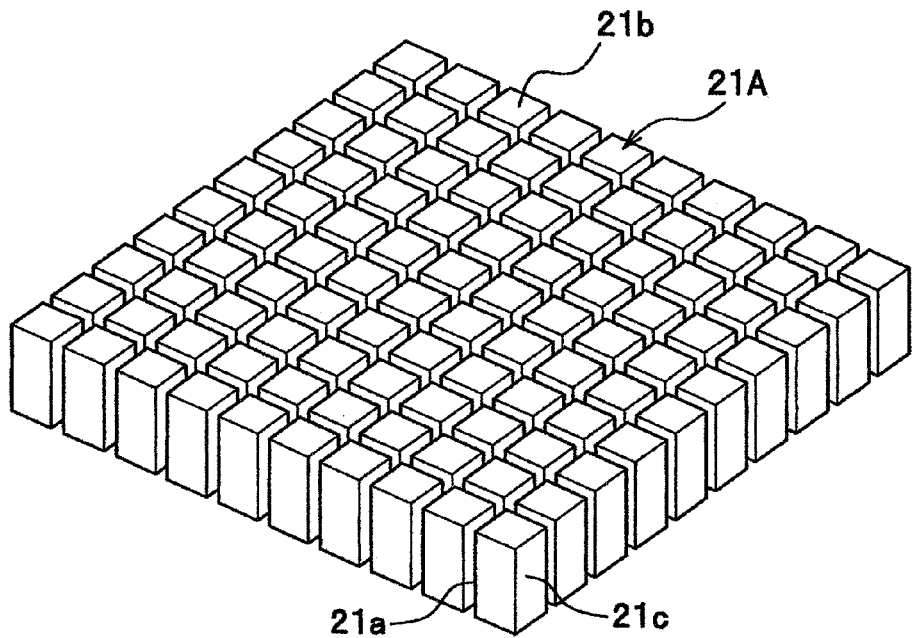
FIG. 3 is a perspective view illustrating a semiconductor radiation detector of a pixel type.

An example of the detector 21 used in the camera part 11 will be described with reference to FIG. 3 to FIG. 7 (appropriately with reference to FIG. 2). For example, FIG. 3 illustrates the case where semiconductor radiation detectors 21A with CdTe semiconductor on a detector substrate 23 (see FIG. 2) are two-dimensionally arranged so that the individual semiconductor radiation detector 21A configures one detection pixel. In FIG. 3, the upper plane side is an incident plane 21b of the semiconductor radiation detector 21A and electrodes 21a and 21c applying voltage are arranged on the side planes. Accordingly, unlike a scintillator made of a sheet of large crystal, detection signals from the semiconductor radiation detector 21A are collected on a detection pixel basis corresponding with image pixels.

Figure 4:
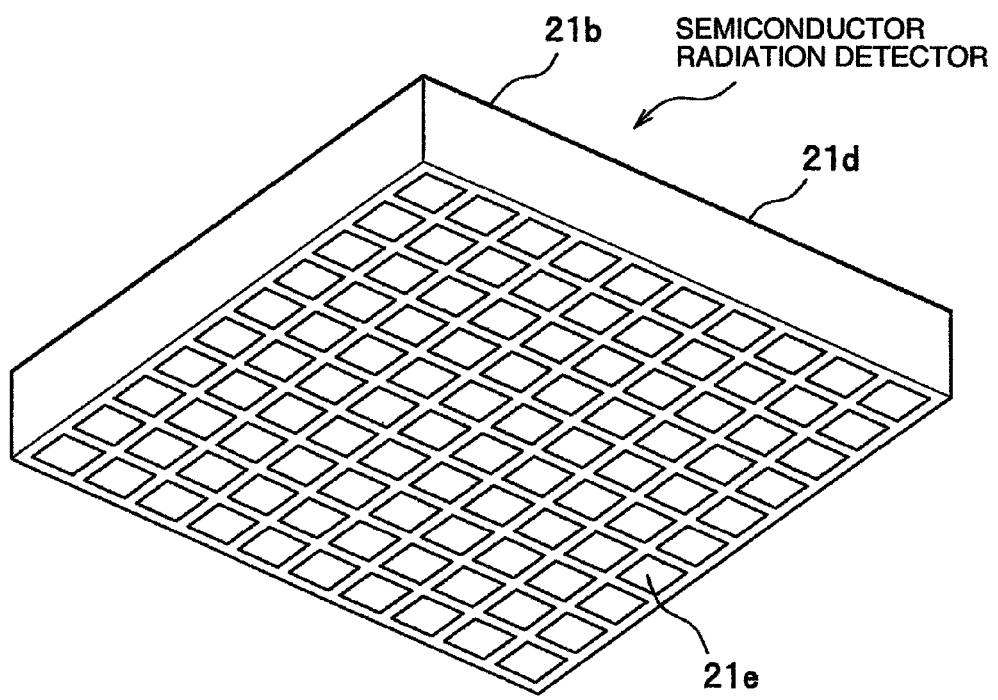
FIG. 4 is a perspective view illustrating a semiconductor radiation detector of a pixel type.

As illustrated in FIG. 4, in the detector 21, a common electrode 21d can be arranged on one plane of CdTe semiconductor substrate, that is, the entire plane on the side of the incident plane 21b for one CdTe semiconductor substrate; one electrode 21e for each detection pixel can be arranged on the opposite plane of the incident plane 21b and; thereby, the semiconductor radiation detector 21B can be configured by CdTe semiconductor substrate in the portion of area equivalent to a unit of the electrode 21e and the common electrode 21d to respectively correspond with the each of the detection pixels. The γ rays pass the electrode 21d on the side of the incident plane 21b of the semiconductor radiation detector 21B, loses its energy in the CdTe semiconductor layer so that the semiconductor radiation detector 21B will generate a detection signal.

Figure 5A:
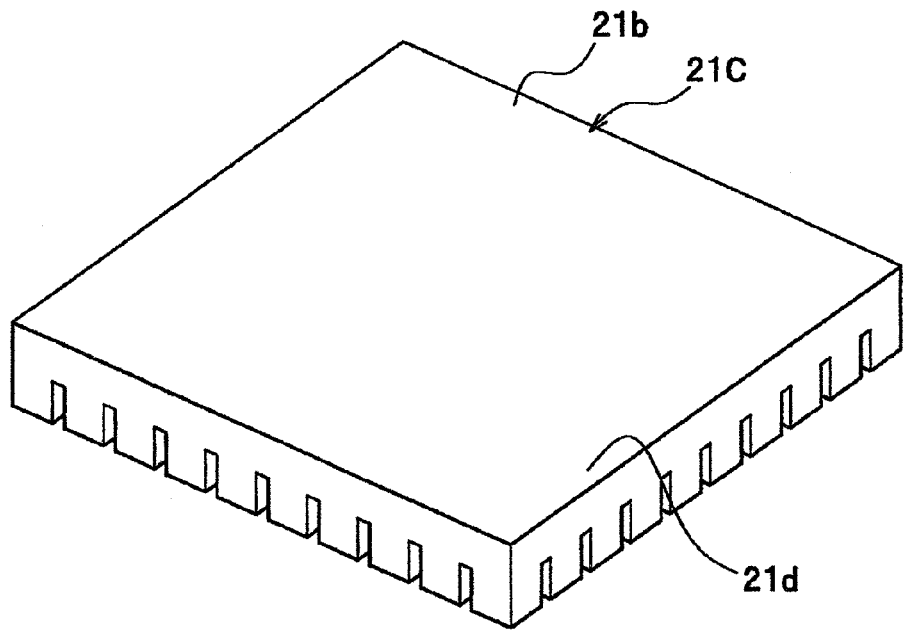
FIG. 5A is a perspective view illustrating an incident plane side of a semiconductor radiation detector of a pixel type.
Figure 5B:
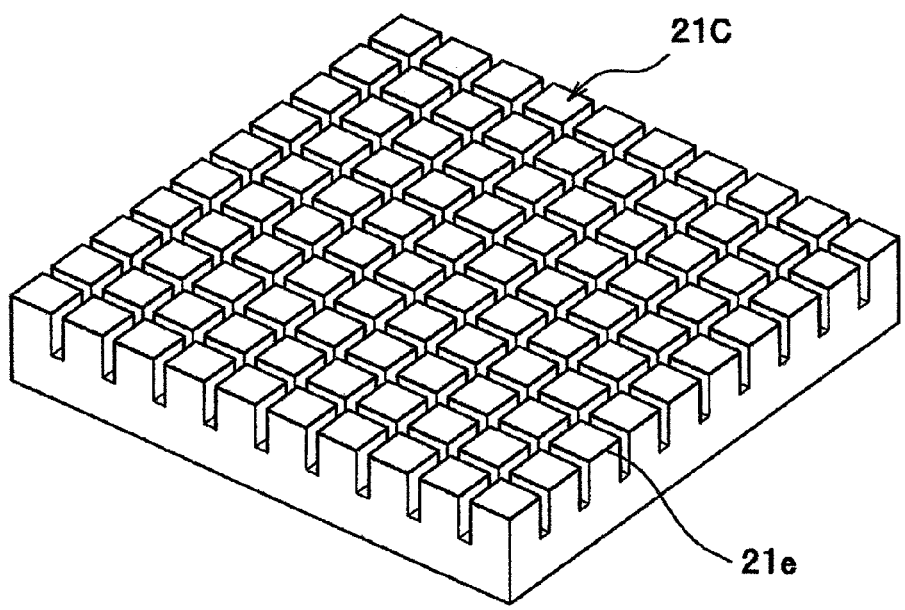
FIG. 5B is a perspective view illustrating the opposite plane of the incident plane side of the semiconductor radiation detector of the pixel type.

Next, a variation of the semiconductor radiation detector 21B illustrated in FIG. 4 will be described in FIG. 5 and FIG. 6. In structure, a semiconductor radiation detector 21C illustrated in FIG. 5 is sectioned with grooves formed by dicing a sheet of CdTe semiconductor substrate into individual semiconductor radiation detector 21C. FIG. 5A is a perspective view with the incident plane 21b being an upper side and FIG. 5B is a perspective view with the opposite side of the incident plane 21b being an upper side. A common electrode 21d is arranged on a sheet of CdTe semiconductor substrate across the side of the sheet on the incident plane 21b, one electrode 21e for each detection pixel is arranged on the opposite plane against the incident plane 221b of the CdTe semiconductor substrate.

Figure 6:
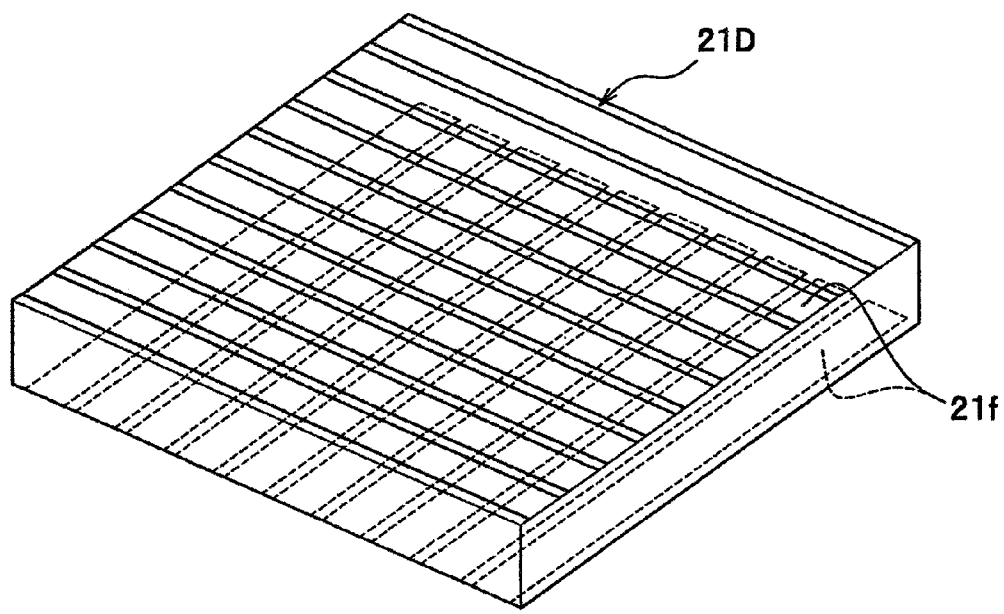
FIG. 6 is a perspective view illustrating a semiconductor radiation detector of a pixel type.

A semiconductor radiation detector 21D illustrated in FIG. 6 includes a plurality of belt electrodes 21f arranged to skew on the upper plane and the lower plane of the substrate of the CdTe semiconductor by right angle in the opposite positions for a sheet of CdTe semiconductor. The belt electrodes 21f on any of the upper plane and the lower plane are the anode and, then those on the other plane are the cathode. The portion, where the anode electrode 21f and the cathode electrode 21c cross, forms one semiconductor radiation detector 21D (see JP-A-2004-125757).

Figure 7:
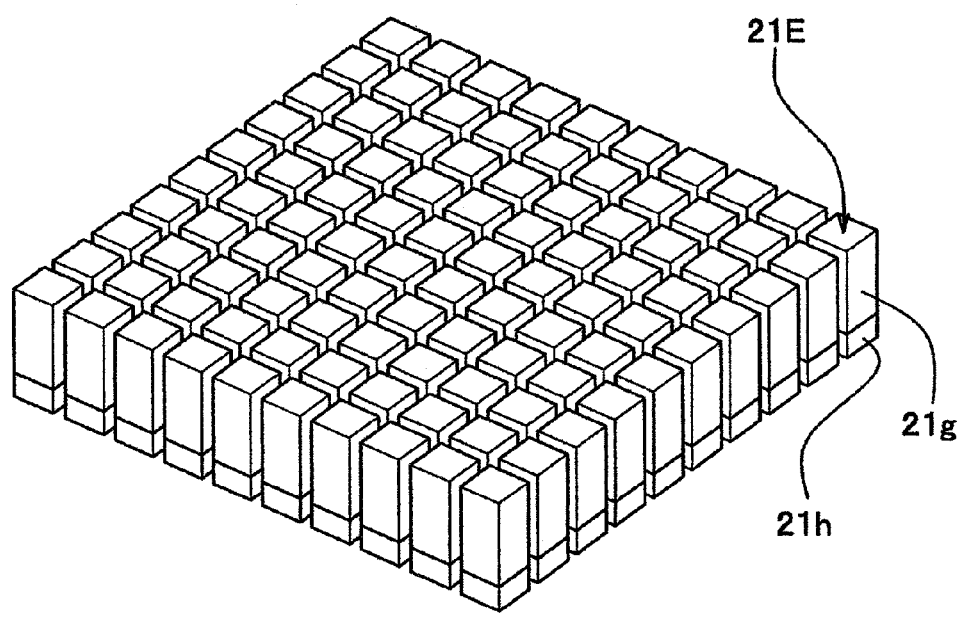
FIG. 7 is a perspective view illustrating a scintillator detector of a pixel type.

In addition, as illustrated in FIG. 7, the structure of the detector 21 can be a scintillator detector 21E configured by sections of detection pixel unit including a scintillator 21d and a photodiode 21e. In that case, the side plane of the individual scintillator 21d is surrounded with shielding material not illustrated in the drawing. In addition, as a variation, the scintillator detector 21E in FIG. 7 can be configured by a scintillator 21d sectioned for each detection pixel and a Position-Sensitive Photomultiplier Tube (PSPMT).

(Collimator)

Next, a collimator 30A featured in the present embodiment will be described with reference to FIG. 8 to FIG. 10.

Figure 8A:
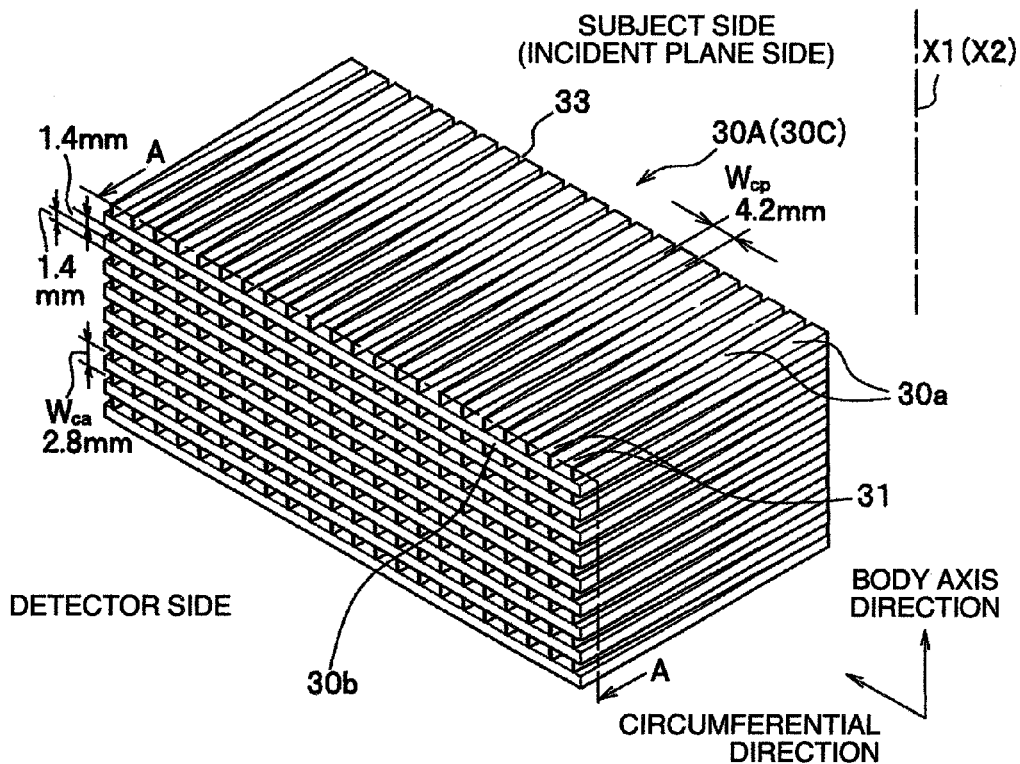
FIG. 8A illustrates structure of a collimator, and is a partial perspective view illustrating a radiation passage of the collimator.

As illustrated in FIG. 8A, the collimator 30A includes a great number of radiation passages 31 and the septum thereof is configured by collimator members 30a and 30b. The collimator 30A has the collimator member 30a arranged in a shape including a great number of radiation passages 31 including a plurality of detection pixels as in the pinhole collimator in the circumferential direction (the circumferential direction of the body axis of the subject 2) of the rotation center axis X1 and has the collimator member 30b arranged in the direction of the rotation center axis X1 (the body axis direction of the subject 2) as in the case of a parallel hole collimator.

A "body axis direction" used for describing the size unit on the collimator 30A and the detector 21 designates the body axis direction of the examined body 2. A "circumferential direction" designates the direction around the body axis of the subject 2 without being specified otherwise.

The sectional shape of the radiation passage 31 is rectangular in conformity with the shape of the detection pixel. Accordingly, the side of rectangular section of the individual radiation passage 31 in the direction of the rotation center axis X1 (the body axis direction of the subject 2) has constant length along the radiation passage 31. The side in the circumferential direction is broadened toward the end in the shape of a fan toward the side of the detector 21 with the section of the aperture (collimator hole) 33 on the incident plane side being narrowed down along the radiation passage 31.

In the collimator member 30a configuring the sectional shape of such a radiation passage 31, the section in view in the direction of the rotation center axis X1 is shaped similar to approximately an isosceles triangle with the apex angle being a small sharp angle with the apex being the side of the detector 21 and the incident plane side being the bottom side. Thickness in the body axis direction is a predetermined value, for example, 1.4 mm thickness being the same as the detector width Wa to be described later. The collimator 30A is configured by the collimator member 30a being arrayed in the circumferential direction in a predetermined pitch Wcp, for example, a 4.2 mm pitch intermediated by the plate-like collimator member 30b with predetermined thickness, for example, 1.4 mm thickness so that the collimator member 30a and the collimator member 30b are stacked in the body axis direction alternately. That is, the collimator member 30a is arrayed in the body axis direction in a pitch Wca, for example, 2.8 mm.

Figure 8B:
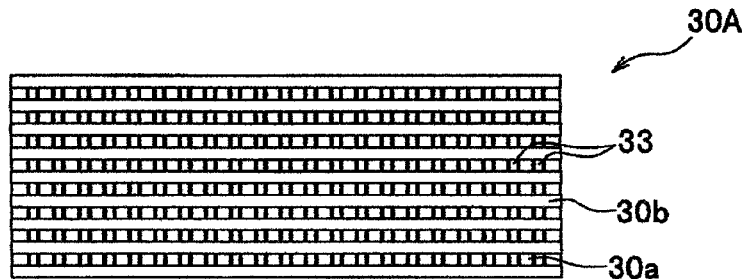
FIG. 8B illustrates structure of the collimator, and is a diagram illustrating a hole shape of an incident plane side.
Figure 8C:
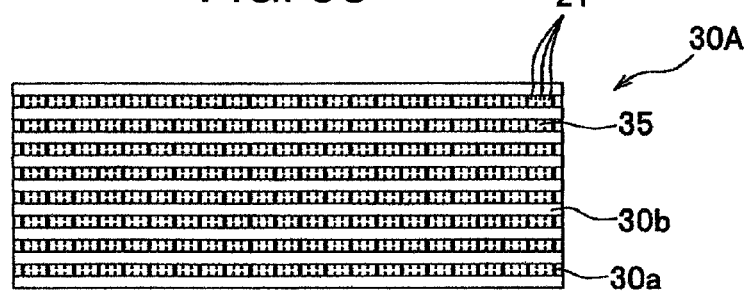
FIG. 8C illustrates structure of the collimator, and a diagram illustrating a detector arrangement along the A-A arrows in FIG. 8A.

As illustrated in FIG. 8B, the hole geometry of the aperture 33 in view from the incident plane side of the collimator 30A is rectangular with narrow width in the circumferential direction. As in FIG. 8C illustrating FIG. 8A in section along A-A arrowed plane, the aperture 35 on the side of the detector 21 of one radiation passage 31 and the detectors 21 are in an arrangement relation to arrange three detectors 21 per array in the circumferential direction (a plurality of detectors with a predetermined size are arranged in the rotation direction).

Next, an example of a detailed measurement in the section in the radius direction of the body axis of the collimator 30A will be described with reference to FIG. 9 and FIG. 10.

Here, the detector 21 is any of the semiconductor radiation detectors 21A, 21B and 21C with CdTe semiconductor. As for the outside dimension thereof, the respective detector width Wa (not illustrated in the drawing) and Wp in the body axis direction and the circumferential direction are both 1.4 mm, for example, and the depth length D is 10 mm, for example. The detector effective center $P_D$ for absorption of the incident γ rays is hypothecated inside the depth length D of the detector 21. Strictly speaking, that detector effective center $P_D$ is biased to the incident plane side of the collimator 30A than the center position of the depth length D due to attenuation effect with γ-ray absorption in the depth direction of the detector 21.

Here, the narrowest portion of the hole of the aperture 33 of the collimator 30A is the collimator hole center Pc. The plane where the collimator hole centers Pc are arrayed corresponds with the aperture plane of the present invention in the collimator 30A. In addition, the plane where the detector effective centers $P_D$ are arrayed corresponds with the array plane of the radiation detector of the present invention in the collimator 30A.

In the position of the collimator hole center Pc, the hole width Dcp in the circumferential direction of the aperture 33 is 1.2 mm and the hole width Dca (not illustrated in the drawing) in the body axis direction is 1.4 mm. In order to emphasize improvement in resolution of the tomographic image in the SPECT imaging to be described later, the hole width Dcp is smaller than the hole width Dca and even can be the same as the hole width Dca, that is, 1.4 mm.

In addition, distance L between the rotation center axis X1 and the collimator hole center Pc is 100 mm, for example. Distance Lc between the collimator hole center Pc and the detector effective center $P_D$ is 50 mm, for example.

Figure 9A:
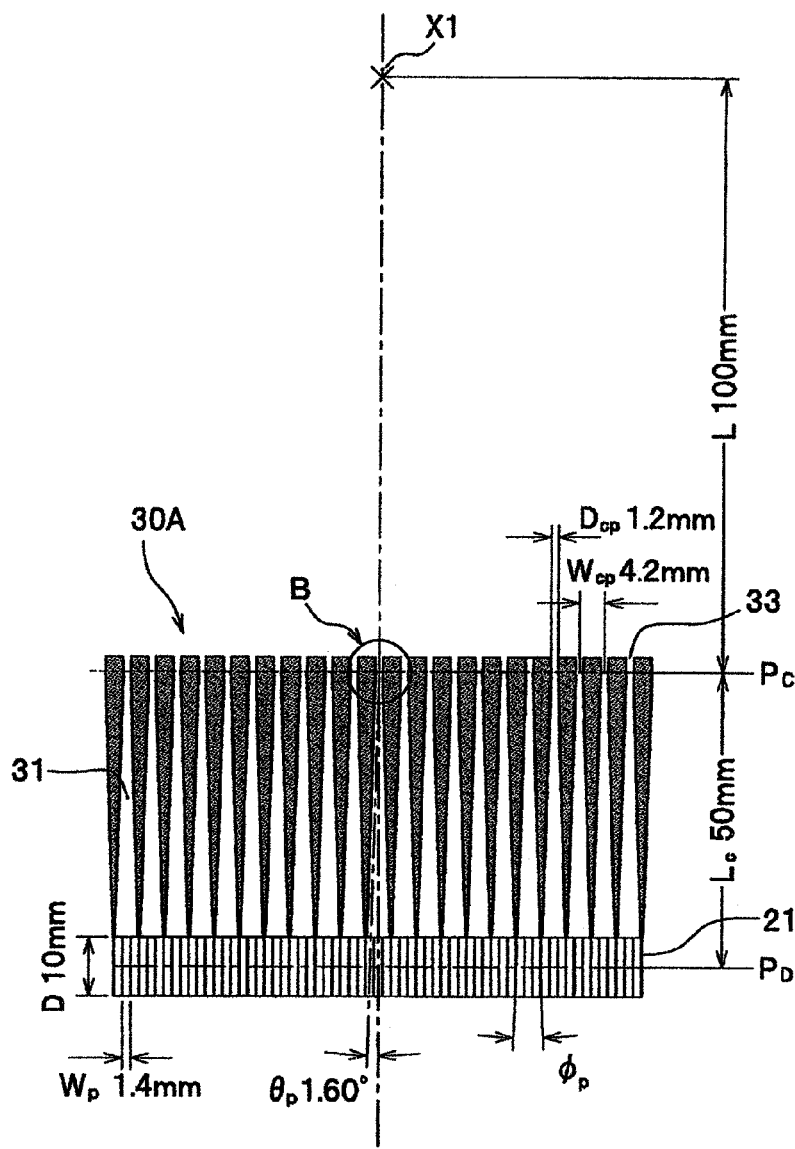
FIG. 9A is a section illustrating arrangement of radiation passages and detectors of a collimator in the circumferential direction.
Figures 10A, 10B, 10C, 10D:
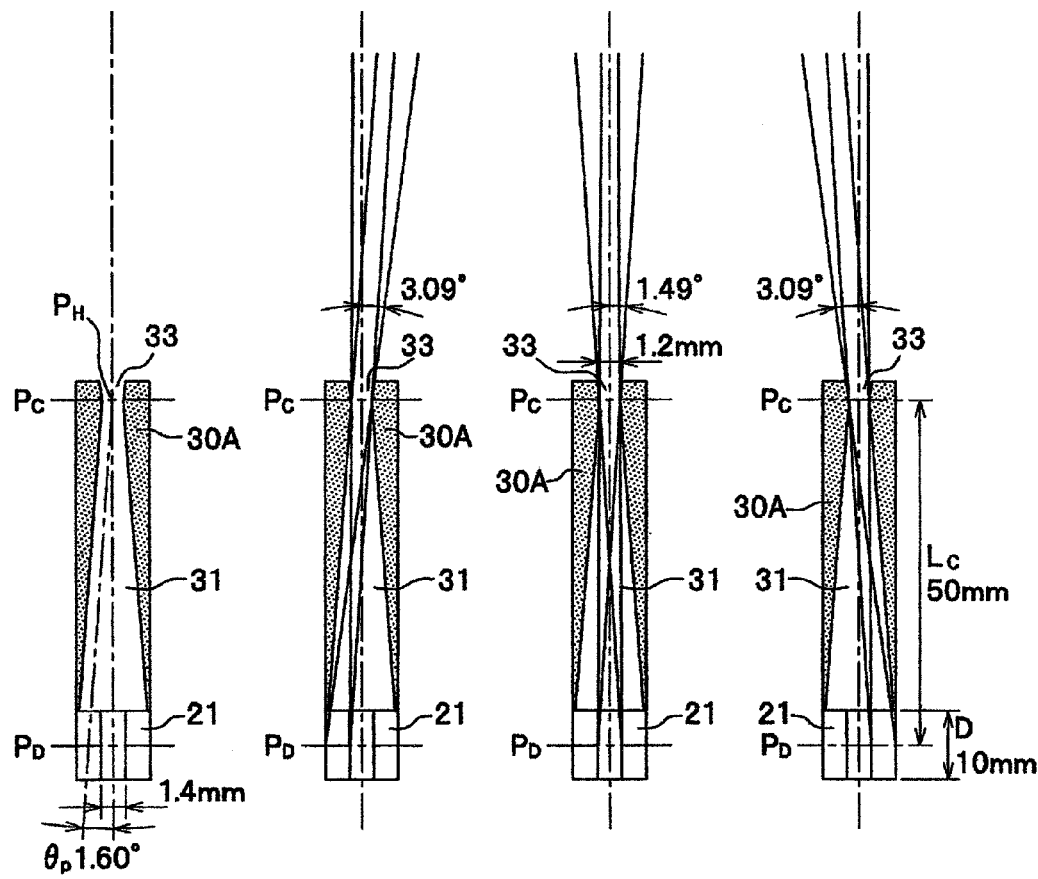
FIG. 10A is an enlarged section of one radiation passage of a collimator in the circumferential direction, and is a diagram describing an angle θp.
FIG. 10B is an enlarged section of one radiation passage of a collimator in the circumferential direction, and is a diagram describing a viewing angle of three detectors included in the radiation passage.
FIG. 10C is an enlarged section of one radiation passage of a collimator in the circumferential direction, and is a diagram describing a viewing angle of three detectors included in the radiation passage.
FIG. 10D is an enlarged section of one radiation passage of a collimator in the circumferential direction, and is a diagram describing a viewing angle of three detectors included in the radiation passage.
Figure 10E:
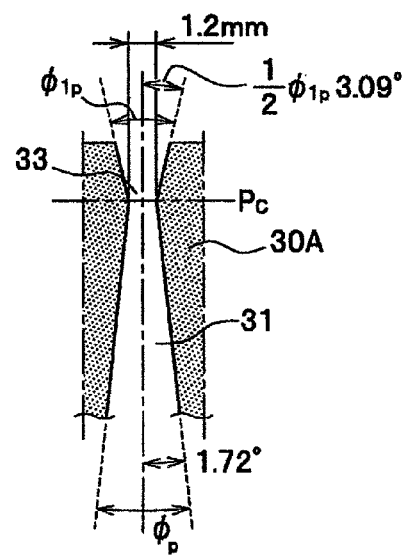
FIG. 10E is an enlarged section of one radiation passage of a collimator in the circumferential direction, and is a diagram describing aperture angles on the incident plane side and the detector side of an aperture of the radiation passage.

FIG. 10E illustrates an enlarged B part of FIG. 9A. A half value of the aperture angle $\phi_{1P}$ in the circumferential direction (rotation direction) on the incident plane side of the aperture 33 is 3.09°. A half value of the aperture angle φp in the circumferential direction on the side of the detector 21 is 1.72°. The collimator 30A is a parallel collimator in the body axis direction. Therefore, the aperture angle $\phi_{1a}$ (not illustrated in the drawing) in the body axis direction on the incident plane side of the aperture 33 and the aperture angle φa (not illustrated in the drawing) in the body axis direction on the side of the detector 21 are 0° respectively. Respective setting on the hole width Dcp, the aperture angle $\phi_{1P}$, φp of such an aperture 33, width Wp (a predetermined size) of the detector 21, distance Lc between the collimator hole center Pc and the detector effective center $P_D$ is made so as to make a viewing angle illustrated in FIG. 10A to FIG. 10D. The concept of setting on the aperture angles $\phi_{1P}$ and φp will be described later.

The aperture 33 has an aperture angle $\phi_P$ in the circumferential direction on the side of the detector 21 and an aperture angle $\phi_{1P}$ in the circumferential direction on the incident plane side around the collimator hole center Pc. In order to provide a common sensitivity distribution of γ rays entering the incident plane of the camera part 11 at various angles, the incident plane side is different from the detector side in the aperture angle $\phi_{1P}$ and the aperture angle φp. The number of the detectors 21 looking through one radiation passage 31 can be more than three units as illustrated in FIG. 9 if the aperture angle φp is an angle equal to or smaller than the angle level obtained with the following expression with the detector width Wp and the detector depth length D.

$$\phi p = 2 \times \tan^{-1}[Wp/D] \quad (1)$$

Figure 9B:
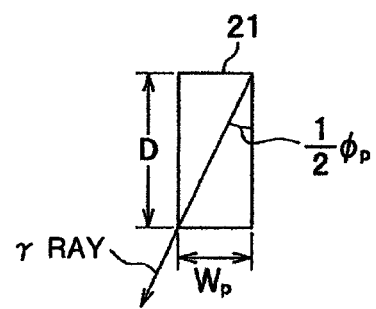
FIG. 9B is a diagram explaining the slantwise incident γ rays as against the radiation passages of the detectors.

As illustrated in FIG. 9B, that aperture angle φp is a rough guide obtained in order to set γ rays obliquely entering the radiation passage 31 of the detector 21 to fall into the interior of approximately one detector 21. The present embodiment adopts CdTe for the detector 21 and, therefore, a radiation stopping power is higher than an NaI scintillator. The CdTe with the depth length D being 10 mm corresponds to an NaI scintillator for middle and high energy γ-ray imaging with 16 mm thickness. Since the detector width Wp is 1.4 mm, the aperture angle φp will be approximately 16°. However, in order to reduce the occurrence of oblique through entrance into the adjacent detector 21, the aperture angle φp is narrowed to 3.44° in the assumption that three detectors 21 are arranged in the circumferential direction (see FIG. 10E).

The range of angle looking into the aperture 33 is 1.49° on one side as illustrated in FIG. 10C in a view from the center detector 21 in an alignment of three units in an assumption that distance Lc between the detector effective center $P_D$ and the collimator hole center Pc is 50 mm for the detector width WP being 1.4 mm. In order to maintain an equivalent viewing angle also for the both left and right detectors 21 each of which is made of three units for an alignment as illustrated in FIGS. 10B and 10D, the aperture angle on the incident plane side will be 3.09° on one side as illustrated in FIG. 10E.

In order to reduce the problem of hole edge penetration in the pinhole collimator as described above, a type as in FIG. 10E with an aperture angles both on the incident plane side and the detector side is desirable.

As illustrated in FIG. 10A, the angle θp looking into the arrangement pitch of the respective detector effective centers $P_D$ of the center detector 21 within the three units in the radiation passage 31 and its adjacent detectors 21 from the center $P_H$ of the hole width Dcp of the aperture 33 in the collimator hole center Pc will be 1.60°. FIGS. 10B to 10D illustrate viewing angle entering the detector 21 of each detection pixel through one radiation passage 31. The viewing angle is approximately equivalent to any detector 21.

In such configured collimator 30A, the collimator member 30a is thin on the side of the detector 21. However, the interval between the collimator holes is present in every three detection pixels and the incident angle is limited by the aperture angle φp formed by the collimator member 30a. Therefore, γ rays capable of entering the radiation passage 31 obliquely enter the plane facing the radiation passage 31 of the collimator member 30a obliquely to enable their passage distance to allow sufficient absorption of the γ rays. For example, as for the γ ray of $^{67}$Ga and 300 keV, the mean free path for lead is approximately 2.4 mm. However, the collimator 30A can obtain not less than 10 mm as minimum passage distance for oblique incident rays. Thereby penetration can be restrained to reach the 1% order level likewise an MEGP collimator (MEGP: Middle Energy-General Purpose). In the case of using an LEHR collimator, γ rays of 300 keV gives rise to penetration of not less than 40% and influences images seriously. Accordingly, even if the side of the detector 21 is made thin, penetration of γ rays to the adjacent radiation passage 31 can be made sufficiently low. Consequently, a dead space, where no detector 21 can be arranged due to the collimator member 30a, given rise to in the camera part of the conventional gamma camera apparatus will be reduced in the circumferential direction to increase sensitivity.

Here, the collimator members 30a and 30b are made of lead or tungsten and is desired to be made of highly hard tungsten, in particular, in the vicinity of the aperture 33 from the point of view of maintaining the hole shape.

(Radio-Graphing Method and Imaging Method)

Next, a method of radio-graphing a projection image with a configuration of those collimators 30A and arrangement of the detectors 21 and an imaging method in an image processing portion of a nuclear medicine diagnosis instrument (gamma camera apparatus) 1A will be described with reference to FIG. 11 to FIG. 18 (appropriately with reference to FIG. 1).

In the present embodiment, the collimator shape is different between in the circumferential direction and in the body axis direction. Therefore, the method of radio-graphing a projection image in the circumferential direction being a significant feature of the present system will be described at first.

(Radio-Graphing Method of Projection Image in Circumferential Direction)

Figure 11:
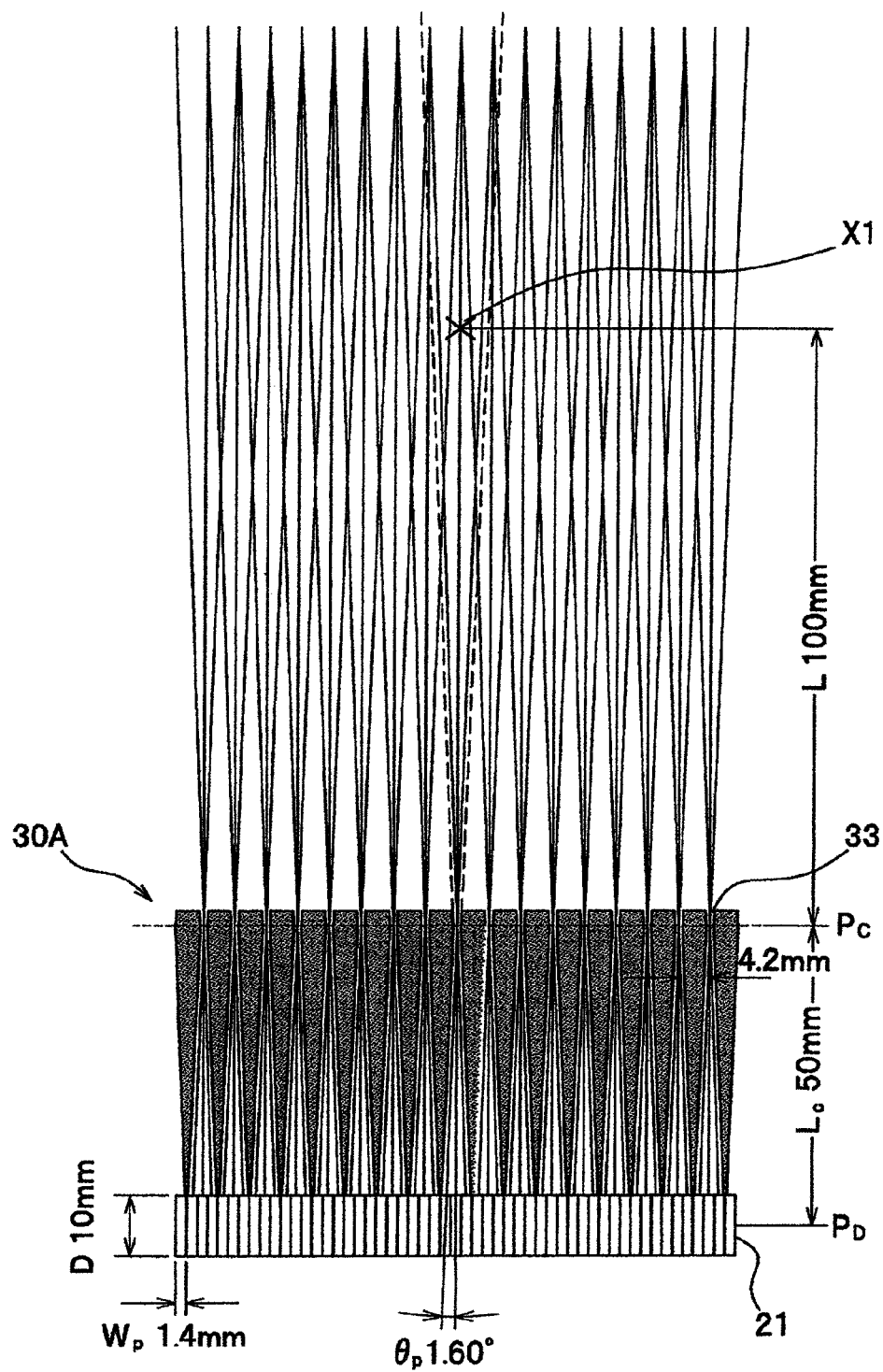
FIG. 11 is a diagram illustrating a projection line of a collimator.

In the present embodiment, as illustrated in FIG. 1, in one camera position where the rotation center axis X1 of the camera part 11 makes an angle in the circumferential direction of the rotation center axis X2, a state where the incident plane of the camera part 11 is directed inward perpendicularly to the radius direction of the rotation center axis X2 is set to 0° toward the rotation center axis X1. And, with 0° as the center, one side will be referred to as "+" and the other side as "−"

here. With radio-graphing in gamma camera apparatus with a parallel hole collimator, the projection for all the area of the detector 21 is obtained for the γ-ray incident components from the direction perpendicular to the incident plane of the camera part 11 normally in one camera position with an angle in the circumferential direction of the rotation center axis X2. In contrast, in a nuclear medicine diagnosis instrument 1A of the present embodiment, with the γ-ray component entering from the vertical direction is defined as "vertical component" for the incident plane of the camera part 11 in the state where the incident plane of the camera part 11 makes 0° for the rotation center axis X1. Then, in the angle setting state of that incident plane, a plurality of units of projections in different directions including the γ-ray component other than the "vertical component" heading for the incident plane obliquely in the circumferential direction as illustrated in FIG. 11 are included. In addition, for example, as in the state where the collimator 30A illustrated in FIG. 12 makes 0° for the rotation center axis X1, the above described "vertical component" enters, through the respective apertures 33, one of the detectors 21 arranged in the circumferential direction of the respective radiation passages 31, that is, only one detector 21 with detector ID of 3 k (k=1 to 17) among the detectors 21 to which numbers 1 to 53 inclusive, for example, are applied in FIG. 12, as detector ID for description.

Here, a feature of the present embodiment is to carry out radio-graphing even in the position subjected to rotation by a predetermined step width θp with the position of the aperture 33 of the collimator 30A making 0° for the rotation center axis X1 in order to displace the position of the aperture 33 in the circumferential direction and to gather outputs (radio-graphing distribution) of the detectors 21 based on "vertical component" in the respective camera positions. In the present embodiment, three detectors 21 are arrayed in the circumferential direction in one radiation passage 31. Therefore, radio-graphing takes place in three angle positions including 0° for the rotation center axis X1.

With the distance Lc between the collimator hole center Pc and the detector effective center $P_D$ and the detector width Wp, the position of the rotation center axis X1 around which the camera part 11 rotates is determined by the expression (2) on integer m with the distance L between the collimator hole center Pc and the rotation center axis X1. The integer m is m=2, for example. At that occasion, rotation takes place with the step width θp given by the expression (3) for the rotation center axis X1 and radio-graphing is carried out in the angle positions −θp, +0, −0 and +θp.

$$L = m \times Lc \quad (2)$$

$$\theta p = \tan^{-1}(Wp/Lc) \quad (3)$$

Here, m is an integer except multiples of detection pixel number (3 in this example) for one row in the circumferential direction corresponding with one aperture 33. The reason why integer is taken is that the position of the rotation center axis X1 illustrated in the drawing can be on the detector side opposite against the incident direction of γ rays (m<0 to be taken into consideration).

Figure 12:
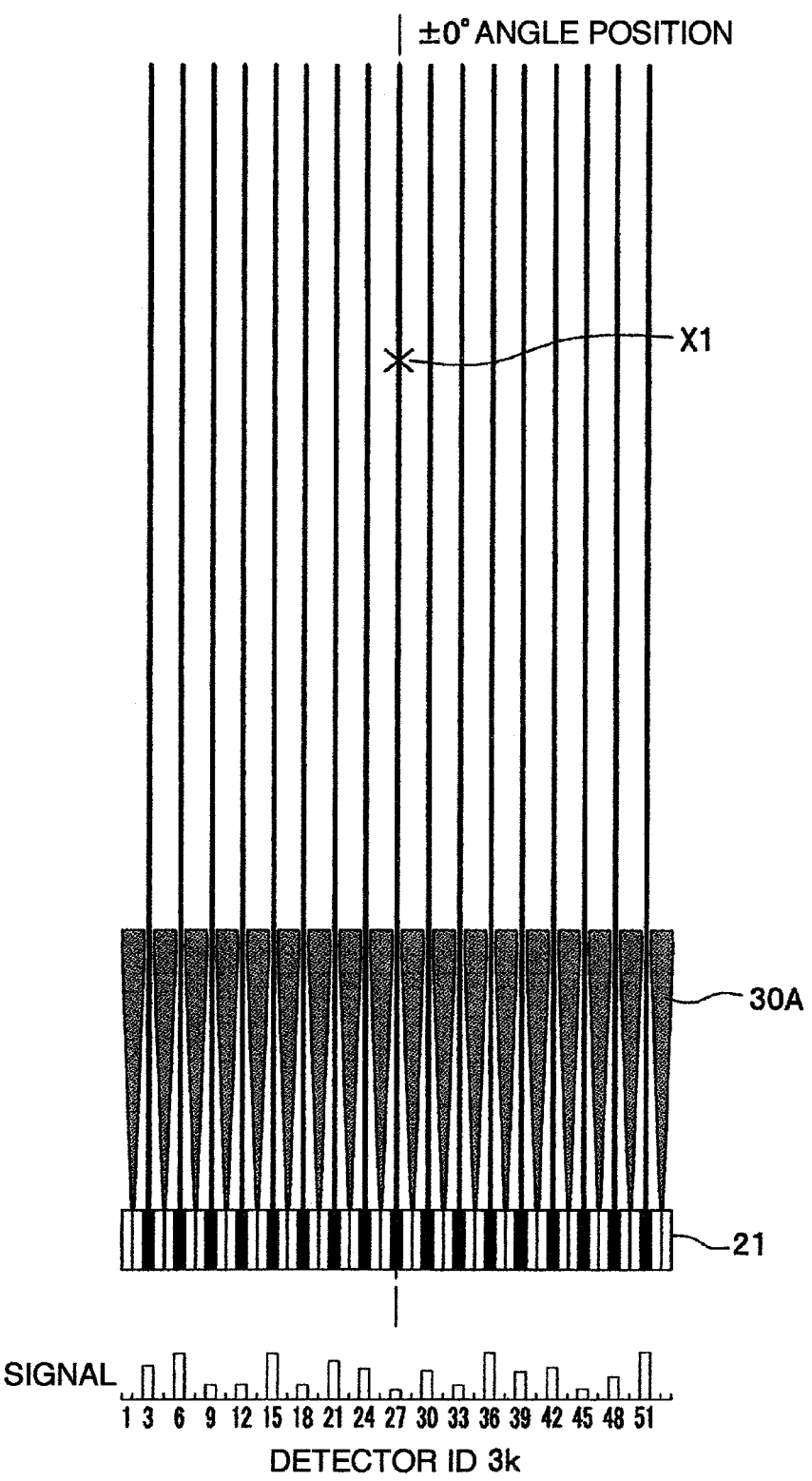
FIG. 12 is a diagram illustrating a projection line of a vertical component of the incident γ rays in the case of the angle position 0°.

An example of the case of radio-graphing based on "vertical component" of γ rays entering to the incident plane in the state with the collimator 30A being at angle of 0° for the rotation center axis X1 will be specifically described with reference to FIG. 12 to FIG. 15. For the purpose of description, the lower sides of the detectors 21 are numbered as respective IDs of the detectors 21 in the circumferential direction. The projection of the γ-ray components in the vertical direction onto the incident plane at an occasion of 0° for the rotation center axis X1 is obtained with detectors 21 with the center detector ID being 3 k (k=1 to 17 inclusive) among the detectors 21 arrayed with three units in a row in the circumferential direction of the rotation center axis X1 as illustrated in FIG. 12 being positioned by skipping in every three units in the circumferential direction. Here, for description, the detectors 21 detecting the "vertical component" of the incident γ rays are blacked out. The relevant detector 21 detecting γ rays outputs detection signals in number corresponding with the number of respectively detected γ rays.

Figure 13:
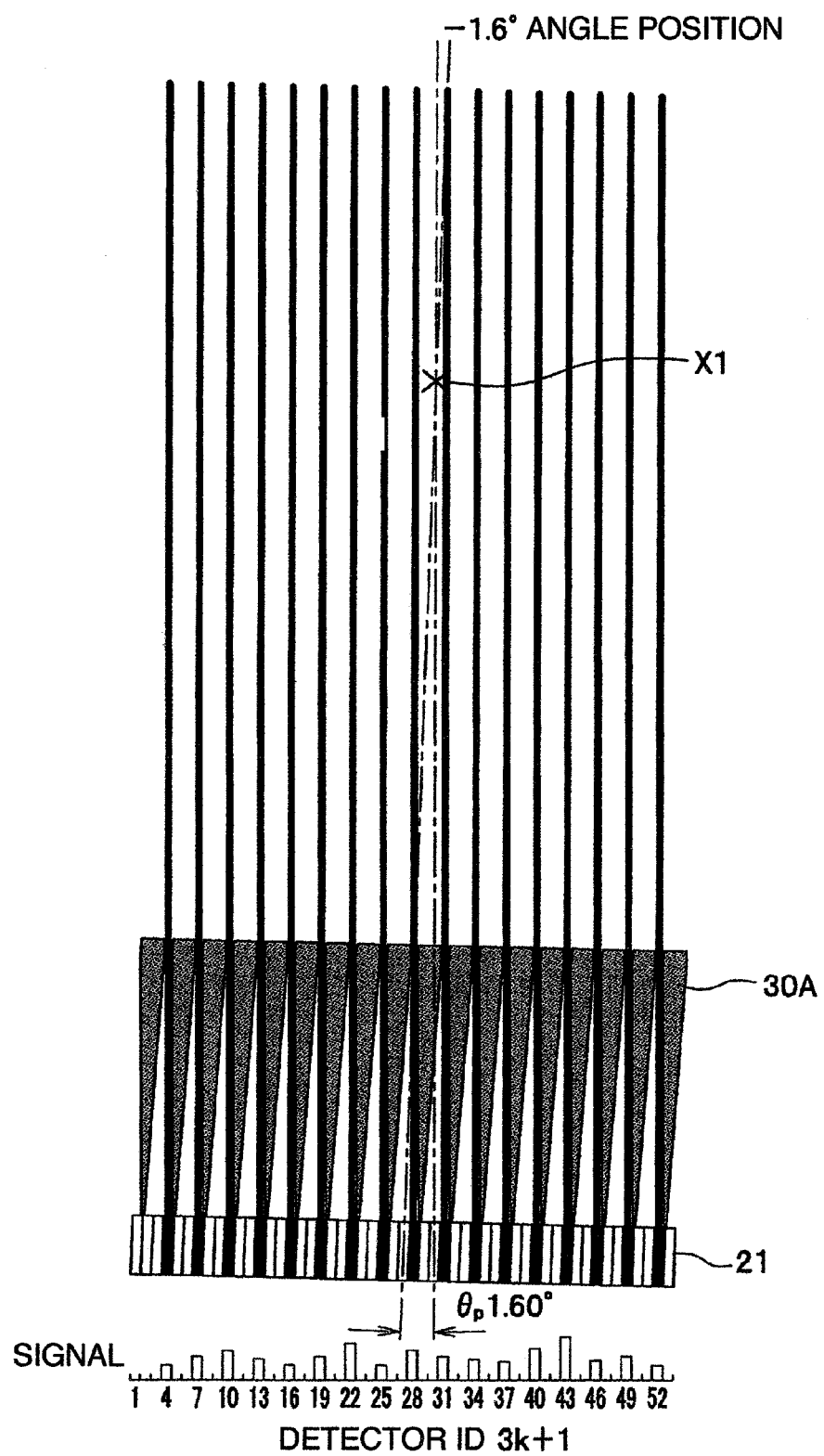
FIG. 13 is a diagram illustrating a projection line of a vertical component of the incident γ rays in the case of the angle position −1.6°.
Figure 14:
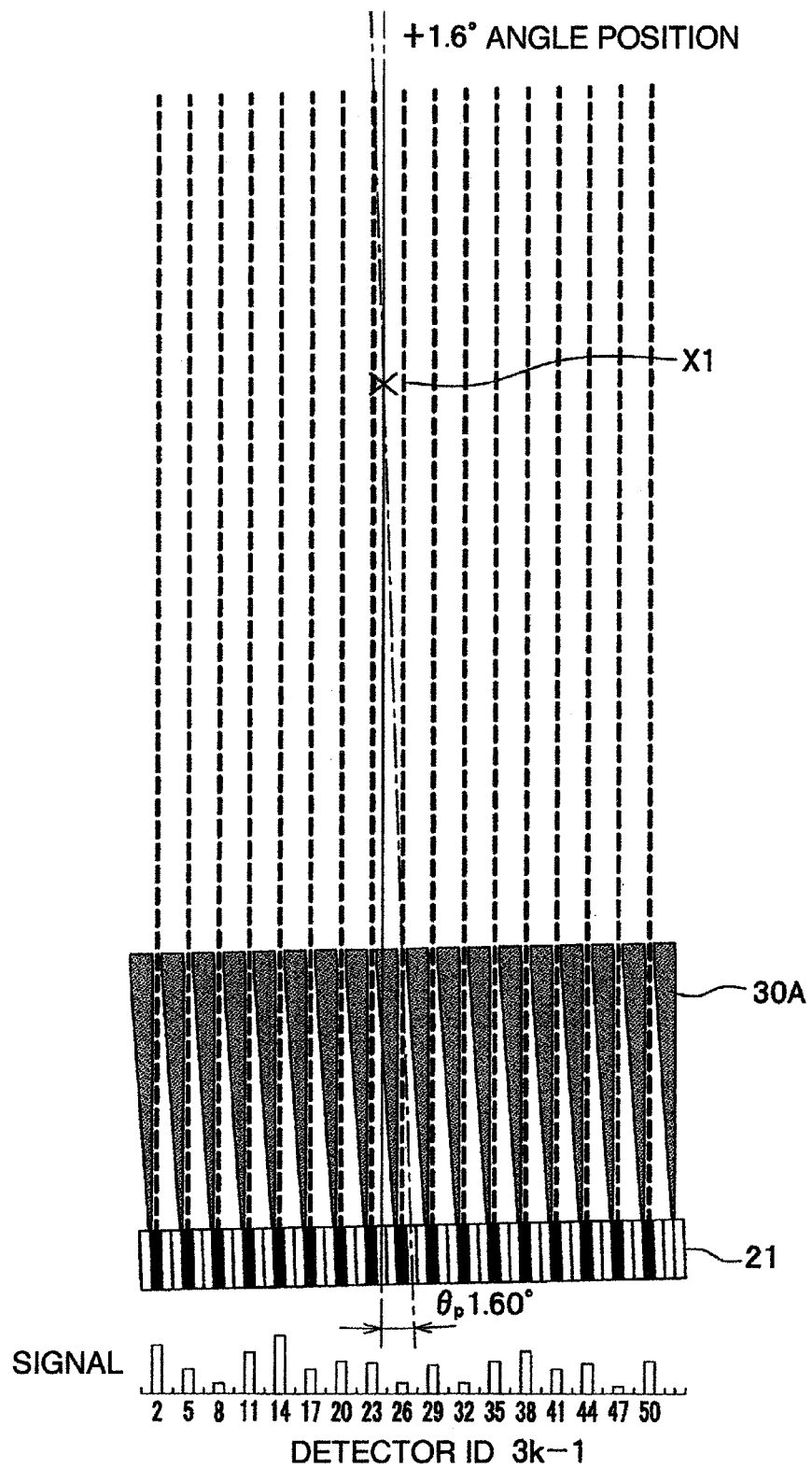
FIG. 14 is a diagram illustrating a projection line of a vertical component of the incident γ rays in the case of the angle position +1.6°.

FIG. 12 is a diagram illustrating projection lines to the detectors 21 in the case where the collimator 30A makes the angle position 0° for the rotation center axis X1 and the output distribution (radio-graphing distribution) of the detectors 21; FIG. 13 is likewise a diagram illustrating projection lines to the detectors 21 in the case of the angle position −1.6° and the output distribution (radio-graphing distribution) of the detectors 21; and FIG. 14 is likewise a diagram illustrating projection lines to the detectors 21 in the case of the angle position +1.6° and the output distribution (radio-graphing distribution) of the detectors 21, where the projection liens are illustrated with bold full lines, mid-bold full lines and mid-bold dashed lines on each step.

Figure 15:
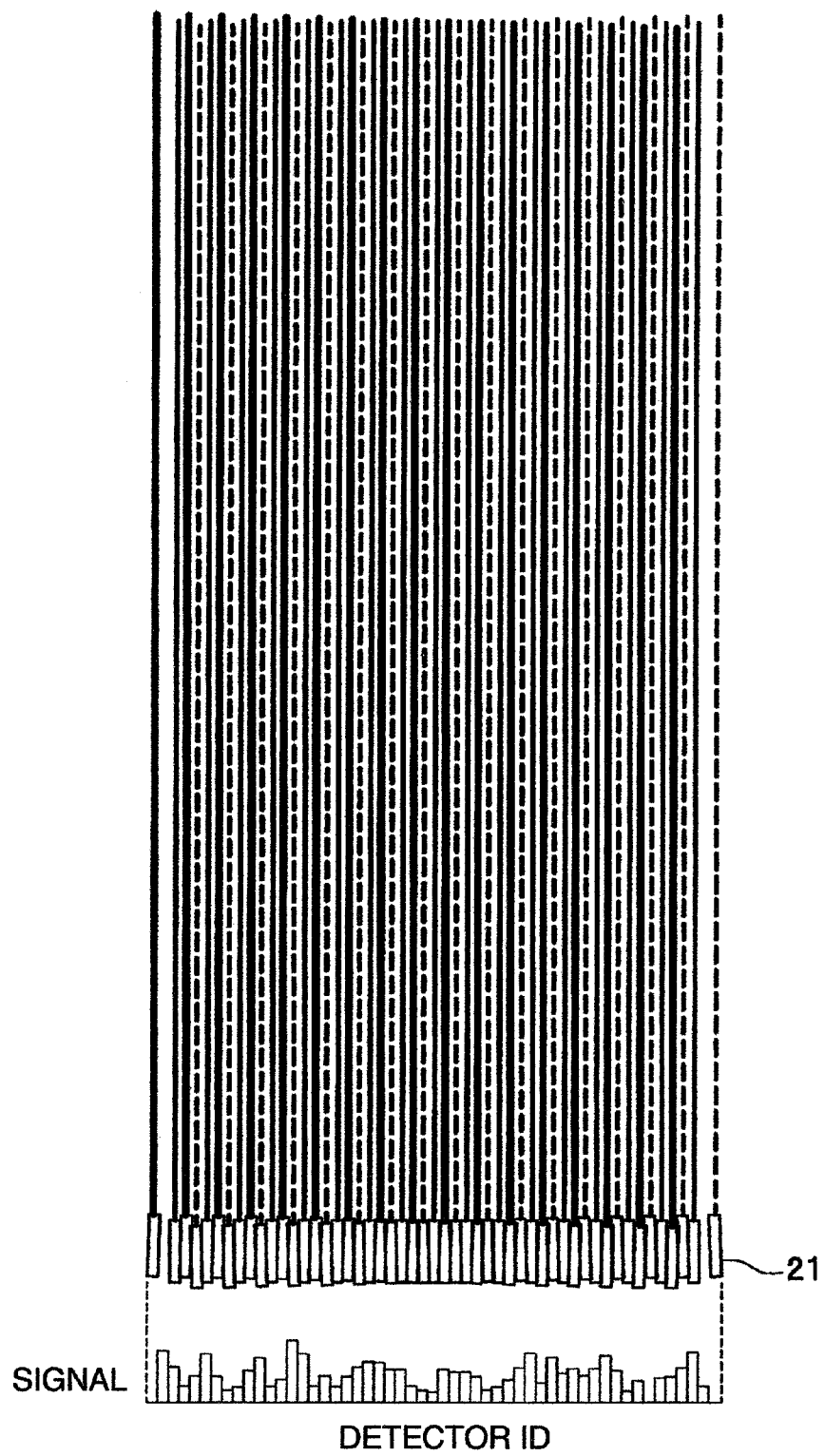
FIG. 15 is a diagram illustrating overlapping the radio-graphing with the angle positions 0°, −1.6° and +1.6° to complete a projection image in one projection direction.

FIG. 15 illustrates overlapped projection data for three-step width. In this example, a set of detectors 21 looking into from one aperture 33 is made of three units. Therefore, the projection from one direction is obtained in every three detector position. Thus, the detector positions detecting vertical components in respective angle positions are known. Based on the projection image for three steps obtained by rotating the camera part 11 in the step width of aperture angle θp=1.6° with the rotation center axis X1 as the center as in FIG. 12, FIG. 13 and FIG. 14; and extracting only signals detecting the "vertical component" in the image processing part of the data processing apparatus 5 (blacked-out signals from the detectors 21 in FIG. 12, FIG. 13 and FIG. 14), a flat plane projection image based on "vertical component" in one direction configured by the entire detectors 21 in an interval of 1.4 mm likewise the three kinds of projection lines illustrated in FIG. 15 is generated.

Thus, complete projection data exactly the same as the normal parallel hole collimator can be obtained. Here, a detector of a pixel type generates moire in the image due to displacement between the pitch of the aperture (collimator hole) of a collimator and the pitch of the detector. Therefore, a pixel matched collimator whose aperture completely corresponds to the detector 21 is regarded to be desirable. One projection line in FIG. 11 to FIG. 15 corresponds to one detector 21. Therefore, a pixel matched collimator with unlimitedly small septum thickness with substantially sufficiently restrained penetration is realized as a collimator 30A for the detector 21 of a pixel type sectioned in every detector 21. That means that an image with image quality approximately equivalent to the low energy γ-ray radio-graphing of high space resolution subjected to activation of the property of the pixel type is obtainable also in the case of radio-graphing high energy γ rays. In addition, due to no influence of septum shadow, aperture correction for correcting out of focus due to geological resolution of the collimator becomes simple to carry out so that introduction of much higher space resolution can be expected.

Figure 16:
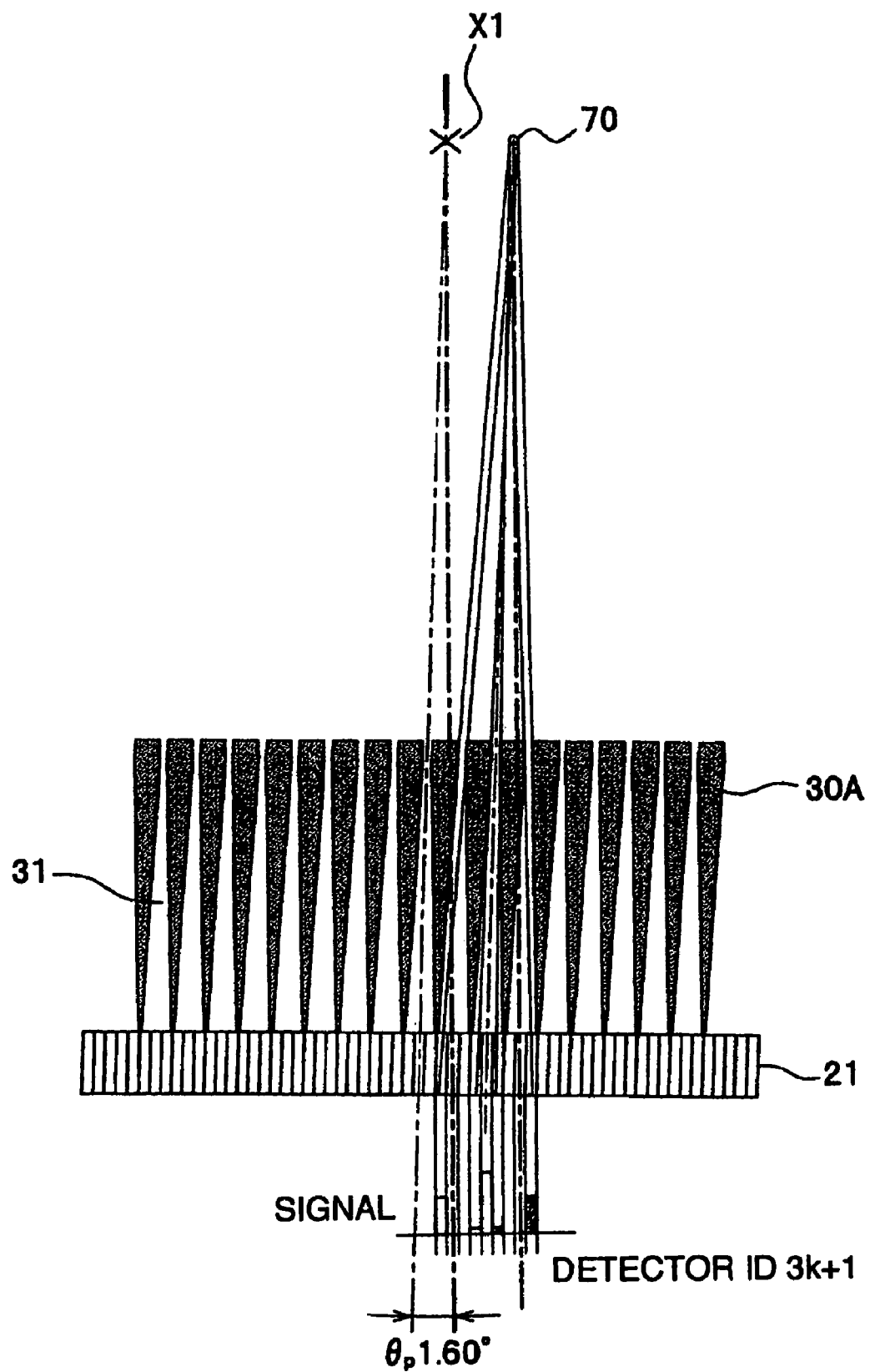
FIG. 16 is a diagram illustrating a projection line of the incident γ ray and its detection signal in the case of the angle position of −1.6° in radio-graphing a point source.
Figure 17:
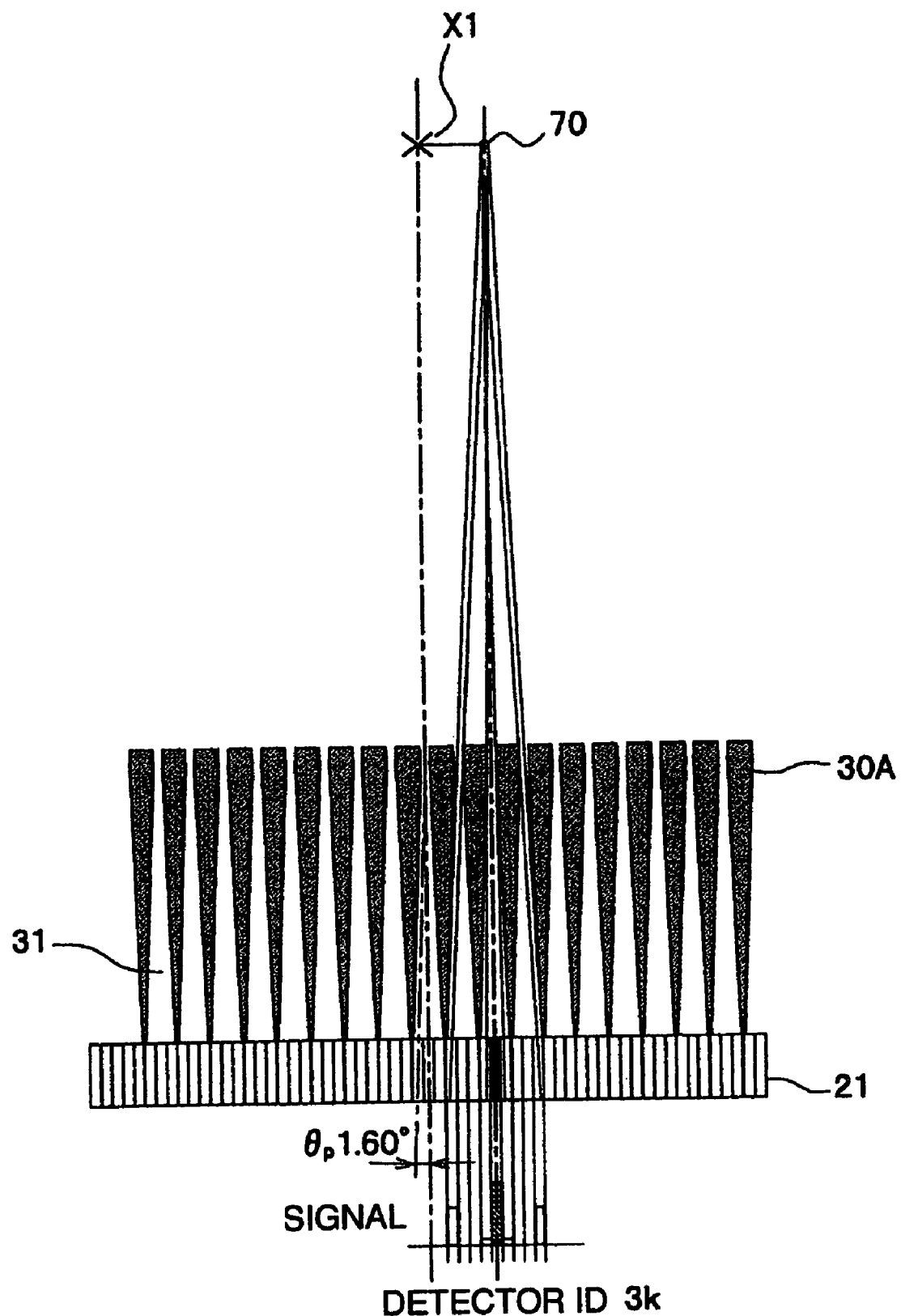
FIG. 17 is a diagram illustrating a projection line of the incident γ ray and its detection signal in the case of the angle position of 0° in radio-graphing a point source.
Figure 18:
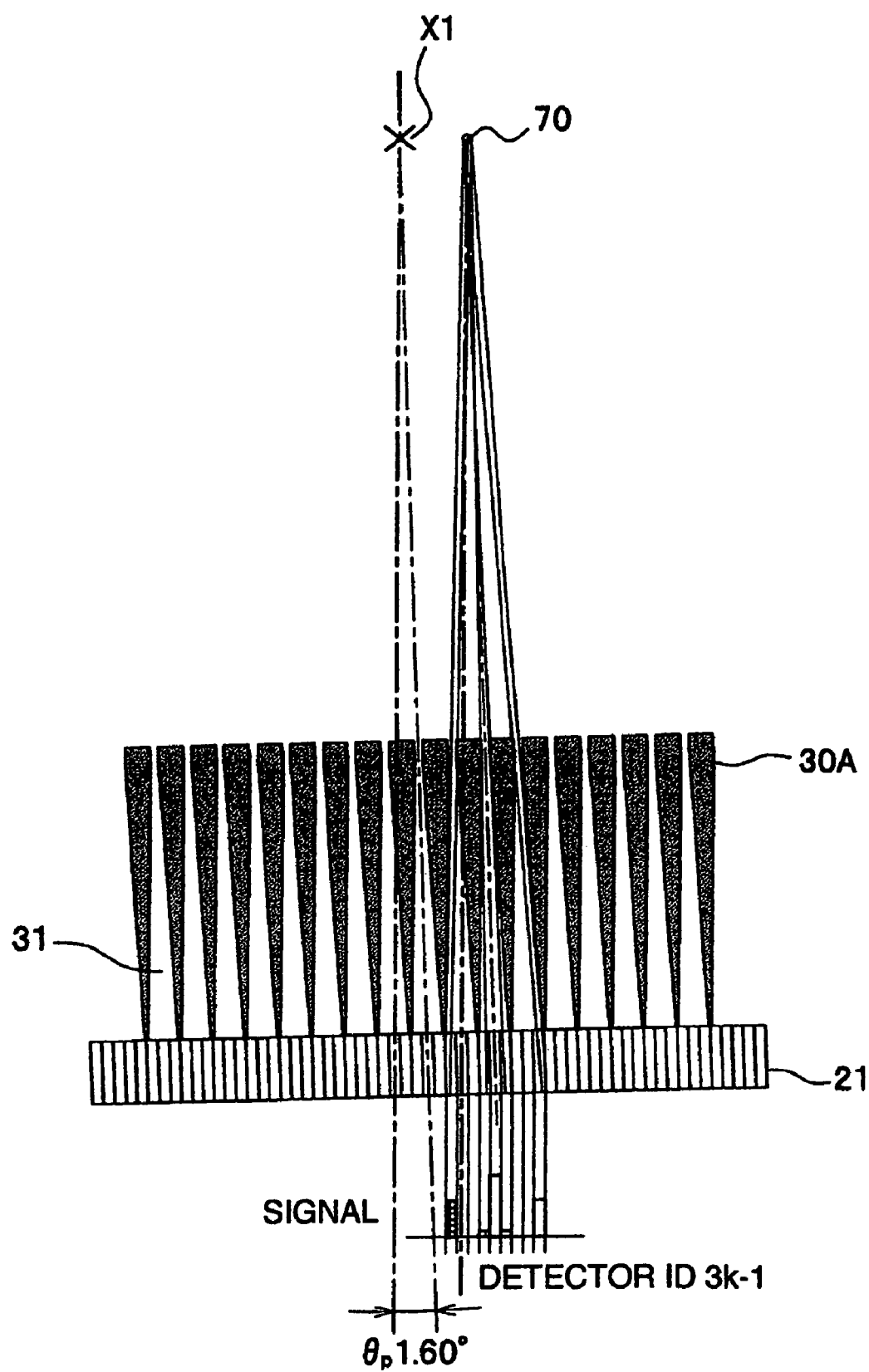
FIG. 18 is a diagram illustrating a projection line of the incident γ ray and its detection signal in the case of the angle position of +1.6° in radio-graphing a point source.

Next, the case of actually radio-graphing the point source 70 will be described with reference to FIGS. 16-18 The distance L between the point source 70 and the collimator hole center Pc is hypothecated to be 100 mm. FIGS. 16-18 illustrate projection lines from the point source 70 to the detectors 21 and illustrate the output distribution of the detectors 21.

Figure 19:
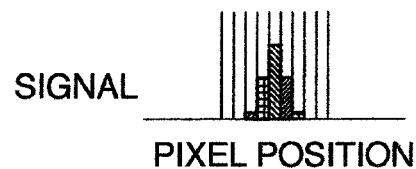
FIG. 19 is a diagram illustrating distribution of vertical components in one projection direction imaged by picking out and overlapping only outputs based on "vertical component" from the radio-graphing outcome of the angle positions −1.6°, 0° and +1.6° in FIG. 16, FIG. 17 and FIG. 18.

FIG. 16 is a diagram illustrating projection lines to the detectors 21 with the detector ID being 3k+1 (k=1 to 17) in the case where the collimator 30A makes the angle position—1.6° for the rotation center axis X1 and the output distribution (radio-graphing distribution) of its detectors 21; FIG. 17 is likewise a diagram illustrating projection lines to the detectors 21 with the detector ID being 3k (k=1 to 17) in the case of the angle position 0° and the output distribution (radio-graphing distribution) of its detectors 21; and FIG. 18 is likewise a diagram illustrating projection lines to the detectors 21 with the detector ID being 3k−1 (k=1 to 17) in the case of the angle position =1.6° and the output distribution (radio-graphing distribution) of its detectors 21. The outputs of the detectors 21 based on "vertical component" of γ rays from the point source 70 in the respective steps are illustrated with different kinds of hatching lines. FIG. 19 is a projection distribution in the circumferential direction by taking out only outputs based on "vertical component" illustrated with the above described respective hatching lines and having undergone radio-graphing.

Figure 20:
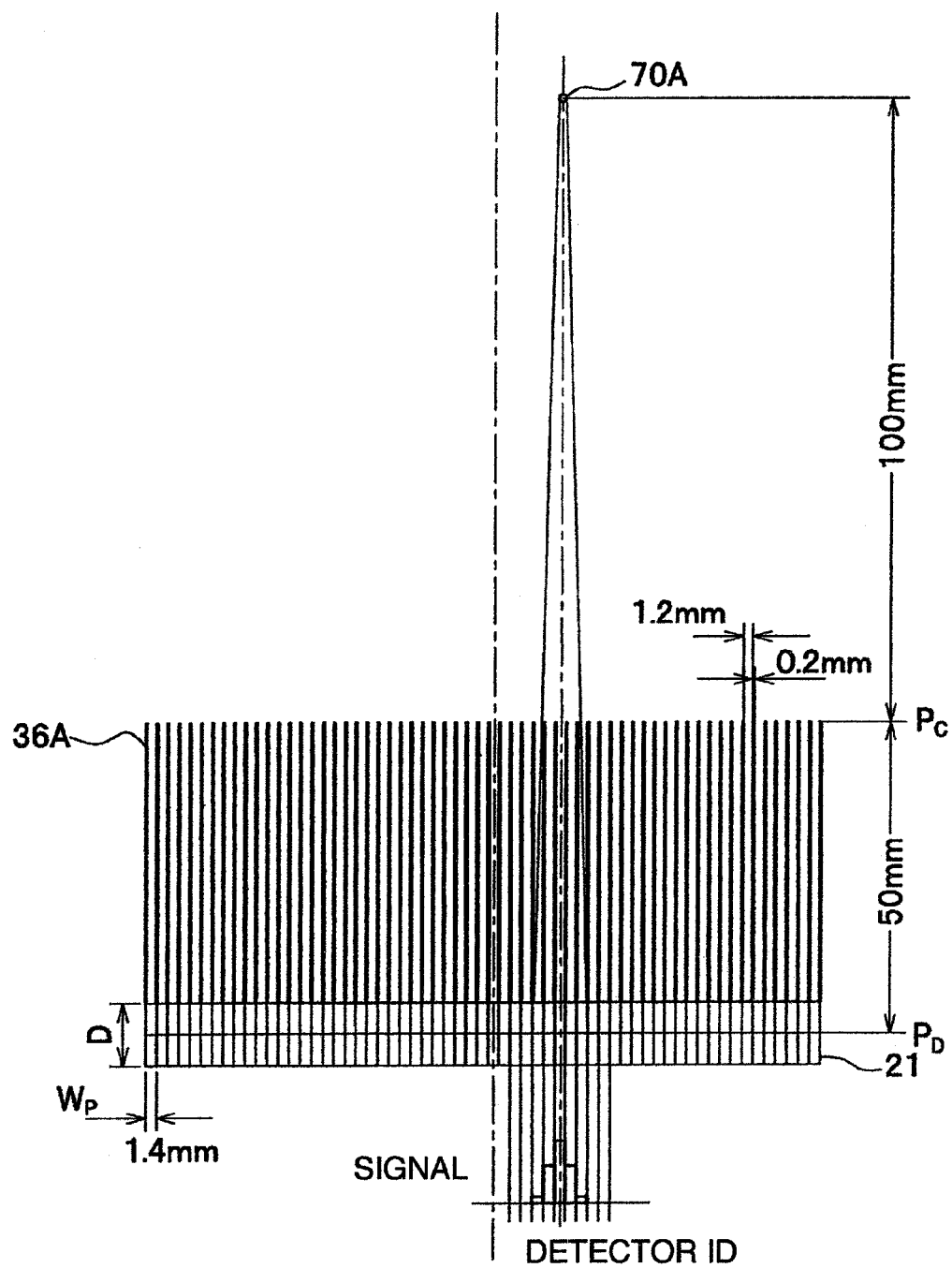
FIG. 20 is a diagram describing a radio-graphing distribution in the case of radio-graphing the point source with a high space resolution parallel hole collimator for low energy γ rays illustrated as a reference as a comparative example.

For the purpose of comparison, hypothecating Low Energy Super High Resolution (LESHR) parallel hole collimator 36A having approximately the same geometrical resolution as that of collimator 30A, FIG. 20 illustrates a radio-graphing distribution of the detectors 21 in the case of radio-graphing the low energy point source 70A in the same position. However, the septum thickness is 0.2 mm; the width of the aperture is 1.2 mm, the distance L between the point source 70 and the collimator hole center Pc is 100 mm and the distance Lc between the collimator hole center Pc and the detector effective center $P_D$ is 50 mm. The distribution obtains a state making penetration approximately ignorable due to low energy γ rays. In the present embodiment, as illustrated in FIG. 20C, it is apparent that nearly the same distribution as that has been obtained.

Actually, with the septum thickness of the parallel hole collimator 36A illustrated in FIG. 20 being 0.2 mm, penetration of high energy γ rays reaches even several tens of percentage to provide more broadened distribution to be only capable of obtaining extremely low resolution images. Accordingly, in order to restrain penetration, an MEGP collimator for middle energy γ rays and an HEGP collimator for high energy γ rays with thick septum will be required.

The present embodiment attains the same effect as security of sufficient septum thickness with 3 mm thickness of the collimator member 30a between the adjacent radiation passages 31 in the collimator hole center Pc of the aperture 33. Even high energy γ rays can restrain penetration sufficiently and images with high resolution on the level of LESHR are obtainable. Even if MEGP and HEGP collimators spend any long hours, such a high resolution images are not obtainable.

Figure 21:
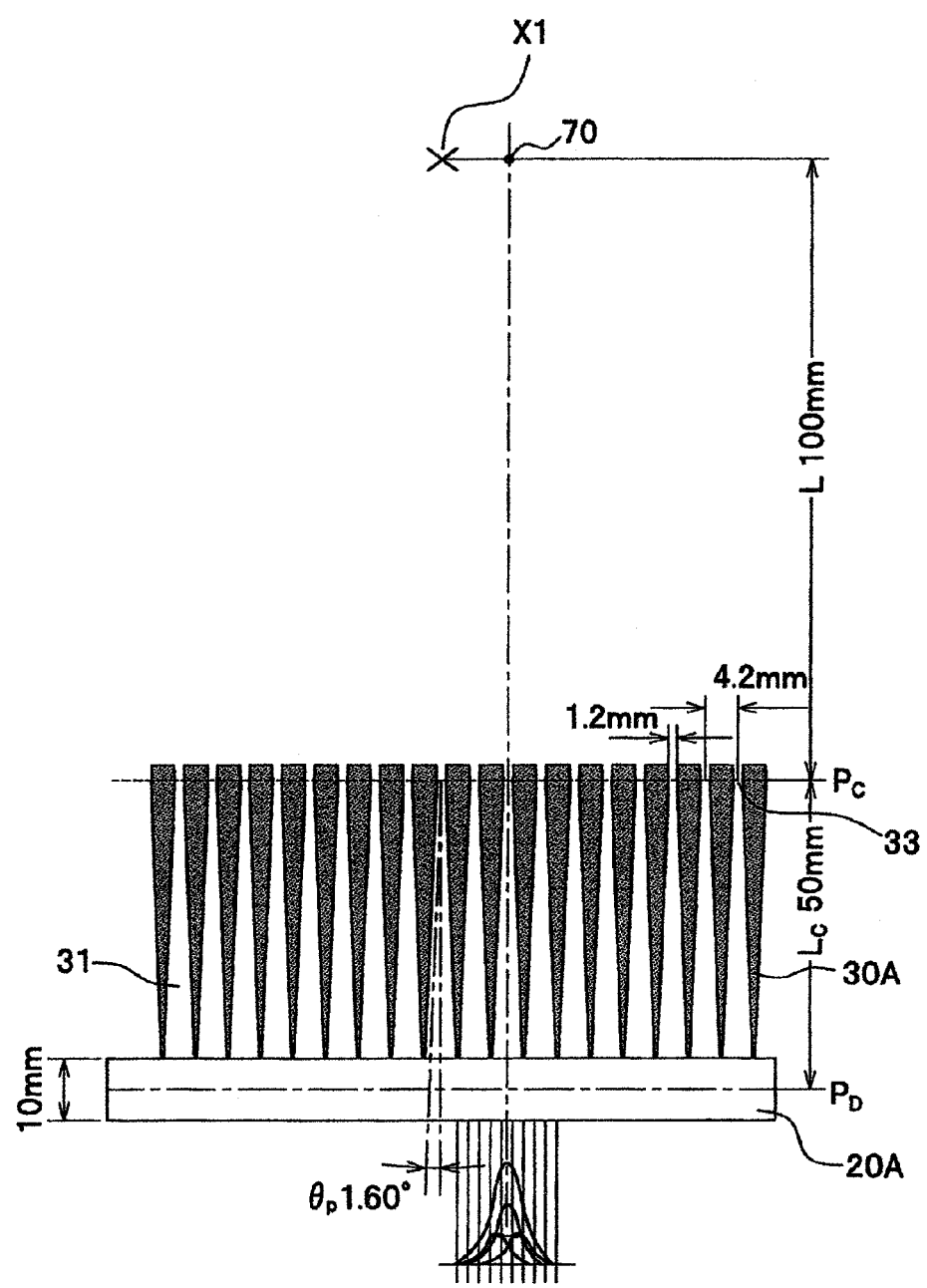
FIG. 21 is a diagram describing an example of a radio-graphing distribution in the case of radio-graphing with an NaI scintillator using a collimator in the first embodiment illustrated as a reference as a comparative example.

Next, with reference to FIG. 21, a comparison between the present embodiment and the case where an integrated NaI scintillator 20A is combined with collimators 30A will be described instead of the detector 21 in the present embodiment. FIG. 21 illustrates a radio-graphing distribution obtained based on the "vertical component" of γ rays from the point source 70 in the case where the collimator 30A in the present embodiment is combined with the integrated NaI scintillator 20A. In the case of combining an integrated NaI scintillator 20A, hypothecating a detection pixel of the detector width Wp being 1.4 mm virtually in the circumferential direction, outputs of three detection pixels sectioned on each detection pixel included in one radiation passage 31 are similar to the aggregation of distribution subjected to overlapping of gauss distribution of respective detection pixels. Originally, in the integrated NaI scintillator 20A, the point response equation is not discrete but presents the gauss distribution. Since the intrinsic resolution is also not less than 3 mm, the point response equation will result in the distribution three times broader than the detector width Wp being 1.4 mm of the detectors 21 in the present embodiment. Accordingly, even if the camera part of the gamma camera apparatus is rotated as in the present embodiment, data divided on ever three detector units will not be given rise to, but even if the data is divided on every pixel virtually, imaging as in the present invention cannot be carried out. That is, with the integrated NaI scintillator 20A of a conventional gamma camera apparatus having not been divided on every detector 21 yet, even if the same collimator 30A is used, a high resolution projection image as in the present embodiment cannot be obtained.

In summary, at an occasion of radio-graphing a projection image from one direction in the circumferential direction of the rotation center axis X2, with a predetermined step width θp for the rotation center axis X1 (first rotation center axis) being 1.6°, for example. Radio-graphing is carried out at a predetermined angle positions around the rotation center axis X1 being −1.6°, 0° and +1.6°, for example. Therefore, displacing only thickness for the septum portion around the aperture 33 on the incident plane side of the radiation passage 31 and changing the incident plane angle, radio-graphing of projection from the middle and high energy γ-ray source can be carried out at high resolution. In the process of imaging the projection image from one direction of the rotation center axis X2, the nuclear medicine diagnosis instrument 1A with the present radiation imaging system 3A adopts a plurality of data sets having undergone radio-graphing in a plurality of angle positions for the rotation center axis X1. Therefore, the effect of the septum shadow is small and images with space resolution equivalent to LESHR for low energy γ rays can be obtained without relying on the energy level of the detection incident γ ray.

(Method of Obtaining Projection Image in Body Axis Direction)

Subsequently, a method for obtaining distribution in the body axis direction will be described. In the present embodiment, a collimator 30A has, as illustrated in FIG. 8, the hole width Dca (1.4 mm) of the same aperture 33 as the hole width for one detection pixel in the body axis direction (detector width Wa being 1.4 mm in the body axis direction) and septum thickness for one detection pixel (thickness of the collimator member 30b being 1.4 mm). The apertures 33 are aligned at two-detection pixel pitch (Wca=2.8 mm). Accordingly, after radio-graphing in a plurality of predetermined angle positions in the circumferential direction of the rotation center axis X1, by moving the camera part 11 by distance for the width Wa being 1.4 mm in the direction of an arrow Z1 or moving the bed 12 by distance for the width Wa being 1.4 mm in the direction of an arrow Z2, and by radio-graphing a plurality of the above described predetermined angle positions in the circumferential direction of the rotation center axis X1 again, the projection of the portion shadowed by the collimator member 30b is obtained. By deleting the detector data corresponding to the shadow of the collimator member 30b in the respective acquired data and summing the both, distribution with high space resolution likewise the distribution obtained with a virtual collimator with the hole width of the collimator aperture 33 in the body axis direction being 1.4 mm, the hole pitch in the body axis direction being also 1.4 mm and the septum thickness being unlimitedly small is obtained.

For reference's sake, even if the collimator 30A of the present embodiment carries out radio-graphing with γ ray of $^{67}$Ga and 300 keV, penetration in the body axis direction is not more than 0.2% falling within a sufficiently ignorable range. The hole width in the body axis direction is different from the hole width in the circumferential direction. Therefore resolution is different. However, space resolution at nearly the same level is obtained. If the hole width Dca in the body axis direction is 1.2 mm while the hole pitch is still 2.8 mm, the same resolution as the resolution in the circumferential direction is obtained.

(Advantages)

Thus, in a nuclear medicine diagnosis instrument 1A of the present embodiment, one detector 21 corresponds with one detection pixel, and in the direction perpendicular to the body axis direction on the incident plane of the camera part 11, the output of the detector 21 obtained in a plurality of angle positions of the rotation center axis X1 and the output of a particular detector 21 corresponding with each angle position are combined. In the body axis direction the camera part 11 is moved in the Z1 direction for one pixel or the bed 12 is moved in the Z2 direction for one pixel to carry out radio-graphing. Thereby influence of the shadow of the septum thickness for one pixel in the body axis direction can be removed to configure complete vertical projection image.

Consequently, a projection image with high space resolution likewise the distribution obtained with a virtual collimator with the hole diameter of the aperture 33 of the collimator 30A being □1.4 mm, the hole pitch in the body axis direction and in the circumferential direction being also 1.4 mm, that is, the septum thickness being unlimitedly small can be obtained.

Radio-graphing in a plurality of angle positions in the circumferential direction enables the hole interval in the circumferential direction to be taken wider while maintaining high space resolution, that is, can thicken the septum in the circumferential direction. High energy γ-ray radio-graphing can obtain high space resolution image at the level equivalent to the low energy γ ray that was not obtainable even if conventional MEGP and HEGP collimators spend any long hours.

In addition, in the conventional parallel hole collimator, it was necessary to replace the collimator with a collimator with septum thickness corresponding with the γ-ray energy each time corresponding with energy of the γ rays used for radio-graphing. However, in the radiation imaging system 3A of the present invention, of the γ rays with possibility for use in radio-graphing, the collimator 30A with septum thickness corresponding with the γ rays with the maximum energy is used and, therefore, can obtain space resolution equivalent to the high resolution collimator for low energy γ rays with high energy γ-ray radio-graphing and can be directly used as high resolution collimator for low energy γ rays. Accordingly, also in radio-graphing with a plurality of nuclides with different γ-ray energy, it is not necessary to select a collimator inferior in resolution in conformity of the high γ-ray energy nuclides as in the conventional cases.

In addition, the collimator 30A is also effective for radio-graphing $^{123}$I used in radio-graphing of hearts and the like. Almost all $^{123}$I emits γ rays with comparatively low energy being 159 keV. However, due to influence of penetration by the emitted γ rays of 529 keV being present in the amount of around 1.4%, the MEGP collimator for middle energy γ rays and the like was frequently used. Use of the radiation imaging system 3A of the present embodiment will enable radio-graphing of $^{123}$I with space resolution and sensitivity equivalent to the high resolution LEHR collimator for low energy γ rays. Moreover, utilizing excellent energy resolution of the semiconductor radiation detector 21 of a pixel type, separation from $^{99m}$Tc (140 keV) being used for general purposes will be enabled so that simultaneous radio-graphing of $^{123}$I and $^{99m}$Tc, which are hardly realizable so far, will become possible. Otherwise, the collimator 30A is also effective for determining effects of radiation therapy with $^{131}$I emitting γ rays at 364 keV. In addition, incident area loss for the dead space having taken place due to the septum of the HEGP collimator for high energy γ-ray radio-graphing will be eliminated to improve sensitivity. Of course, radio-graphing in three angle positions so as to displace the position of the aperture 33 in the circumferential direction of the rotation center axis X1 is carried out and therefore no sensitivity unevenness due to shadows of septum takes place.

If the step width θp is set so that the projection lines are arrayed in the interval of the detector width Wp on a flat plane parallel to the detector 21 at the collimator hole center Pc apart from the position of the rotation center axis X1 by distance L in FIG. 11 of the present embodiment, then, even if the value of the integer m determined by the expression (2) is changed in the distance L, that is, even if the distance L is set not to 100 mm described in FIG. 11, but to 50 mm and 200 mm, a projection image in the interval of 1.4 mm is likewise obtained in the camera part 11.

Here, the rotation center axis X1 is arranged on the incident plane side in the present embodiment but will not be limited thereto. The rotation center axis X1 can be provided in the position apart from the collimator hole center Pc to the side of the detector 21 by distance L determined by the expression (2).

The collimator 30A in the present embodiment is applicable not only to a gamma camera apparatus but also to a current SPECT apparatus including a gyration mechanism around a body axis around the rotation center axis X2 of the camera part 11, a body axis movement mechanism in the direction Z2 with the bed 12, and a rotation mechanism around the rotation center axis X1 only by replacement to the collimator 30A and exchange with radio-graphing method in the body axis direction and the circumferential direction to provide a high resolution SPECT apparatus. The case of applying the collimator 30A to the SPECT apparatus in that way will be described with a third embodiment to be described below. The shape of the collimator 30A of the present embodiment is more useful in the SPECT apparatus of the third embodiment to be described below than in the gamma camera apparatus. In the case of emphasizing isotropy of space resolution as a gamma camera apparatus, it is more desirable to use a second embodiment to be described below.

In addition, if the drive mechanism of the camera part 11 corresponds with parallel movements in the direction perpendicular to the body axis direction on the incident plane, radio-graphing system in the body axis direction can be applied to in the circumferential direction.

Second Embodiment

Next, a gamma camera apparatus being a nuclear medicine diagnosis instrument related to a second embodiment of the present invention will be described with reference to FIG. 23 to FIG. 26.

Figure 23:
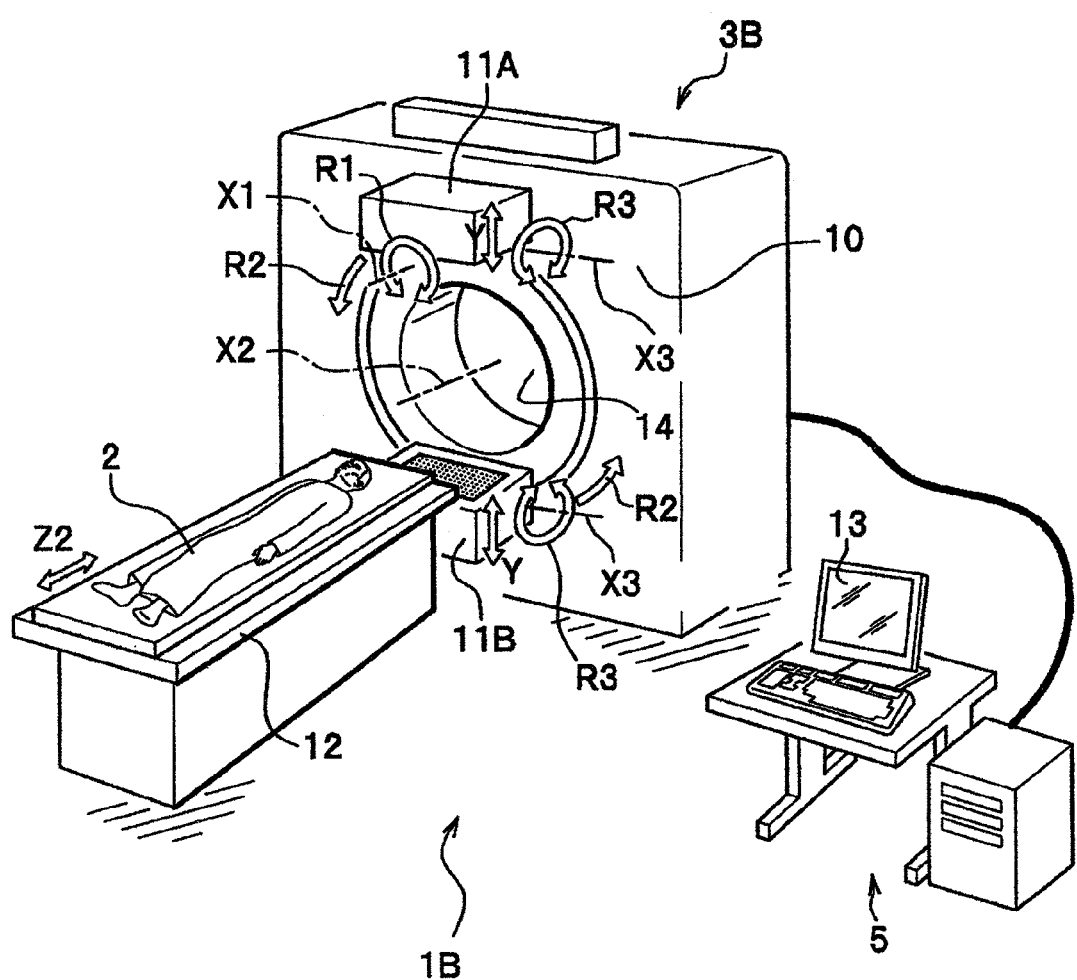
FIG. 23 is an entire perspective view illustrating a nuclear medicine diagnosis instrument (gamma camera apparatus) according to a second embodiment of the present invention.

The radiation imaging system 3B of the nuclear medicine diagnosis instrument 1B of the present embodiment is basically the same as in the first embodiment but the camera part 11 (camera parts 11A and 11B in the drawing) is different from the camera part of the first embodiment in the movable direction of the portion retained by the gantry 10, the shape of the collimator and the arrangement of the detectors. In the present embodiment, the camera part 11 includes a rotation center axis X1 (first rotation center axis) and a rotation center axis X3 (third rotation center axis) which is perpendicular to the axis perpendicular to the incident plane passing the center of the incident plane of the camera part 11 and perpendicular to the rotation center axis X1 in a portion retained by the gantry 10. The camera part 11 is capable of rotating in the direction designated by an arrow R1 and an arrow R3 and is capable of rotating (orbiting) around the above described aperture 14 as designated by an arrow R2 around a rotation center axis X2 (second rotation center axis) of a cylindrical aperture 14 in the center portion of the gantry 10 as a center of rotation. FIG. 23 illustrates the rotation center axis X1 and the arrow R1 designating the rotation direction for the camera part 11A. However, the camera part 11B is likewise.

Moreover, the camera part 11 is movable as designated by an arrow Y inward and outward along the radius direction of the rotation center axis X2. In addition, in FIG. 23, the camera parts 11A and 11B are arranged so as to face to make 180° each other and are retained by the gantry 10 but can be arranged to make 90°, for example, each other within a range so as not to interfere each other. In addition, likewise the first embodiment, the camera parts 11A and 11B can be arranged to make a line in a planar state.

Otherwise the second embodiment is the same as the first embodiment. As for the same configuration as in the first embodiment, like reference characters designate the same or similar parts throughout the figures thereof to omit the repetition of the same description.

(Collimator)

Figure 24A:
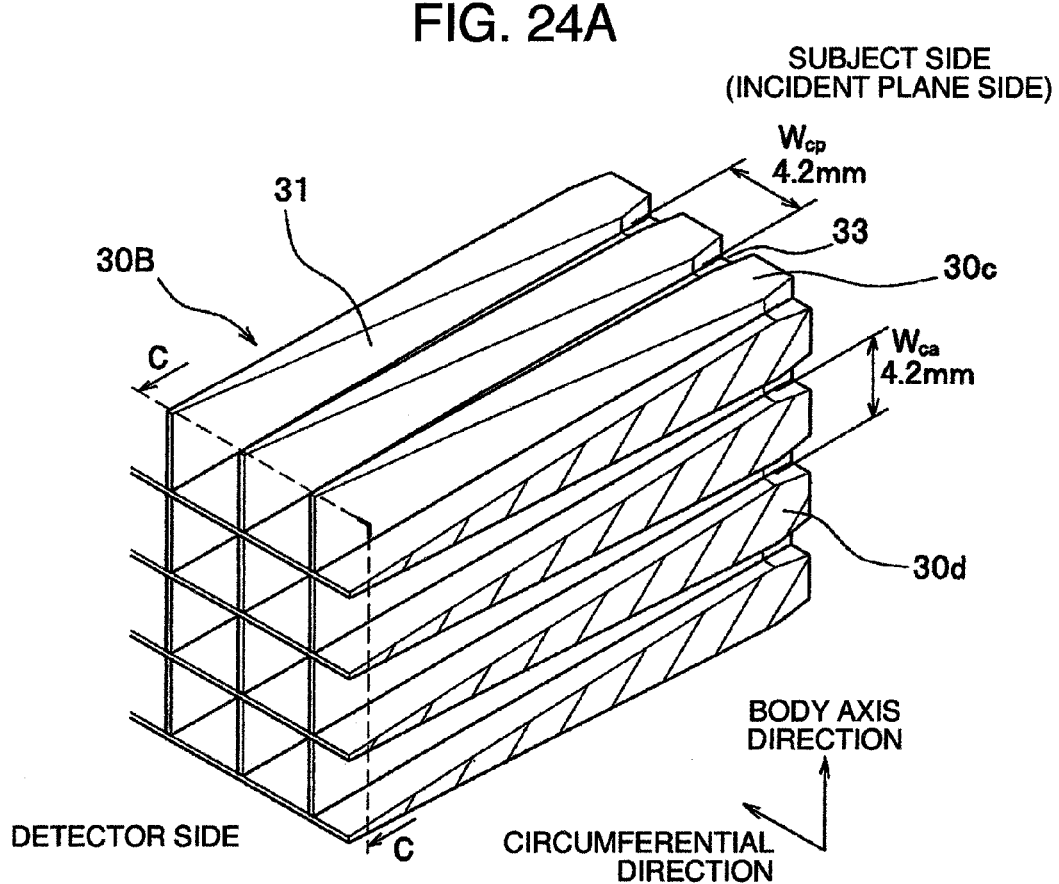
FIG. 24A illustrates structure of a collimator, and is a partial perspective view illustrating a radiation passage of a collimator.

Structure of a collimator 30B in the present embodiment is illustrated in FIG. 24A in a partial perspective view. In the present embodiment, likewise in the first embodiment, the collimator 30B is arranged in a shape including a plurality of pinhole collimators arrayed and arranged not only in the circumferential direction (the circumferential direction of the body axis of the subject 2) of the rotation center axis X1 but also in the axial direction (the body axis direction of the subject 2) of the rotation center axis X1. The collimator 30B is configured by collimator members 30c and 30d.

Here, the collimator members 30c and 30d are made of lead or tungsten and is desired to be made of highly hard tungsten, in particular, in the vicinity of the aperture 33 from the point of view of maintaining the hole shape.

Figure 24B:
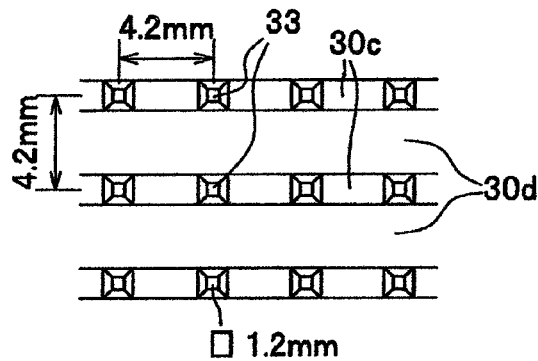
FIG. 24B illustrates structure of a collimator, and is a diagram illustrating a hole shape of an incident plane side.
Figure 24C:
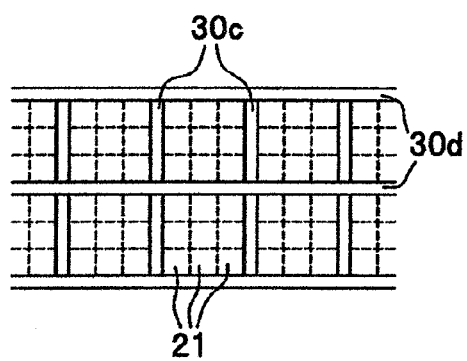
FIG. 24C illustrates structure of a collimator, and is a diagram illustrating a detector arrangement along the C-C arrows in FIG. 24A.

FIG. 24B is a diagram of the collimator 30B in view from the incident plane side. The aperture 33 has the hole width Dcp in the circumferential direction in the narrowest portion and the hole width Dca in the body axis direction both being 1.2 mm, that is, a rectangle with □1.2 mm in the position of the collimator hole center Pc and is arranged with pitches Wcp and Wca being 4.2 mm both in the circumferential direction and in the body axis direction (see FIG. 25 and FIG. 26). FIG. 24C is a diagram of the collimator 30B in view of the detector 21 along the C-C arrows in FIG. 24A. The detectors 21 are arrayed in one radiation passage 31 in the pitches of the detector width Wp and Wa in a 3×3 matrix in the body axis direction and the circumferential direction (see FIG. 25 and FIG. 26). The detector 21 is likewise in the first embodiment and includes CdTe semiconductor. As for the outside dimension thereof, the detector width Wp in the circumferential direction and the detector width Wa in the body axis direction are both 1.4 mm, for example (see FIG. 25 and FIG. 26).

Figure 25:
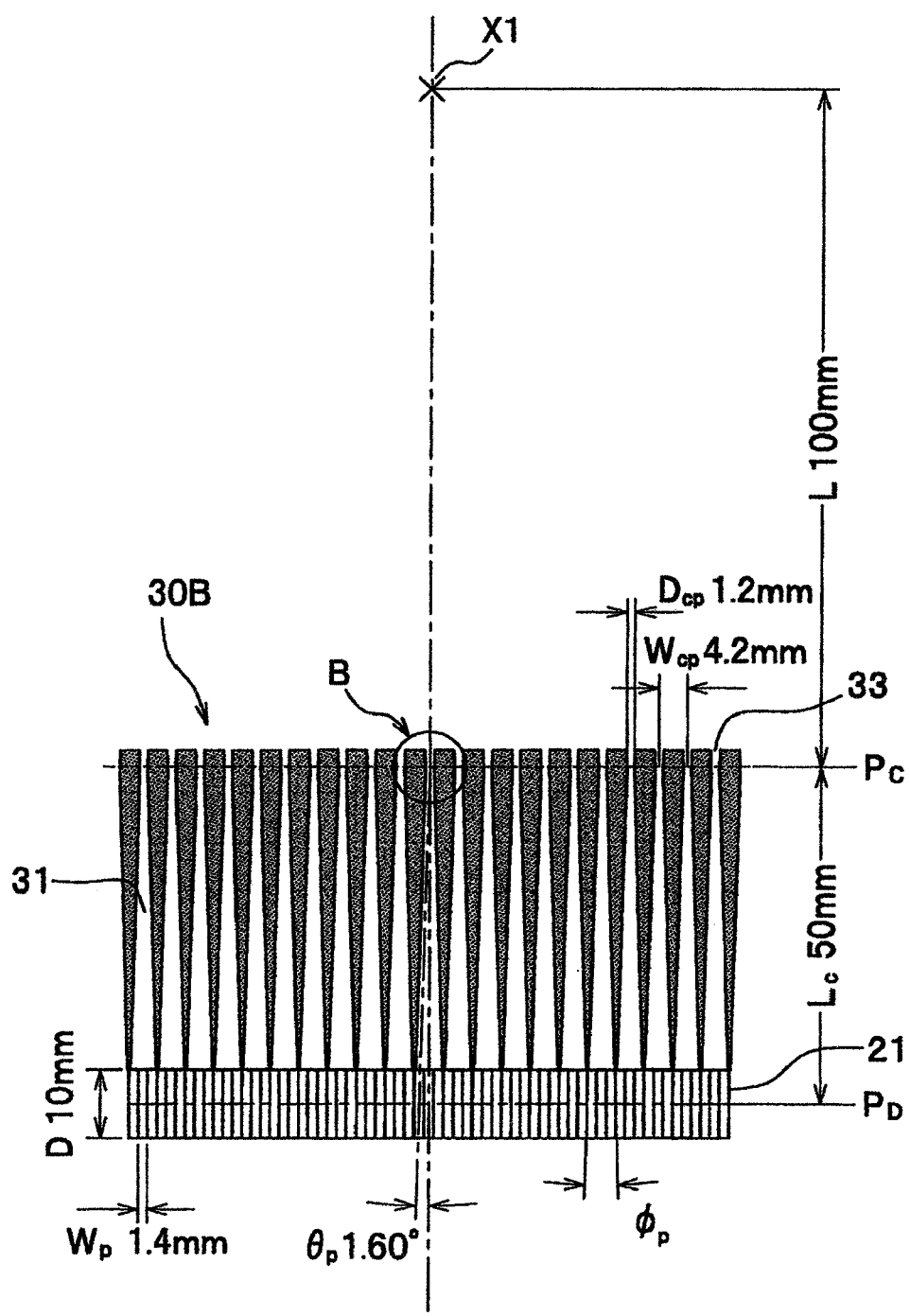
FIG. 25 is a section illustrating arrangement of radiation passages and detectors of a collimator in the circumferential direction.
Figure 26:
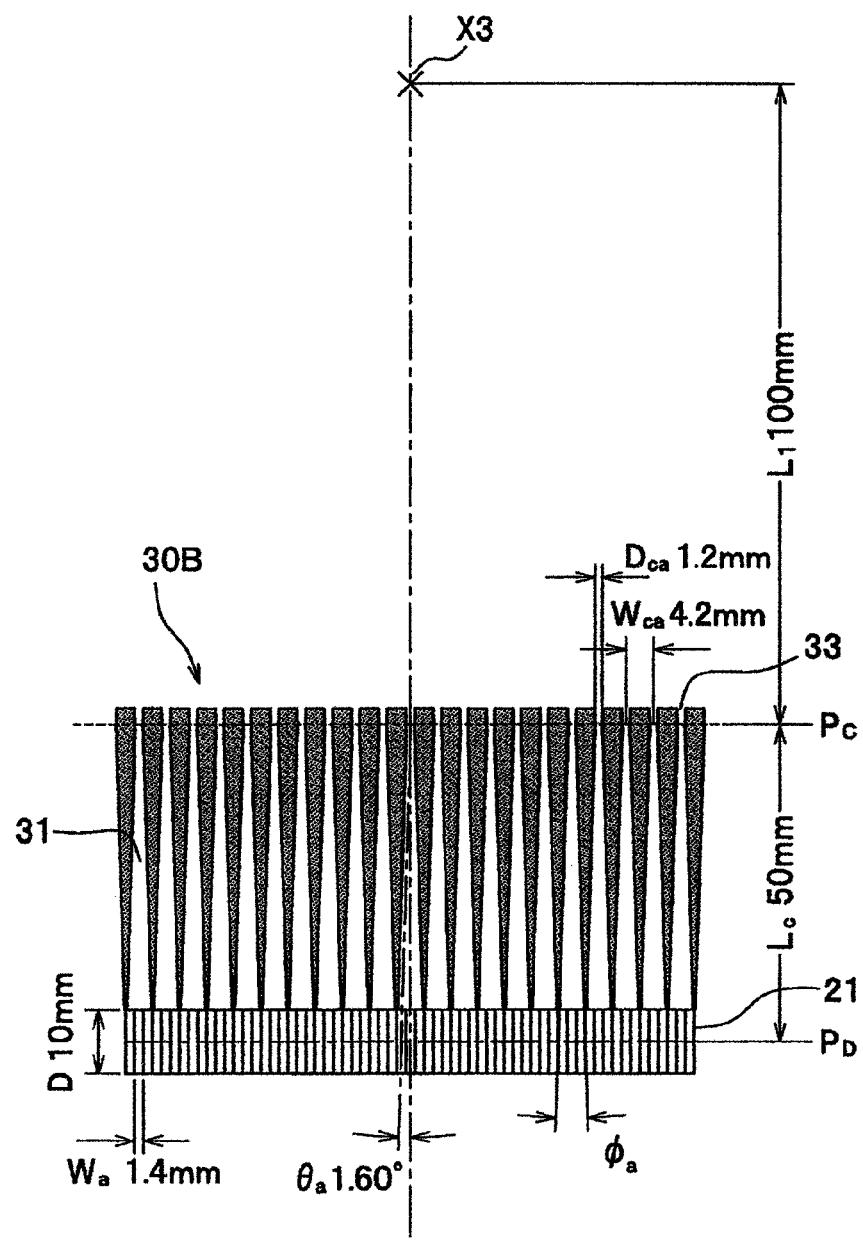
FIG. 26 is a section illustrating arrangement of radiation passages and detectors of a collimator in the body axis direction.

FIG. 25 and FIG. 26 illustrate a radius section in the body axis direction and a longitudinal section in the body axis direction in arrangement of the radiation passages 31 and the detectors 21 of the collimator 30B.

As illustrated in FIG. 25 and FIG. 26, the distance L between the rotation center axis X1 and the collimator hole center Pc and the distance $L_1$ between the rotation center axis X3 and the collimator hole center Pc is respectively the same 100 mm, for example. The distance Lc between the collimator hole center Pc and the detector effective center $P_D$ is 50 mm, for example.

Half values of the respective aperture angles $\phi_{1P}$ and $\phi_{1a}$ in the circumferential direction and in the body axis direction on the incident plane side of the aperture 33 are both 3.09°. Half values of the respective aperture angles φp and φa in the circumferential direction and in the body axis direction on the side of the detector 21 are both 1.72° as well. Enlargement in the portion B in FIG. 25 is the same as in FIG. 10E in the first embodiment. The enlarged view of the aperture in FIG. 26 will be omitted but is the same as in FIG. 10E and the reference numerals $\phi_{1P}$ and $\phi_{1a}$ should be replaced by φp and φa for rereading there. Respective setting on the hole width Dcp and Dca, the aperture angle $\phi_{1P}$ and $\phi_{1a}$ on the incident plane side, aperture angles φp and φa on the side of the detector 21, the detector width Wp and Wa, the distance Lc between the collimator hole center Pc and the detector effective center $P_D$ of the aperture 33 is made the same as in the concept described on the hole width Dcp and the aperture angles $\phi_{1P}$ and φp in the circumferential direction in the first embodiment.

In addition, the angle θp looking into the detector 21 in the center among the detectors 21 arrayed in the 3×3 matrix and the arrangement pitches of the respective detector effective center $P_D$ of the detectors 21 being adjacent each other in the circumferential direction thereof from the center $P_H$ not illustrated in the drawing of the hole width Dcp of the aperture 33 in the collimator hole center Pc to the radiation passage 31 is 1.60°. Likewise, the angle θa looking into the detector 21 in the center among the detectors 21 arrayed in the 3×3 matrix and the arrangement pitches of the respective detector effective center $P_D$ of the detectors 21 being adjacent each other in the body axis direction thereof from the center $P_H$ of the hole width Dca of the aperture 33 in the collimator hole center Pc to the radiation passage 31 is also 1.60°. Illustration is omitted, but as apparent with reference to FIG. 10A to FIG. 10D in the first embodiment, the viewing angle directed toward the detector 21 of each detection pixel through one radiation passage 31 is approximately equivalent viewing angle in the circumferential direction and the body axis direction for any detector 21.

(Image Configuring Method)

Next, a configuration of that collimator 30B and operations as well as image reconfiguring method of a nuclear medicine diagnosis instrument (gamma camera apparatus) 1B with arrangement of the detector 21 will be described briefly.

In the second embodiment, with the rotation center axis X1 of the camera part 11 in one camera position of angle in the circumferential direction of the rotation center axis X2, the state where the incident plane of the camera part 11 is directed inward along the rotation center axis X2 perpendicularly to the radius direction is taken as 0° in the circumferential direction for the rotation center axis X1 and the rotation center axis X3, and radio-graphing is carried out in the angle positions of −1.6°, 0° and +1.6° around the 0° as the center for the rotation center axis X1. Rotations in the circumferential direction of the rotation center axis X3 is combined therewith instead of combining 1.4 mm width movements of the camera part 11 in the Z1 direction in the first embodiment or 1.4 mm width movements of the bed part 12 in the Z2 direction.

Subjected to rotation in the circumferential direction of the rotation center axis X3, radio-graphing is carried out in the angle positions of −1.6°, 0° and +1.6° with 0° as the center.

In a nuclear medicine diagnosis instrument 1B of the present embodiment, with the γ-ray component entering from the direction perpendicular to the incident plane of the camera part 11 in the state where the incident plane of the camera part 11 makes 0° to the rotation center axes X1 and X3 is defined as "vertical component". Then, in the angle setting state of that incident plane, a plurality of units of projections in different directions including γ-ray components heading for the incident plane obliquely in the body axis direction and γ-ray components heading for the incident plane obliquely in the circumferential direction other than the "vertical component" are obtained. In addition, the above described "vertical component" enters, through the respective apertures 33, only one of the detectors 21 arranged in the circumferential direction and the body axis direction of the respective radiation passages 31.

Here, a feature of the present embodiment is to carry out radio-graphing even in the position subjected to rotation only by a predetermined step width θp or a step width θa with the position of the aperture 33 of the collimator 30B making 0° for the rotation center axis X1 and the rotation center axis X3 in order to displace the position of the aperture 33 of the collimator 30B in the circumferential direction and the body axis direction to gather outputs (radio-graphing distribution) of the detectors 21 based on "vertical component" in the respective camera positions.

With the distance Lc between the collimator center Pc and the detector effective center $P_D$ and the detector width Wp, the position of the rotation center axis X3 around which the camera part 11 rotates is determined by the expression (4) on integer n with the distance $L_1$ between the collimator hole center Pc and the rotation center axis X3. The integer n is n=2, for example. At that occasion, rotation takes place with the step width θa given by the expression (5) for the rotation center axis X1 and radio-graphing is carried out in the angle positions −θa, +0, −0 and θa.

$$L_1 = n \times Lc \quad (4)$$

$$\theta a = \tan^{-1}(Wa/Lc) \quad (5)$$

Here, n is an integer except multiples of detection pixel number (3 in this example) for one row in the body axis direction corresponding with one collimator hole. The reason why integer is taken is that the position of the rotation center axis X3 illustrated in the drawing can be on the detector side opposite against the incident direction of γ rays (n<0 to be taken into consideration).

Operations of radio-graphing in a predetermined angle position for the rotation center axis X1 in the present embodiment is the same as the operations described with reference to FIG. 11 to FIG. 18 in the first embodiment. In addition, operations of radio-graphing in a predetermined angle positions for the rotation center axis X3 in the present embodiment can be described by rereading the first embodiment by replacing the collimator 30A with a collimator 30B, the rotation center axis X1 with a rotation center axis X3, the detector width W with a detector width Wa and the angle θp with an angle θa.

At an occasion of radio-graphing projection image from one direction in the circumferential direction of the center axis X2 (second center axis), radio-graphing is carried out with a predetermined step width θp being 1.6°, for example, for the center axis X1 (first center axis) and a predetermined angle positions being −1.6°, 0° and +1.6°, for example, around the center axis X1. Moreover, radio-graphing is carried out with a predetermined step width θa being 1.6°, for example, for the center axis X3 (third center axis) and a predetermined angle positions being −1.6°, 0° and +1.6°, for example, around the center axis X3. Therefore, displacing, in the circumferential direction and the body axis direction, only thickness for the septum portion around the aperture 33 on the incident plane side of the radiation passage 31 and changing the incident plane angle, radio-graphing of projection from the middle and high energy γ-ray source can be carried out at high resolution. In the process of imaging the projection image from one direction of the rotation center axis X2, the nuclear medicine diagnosis instrument 1B with the present radiation imaging system 3B adopts a plurality of data sets having undergone radio-graphing in a plurality of angle positions for the center axis X1 and the center axis X3. Therefore, the effect of the septum shadow is small and images with equivalent space resolution for low energy γ rays can be obtained without relying on the energy level of the detection incident γ ray.

(Advantages)

As described above, according to the radiation imaging system 3B of the present embodiment, the advantages obtained with the first embodiment in the circumferential direction can be obtained in the body axis direction as well. In addition, the space resolution in the circumferential direction is equal to the space resolution in the body axis direction. Therefore, radio-graphing can be carried out with nearly the same level of high space resolution as low energy γ-ray radio-graphing in high energy γ-ray radio-graphing in the circumferential direction and the body axis direction. Consequently, no decrease in sensitivity for the septum projection area portion between the radiation passages 31 occurs. Thereby a nuclear medicine diagnosis instrument without any occurrence of decrease in sensitivity can be provided.

Likewise the first embodiment, the collimator requiring no change corresponding with γ-ray energy, that is, relying on no γ-ray energy as an object for radio-graphing is obtained but can obtain space resolution equivalent to the high resolution collimator for low energy γ rays with high energy γ-ray radio-graphing.

If the step width θp is set so that the projection lines are arrayed in the interval of the detector width Wp on a flat plane parallel to the detector 21 at the collimator hole center Pc apart from the position of the rotation center axis X1 by distance L in FIG. 25 of the present embodiment, then, even if the value of the integer m determined by the expression (2) is changed in the distance L, that is, even if the distance L is set not to 100 mm described in FIG. 25, but to 50 mm and 200 mm, a projection image in the interval of 1.4 mm is likewise obtained.

Likewise, if the step width θa is set so that the projection lines are arrayed in the interval of the detector width Wa on a flat plane parallel to the detector 21 at the collimator hole center Pc apart from the position of the rotation center axis X3 by distance $L_1$ in FIG. 26 of the present embodiment, then, even if the value of the integer n determined by the expression (4) is changed in the distance $L_1$, that is, even if the distance $L_1$ is set not to 100 mm described in FIG. 26, but to 50 mm and 200 mm, a projection image in the interval of 1.4 mm is likewise obtained.

Here, the rotation center axis X1 and rotation center axis X3 is arranged on the incident plane side in the present embodiment but will not be limited thereto. The rotation center axis X1 and the rotation center axis X3 can be provided in the position apart from the collimator hole center Pc to the side of the detector 21 by distance L and distance $L_1$ determined by the expression (4). In addition, the distance L and the distance $L_1$ can be the same value and can be different values.

(Simple Method of Usage as SPECT Apparatus)

Here, an optimum method of usage as a SPECT apparatus will be described in detail with the third embodiment, but the nuclear medicine diagnosis instruments 1A and 1B in the first embodiment and the second embodiment can be used not only as a gamma camera apparatus generating a flat plane projection image but also as a SPECT apparatus generating a tomographic image in principle. In that case, in order to obtain the same high resolution SPECT image (tomographic image) as the above described high resolution plat plane projection image, when radio-graphing is carried out in one projection direction with the incident plane of the camera part 11 being kept parallel to the rotation center axis X2 and the camera part 11 being positioned in an angle position with a predetermined step width $θ_{SPECT}$ based on an expression (7) to be described later around the rotation center axis X2, the camera part 11 is rotated to the respective positions of −θp, 0° and +θp for the rotation center axis X1 to carry out radio-graphing. Thus, the camera part 11 is gyrated around the rotation center axis X2 to alternately repeat to continue radio-graphing and, thereafter, move the bed 12 in the Z2 direction by the distance for the portion of a detection pixel (=detector width Wa).

The order of gyration around the rotation center axis X2 of the camera part 11 and rotation to a predetermined angle around the rotation center axis X1 at an occasion of radio-graphing in a predetermined angle position around the rotation center axis X2 is not limited to the foregoing but can be an order of fixing the camera part 11 in an angle position around a predetermined rotation center axis X1 and thereafter fixing the camera part 11 in an angle position around another predetermined rotation center axis X1 after radio-graphing around the rotation center axis X2 to carry out radio-graphing around the rotation center axis X2.

In the case of carrying out SPECT radio-graphing as described above in the second embodiment, the camera part 11 is not rotated around the rotation center axis X3 but the bed 12 carrying an examined body 2 likewise in the third embodiment is gyrated every one pixel, that is, moved in the body axis direction by the width Wa being 1.4 mm so that the camera part 11 is gyrated in the periphery of the body axis to carry out radio-graphing. Thereby data of the projection line being oblique in the direction of the body axis can be obtained, giving rise to highly dense data and improving space resolution in the body axis direction as well.

In the case of usage as that SPECT apparatus, the data processing apparatus 5 stores three radio-graphing data sets in the −θp, 0° and +θp angle positions of the rotation center axis X1 for one angle position around the rotation center axis X2 and extracts the above described "vertical component" of the gamma rays in one angle position around the rotation center axis X2 to the incident plane of the camera part 11 from the three radio-graphing data in the −θp, 0° and +θp angle positions of the rotation center axis X1 to carry out imaging processing on the tomographic images. That is, the image processing part of the data processing apparatus 5 extracts the above described "vertical component" to the incident plane of the camera part 11 out of the three data sets in the −θp, 0° and +θp angle positions of the rotation center axis X1 for one angle position around the rotation center axis X2 to store the "vertical component" as a sinogram data set for one angle position around the rotation center axis X2 to store the "vertical component" in the memory part. That procedure is carried out on the angle position around each rotation center axis X2; the sonogram data set for the whole circumference around the rotation center axis X2 is accumulated in the memory part; and thereafter a SPECT image (tomographic image) is generated based on the accumulated sonogram data set for the whole circumference around the rotation center axis X2.

Third Embodiment

Figure 27:
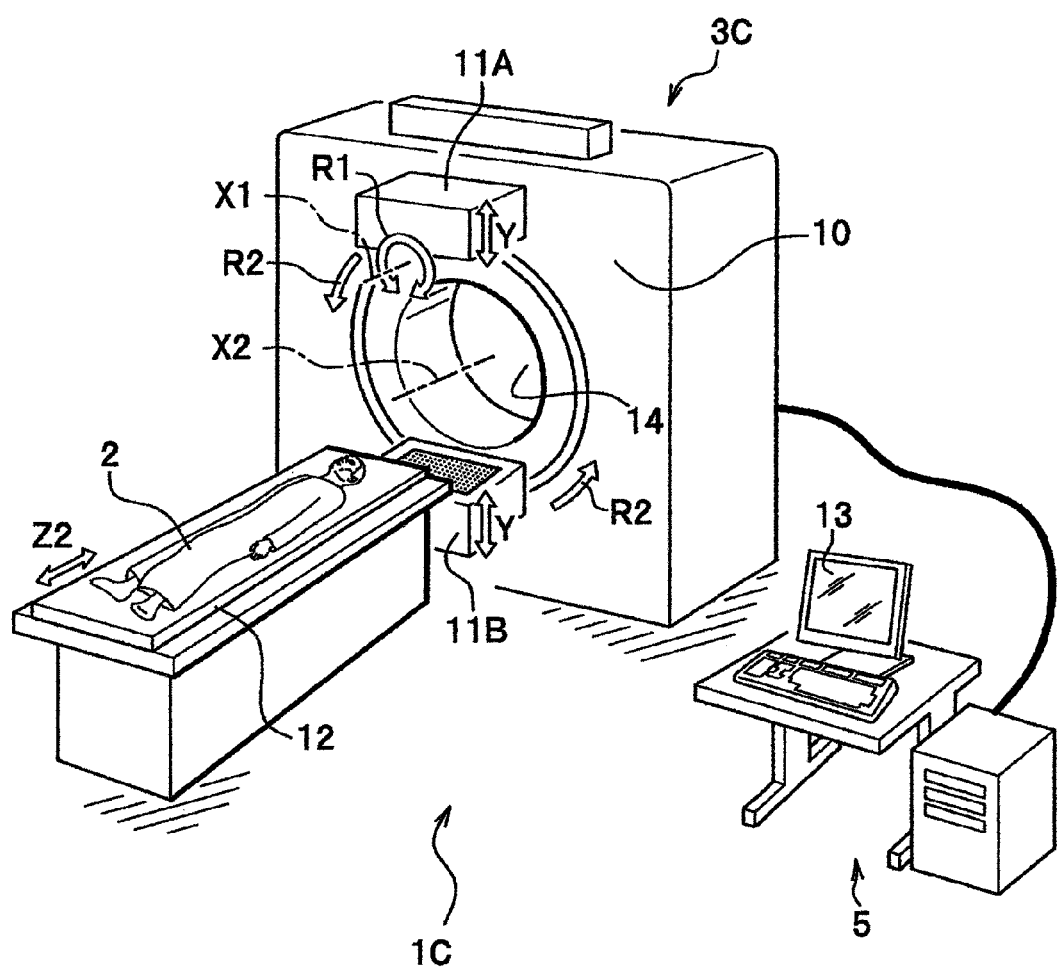
FIG. 27 is an entire perspective view illustrating a nuclear medicine diagnosis instrument (SPECT apparatus) according to a third embodiment of the present invention.

Next, an optimum method of usage of a SPECT apparatus being a nuclear medicine diagnosis instrument related to a third embodiment of the present invention will be described with reference to FIG. 27 and FIG. 28.

A radiation imaging system 3C of a nuclear medicine diagnosis instrument 1C of the present embodiment is basically the same as in the first embodiment, but the third embodiment is different from the first embodiment in the shape of the collimator 30C, the method of radio-graphing and that the camera part 11 does not move in the direction designated by the arrow Z1 in the first embodiment. As for the same configuration, like reference characters designate the same or similar parts throughout the figures thereof to omit the repetition of the same description.

The collimator 30C in the present embodiment is similar to the collimator 30A illustrated in FIG. 8 in the first embodiment in shape, but is different from the collimator 30A of the first embodiment in the rotation center at the time of radio-graphing of the camera part 11, which is moved from the rotation center axis X1 to the rotation center axis X2. That is, in FIG. 11 to FIG. 18, the rotation center axis X1, the collimator 30A and the distance L are respectively replaced by the rotation center axis X2, the collimator 30C and the distance $L_{SPECT}$ for rereading. In addition, respective setting on the aperture angle $\phi_{1P}$ on the incident plane side of the aperture 33 and aperture angle $\phi p$ on the detector side is made the same as in the concept described in the first embodiment with reference to FIG. 10A to FIG. 10D.

The hole width Dcp in the circumferential direction and the hole width Dca in the body axis direction of the aperture 33 is respectively 1.2 mm and 1.4 mm, for example. The pitch Wcp in the circumferential direction and the pitch Wca in the body axis direction of the aperture 33 are respectively 4.2 mm and 2.8 mm, for example.

As for the detector 21, which includes CdTe semiconductor, the outside dimension is the same as in the first embodiment and the detector width Wp in the circumferential direction and the detector width Wa in the body axis direction are both 1.4 mm, for example, and the depth length D of the detector 21 is 10 mm, for example.

Figure 28:
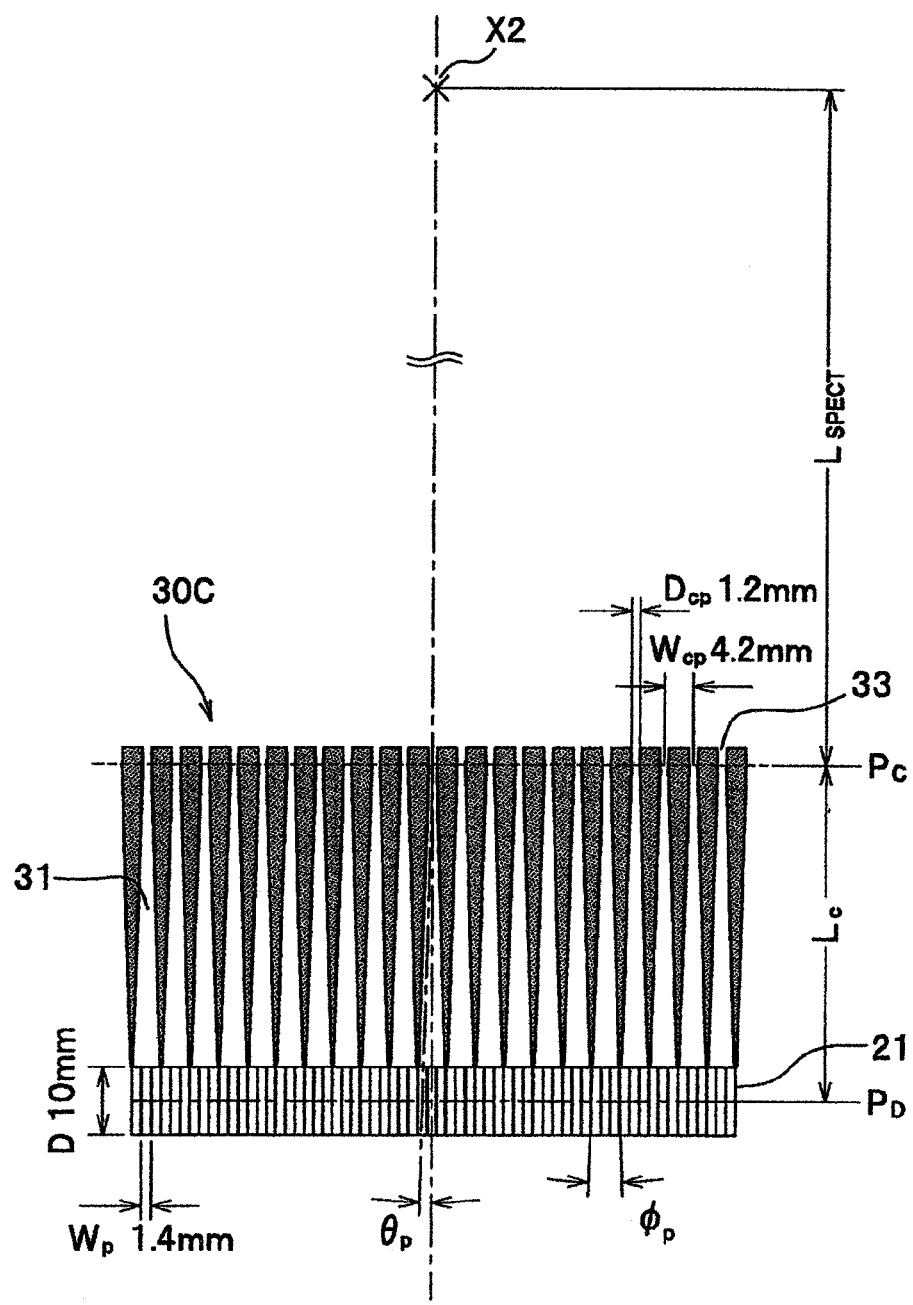
FIG. 28 is a section illustrating arrangement of radiation passages and detectors of a collimator in the circumferential direction.

At the time of SPECT radio-graphing, as illustrated in FIG. 28, the distance $L_{SPECT}$ between the rotation center axis X2 and the collimator hole center and the collimator length Lc keep establishing the relation in an expression (6) so that the angle position around the body axis is determined with the step width $\theta_{SPECT}$ (=$\theta p$) described in an expression (7) to carry out radio-graphing. It is not necessary to rotate the camera part 11 for the rotation center axis X1 as in the embodiment with a gamma camera. The rotation center axis X2 works as the rotation center axis X1 so that only gyration is satisfactory for the rotary action of the camera part 11 for the purpose of normal SPECT radio-graphing.

$$L_{SPECT}=m'\times Lc \qquad (6)$$

$$\theta_{SPECT}=\theta P=\tan^{-1}(Wa/Lc)\approx Wp/Lc \qquad (7)$$

Here, m' is a natural number except multiples of detection pixel number (3 in this example) for one row in the circumferential direction corresponding with one aperture 33. The reason thereof is that, in the case of m'=3, for example, when radio-graphing takes place in an angle position with the step width $\theta_{SPECT}$ around the rotation center axis X2, the positions in the circumferential direction of the projection line oblique to the incident plane of the camera part 11 in the angle positions before and after a predetermined angle position will overlap on the projection line in the front direction of the camera position in the above described predetermined angle positions.

Next, arrangements of the rotation center axis X2, effects of the step width $\theta_{SPECT}$ and an image reconfiguring method will be described.

At SPECT radio-graphing with a normal parallel hole collimators, projection of the γ-ray components perpendicular to the incident plane of the camera part 11 is obtained for an angle position (rotation step) being one camera position for the rotation center axis X2 of the camera part 11. In the present embodiment, as described in the first embodiment with reference to FIG. 11 to FIG. 15, γ-ray components of a plurality of projection lines in different directions in the circumferential direction in one camera position can enter one radiation passage 31 so that the detector 21 corresponding to the individual projection line thereof obtains radio-graphing distribution. The γ-ray components of the projection lines perpendicular to the incident plane of the camera part 11 are obtained by the detectors 21 in the skipping positions in the circumferential direction.

As described in the first embodiment, for a predetermined rotation step, the projection line obtained before and after the rotation step thereof in the diagonal circumferential direction complements just the skipping projection line in the camera position of the above described certain predetermined rotation step in the circumferential direction perpendicular to the incident plane of the camera part 11. That is, with $\theta_{SPECT}=\theta p$, in the image processing part of the data processing apparatus 5, as described in the first embodiment with reference to FIG. 11 to FIG. 18 inclusive, in the angle position θX° in one circumferential direction for the rotation center axis X2, the "vertical component" of γ rays entering the incident plane of the camera part 11 directed perpendicularly to the radius direction is added to the angle position θX°. By extracting the "vertical component" data in the position of the angle position θ° out of the data set having undergone radio-graphing in the angle positions of (θX−θp)° and (θx+θp)° before and after the angle position θX°, one projection data set in the sinogram data can be obtained. That procedure is carried out on the above described predetermined angle position around each rotation center axis X2; the sinogram data set for the whole circumference around the rotation center axis X2 is accumulated in the memory part; and thereafter a SPECT image (tomographic image) is reconfigured based on the accumulated sinogram data set for the whole circumference around the rotation center axis X2.

Thus obtained sinogram data set will become the same as the projection data equivalent to the parallel hole collimator in all the directions. Radio-graphing is carried out only by rotating in the periphery of the subject 2. Without being different from a normal SPECT apparatus, there is no difference in time required for radio-graphing of one round.

The angle sampling number (rotation step number) N required for image reconfiguration for the SPECT apparatus N is desired to be not less than N derived by the following expression (8) with the pixel size of an image being Sa(mm) and view diameter being $D_{FOV}$ (mm)

$$N=\pi \cdot D/2Sa \quad (8)$$

Here, the pixel size Sa(mm) does not necessarily have to be equal to the detector size Wp.

The maximum value θmax (rad) of the step width at that occasion is derived by the following expression (9).

$$\theta max=2\pi/N=4Sa/D_{FOV} \quad (9)$$

Basically, it is necessary to collect sinogram data with an angle step of not more than the maximum value θmax of the step width. Now, taking the rotation radius of the camera with the rotation center axis X2 being $L_{SPECT}$, $D_{FOV}=2L_{SPECT}$. The maximum value θmax is rewritten as the following expression.

$$\theta max=2Sa/L_{SPECT} \quad (10)$$

Sampling at angles not more than the maximum value θmax is a requirement for image reconfiguration with the pixel size Sa.

Accordingly, a condition for image reconfiguration in the present embodiment is $\theta_{SPECT}=\theta p \leq \theta max$, that is, as follows based on the expression (7) and the expression (10).

$$L_{SPECT} \leq (2Sa/Wp) \times Lc \quad (11)$$

However, the SPECT total space resolution Rt(mm) of the SPECT image is derived by the following expressions (12) and (13) with system resolution Rs(mm) of the camera part 11 and the pixel size Sa.

$$Rt=(Rs^2+Sa^2)^{1/2}=(Ri^2+Rg^2+Sa^2)^{1/2} \quad (12)$$

$$Rs=(Ri^2+Rg^2)^{1/2} \quad (13)$$

where Ri is an intrinsic resolution of the detector 21 and Rg is geological resolution of the collimator 30C.

Based on that expression, as the pixel size Sa gets smaller, the total space resolution Rt gets closer to the system resolution Rs and the image quality gets better. However, the small pixel size Sa will increase in rotation step number to lengthen the data collection time (radio-graphing time). Normally, as requirement from the sampling theorem, the pixel size Sa of the SPECT image is required to be a value not more than ½ of the system resolution Rs. For not a pixel type detector but a conventional scintillator detector, the pixel size Sa is determined by selecting a predetermined matrix size (for example, 128×128 matrix) becoming the pixel size Sa close to the half value of the system resolution Rs. With that matrix size, the pixel size Sa will become around 4 mm.

On the other hand, in the case of a pixel type detector 21, the minimum feasible pixel size Sa is Wp and the multiples thereof will be selected. On the condition that the pixel size is Sa=Wp (=1.4 mm), the relation of $L_{SPECT} \leq 2Lc$ needs to be fulfilled based on the expression (11). In the case of the pixel size Sa=2Wp (=2.8 mm), the relation will fall within the range of $L_{SPECT} \leq 4Lc$. For example, with Lc=50 mm, the value of $L_{SPECT}=200$ mm can be obtained. That size is enough to cover a head part.

That $\theta_{SPECT}=\theta p$ at that occasion is 1.6° likewise the first embodiment and fulfills the maximum value θmax of the step width being a requirement of the image reconfiguration and a condition equivalent to the parallel collimator for radio-graphing for one round around the rotation center axis X2.

Moreover, in the case of Sa=3Wp (=4.2 mm), $L_{SPECT} \leq 6Lc$ is derived. In the case of Lc=50 m, $L_{SPECT}=300$ mm is derived to enable the size that can accept a body to be secured. High energy γ-ray radio-graphing can obtain nearly the same image as a conventional LEHR even with as well.

Here, in the case of causing the camera part 11 to orbit in the circumferential direction of the body axis as that SPECT apparatus, the bed 12 is moved stepwise in the body axis direction only by a predetermined width, that is, a detection width Wa, for example, to carry out radio-graphing. Thereby, influence of the shadow due to the collimator member 30b of the collimator 30C can be alleviated so that an image with high resolution can be obtained also in the body axis direction.

(Advantages)

In the radiation imaging system 1C of the present embodiment, one detector 21 corresponds to one detection pixel. By time-sharing the diagonal incident γ rays on the rotation step basis to reconfigure the discrete position information of the detector 21 and the incident γ rays into the adjacent detectors 21 within an ignorable range, the number of the aperture 33 of the collimator 30C can be reduced without deteriorating resolution. Consequently, since the distance between the adjacent holes is wide, the same advantages as securing sufficient septum thickness are provided to restrain penetration sufficiently. Thereby, high resolution can be attained even with high energy γ rays.

Thus, as the largest advantage of the present invention is that influence of septum thickness being the essential factor for necessity for changing the collimator with γ-ray energy can be excluded, that is, the collimator not relying on the γ-ray energy as the radio-graphing object will be obtained so that space resolution equivalent to high resolution collimator for low energy γ rays even at high energy γ-ray radio-graphing can be obtained.

That means that, in the γ rays with possibility for use in radio-graphing, the collimator 30C with septum thickness corresponds with the γ rays with the maximum energy and, thereby there is no need to select collimators inferior in resolution in conformity with high energy nuclide for radio-graphing with a plurality of different γ-ray energies, either, and there is no need to exchange the troublesome collimators according to energy ranges.

In addition, incident area loss for the dead space having taken place due to the septum is eliminated to improve sensitivity. Of course, no sensitivity unevenness due to shadows of septum takes place.

According to the present embodiment, the aperture 33 can be made small. Therefore, high energy γ-ray radio-graphing with nearly the same high space resolution as for the low energy γ-ray radio-graphing can be carried out.

In the present embodiment, in one angle position in the circumferential direction of the rotation center axis X2 as in FIG. 11, a plurality of units of projections in different directions including the γ-ray component heading for the incident plane diagonally in the circumferential direction as illustrated in FIG. 11 other than the direction perpendicular to the incident plane of the camera part 11 are obtained. However, that γ-ray component diagonally heading for the incident plane is utilized as "vertical component" in the adjacent angle position in the circumferential direction. Therefore, the step width $\theta_{SPECT}$ undergoing sampling is the same as the normal LEHR and parallel hole collimator. Accordingly, at an occasion of SPECT radio-graphing, time required for going around the body axis once, that is, by 360° is the same as in the case of the normal LEHR parallel hole collimator.

Figure 22:
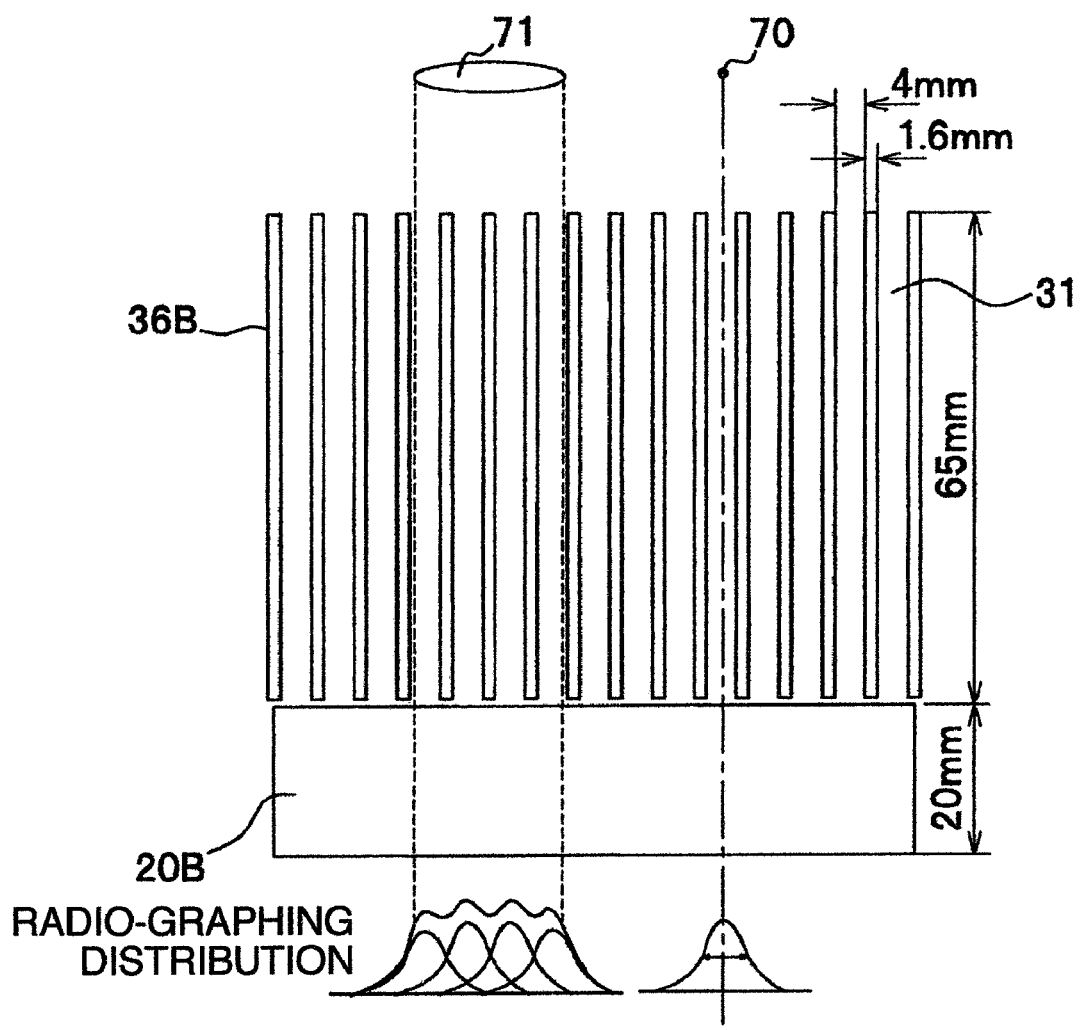
FIG. 22 is a diagram describing an example of an radio-graphing distribution in the case of radio-graphing with an NaI scintillator using a parallel hole collimator (high energy-general purpose: HEGP) illustrated as a reference as a comparative example.

Compared with the parallel hole collimator for high energy γ rays, aperture area loss due to septum thickness does not influence to improve sensitivity. Therefore the period for radio-graphing can be shortened. For example, in the HEGP parallel hole collimator 36B illustrated in FIG. 22, as large as approximately 50% of the area is lost due to septum. Only by effectuating that portion, in the hole diameter of the same aperture, improvement with approximately twice better sensitivity is expected to enable the radio-graphing period to drop to half. The hole diameter of the aperture can be made small. Therefore, high energy γ-ray radio-graphing with nearly the same high space resolution as for the low energy γ-ray radio-graphing can be carried out. As for the body axis direction, the structure is the same as in the case of the normal parallel hole collimator. Therefore space resolution likewise in the parallel hole collimator is obtained.

In addition, in FIG. 28, the projection line is aligned on a plane parallel along the detector 21 with the collimator hole center Pc apart from the position of the rotation center axis X2 only by distance $L_{SPECT}$ in an interval of the detector width Wp. That is, setting $L_{SPECT}$ as designated by $L_{SPECT}$=m'×Lc described in the expression (6), even if the value of the integer m' is changed, that is, only the $L_{SPECT}$, for example, is further lengthened individually, and otherwise shortened on the contrary, the likewise entire projection in 1.4 mm interval is obtained.

Also in the present embodiment, the present nuclear medicine diagnosis instrument 1C can be used for generation a plane projection image as a gamma camera apparatus. For example, suppose that the rotation center axis X1 is provided on the side of the detector 21 for the collimator hole center Pc and the distance L between the rotation center axis X1 and the collimator hole center Pc is the same as the distance Lc, the nuclear medicine diagnosis instrument can be used as a gamma camera apparatus for generating a plane projection image likewise in the first embodiment. In that case, by radio-graphing at three points of −θp, 0, +θp around the rotation center axis X1 for one position at any angle in the circumferential direction of the rotation center axis X2, a plane projection image as a gamma camera apparatus can be generated as well likewise in the case of the first embodiment.

Variation of Third Embodiment

Next, a first variation in the present embodiment will be described. In the variation, instead of the collimator 30C used in the present embodiment, the detector 21 is arrayed in 3×3 in the pitches of the detector width Wp and Wa in the body axis direction and the circumferential direction for one radiation passage 31 being a collimator in the second embodiment shaped similar to the collimator 30B illustrated in FIG. 24 but different in the length Lc. Consequently, the aperture angles $\phi_{1P}$ and $\phi_{1a}$ on the incident plane side, the aperture angles φp and φa on the detector side and the angle θp are different from the second embodiment in values. The hole width Dcp in the circumferential direction and the hole width Dca in the body axis direction of the aperture 33 are 1.2 mm, for example. The pitch Wcp in the circumferential direction and the pitch Wca in the body axis direction of the aperture 33 are 4.2 mm, for example.

CdTe semiconductor was used in the detector 21 and the outside dimension is the same as in the first embodiment, that is, the detector width Wp in the circumferential direction and the detector width Wa in the body axis direction are both 1.4 mm, for example. The depth length D of the detector 21 is 10 mm, for example.

The configuration of the collimator in the body axis direction in the present variation is likewise the configuration of the collimator 30C in the circumferential direction. Therefore, causing the camera part 11 to orbit in the circumferential direction of the body axis by a predetermined step width $\theta_{SPECT}$ to carry out radio-graphing, and thereby the detector 21 will take in the components of γ rays entering diagonally in the body axis direction. Under the circumstances, providing the camera part 11 with the rotation center axis X3 as the rotation center likewise the second embodiment and with θa=θp, the angle position in the circumferential direction of the rotation center axis X3 is fixed at −θa, 0, +θa to cause the camera part 11 to rotate around the body axis to carry out radio-graphing. Then the data processing apparatus 5 can take out "vertical component" (outward component in the diameter direction of the rotation center axis X2) of γ ray in section in the body axis direction to carry out image reconfiguration.

However, that radio-graphing will result in the same image having undergone radio-graphing on basis of the detector 21 by moving the bed 12 carrying the subject 2 in the third embodiment on one pixel basis, that is, 1.4 mm in the body axis direction to gyrte the camera part 11 around the body axis to carry out radio-graphing.

However, without providing three steps in a predetermined angle position around the rotation center axis X3 in a series of radio-graphing in predetermined angle positions in the circumferential direction in one position in the body axis direction, but by utilizing detection signals of γ rays entering diagonally in the body axis direction, tomographic image with sufficient accuracy can be obtained. Therefore, radio-graphing is feasible also in the case where the camera part 11 is fixed in the 0° angle position for the rotation center axis X3. In that case, not by causing the camera part 11 to rotate around the rotation center axis X3 but by moving the bed 12 carrying the subject 2 likewise in the third embodiment on one pixel basis, that is, the detector width Wa of 1.4 mm in the body axis direction to gyrate the camera part 11 around the body axis to carry out radio-graphing, the data of the projection lines diagonal in the body axis direction can be obtained. Therefore, more highly dense data will become available to improve space resolution in the body axis direction.

Figure 29:
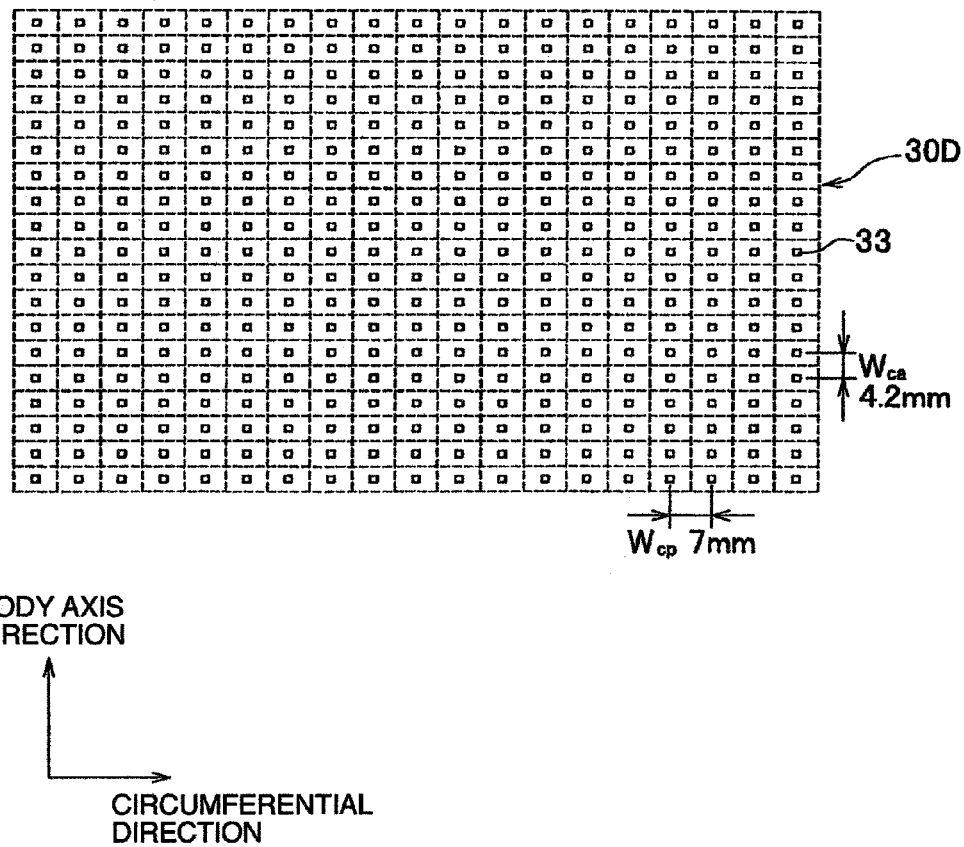
FIG. 29 is a diagram illustrating a second variation of a collimator in the third embodiment.

A collimator 30D of a second variation different from the first variation in shape is illustrated in FIG. 29. For the collimator 30D, the pitch Wcp in the circumferential direction and the pitch Wca in the body axis direction of the aperture 33 are respectively 7 mm and 4.2 mm. In that case, detectors 21 with detector width Wp=Wa=1.4 mm are omitted from illustration but are arranged in a 5×3 matrix with five units in the circumferential direction and three units in the body axis direction on the detector side of the radiation passage 31. Thereby, the number of the aperture 33 can be reduced so as to reduce production costs for the collimator.

Figure 30:
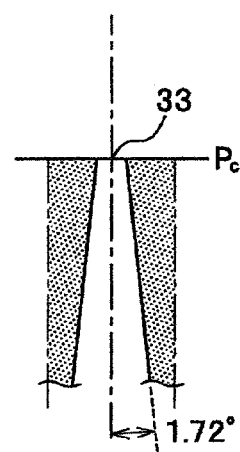
FIG. 30 is a diagram describing a variation of an aperture of a collimator.

Here, the aperture 33 of the collimators 30A, 30B, 30C and 30D of the first embodiment to the third embodiment and the variations thereof has aperture angle on the both of the incident plane side and the detector side of the collimator hole center Pc but will not be limited thereto. As illustrate in FIG. 30, only the detector side can be allowed to have an aperture angle.

In addition, the hole shape of the aperture 33 has been described as a rectangle but will not be limited thereto, but a circle or an oval is acceptable. However, the interior of the detector 21 will include a portion not contributing to radio-graphing and, therefore, rectangular holes are desired. Moreover, arrangement in the body axis direction and the circumferential direction of the radiation passages 31 of the collimators 30A, 30B, 30C and 30D is a rectangular grid array of, but will not be limited thereto. For example, the collimators in displacement alternately by half a value of width of the pitch Wcp in the circumferential direction in the body axis can be arranged to obtain a triangular grid array.

Fourth Embodiment

Next, a fourth embodiment in the case of applying the structure of the collimator 30A in the first embodiment for low energy γ-ray radio-graphing will be described. The present embodiment combines the collimators for low energy γ rays to be described below for use in a nuclear medicine diagnosis instrument in the first embodiment and the third embodiment.

Figure 31:
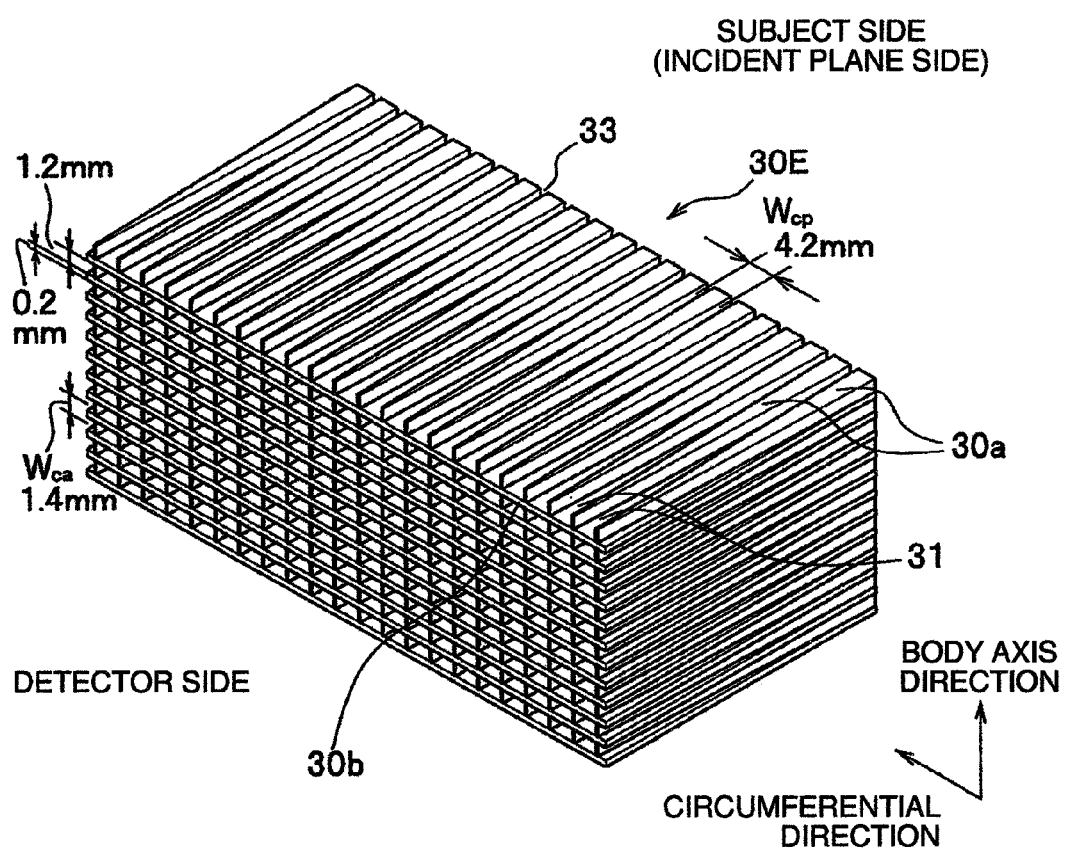
FIG. 31 is a diagram illustrating a collimator in a fourth embodiment.

As illustrated in FIG. 31, the collimator 30E is obtained by applying the collimator 30A illustrated in FIG. 8 for high energy γ rays to the collimator for low energy γ rays. Thickness of the collimator member 30b is 0.2 mm. The pitch Wcp in the circumferential direction and the pitch Wca in the body axis direction of the aperture 33 are respectively 4.2 mm and 1.4 mm. In the case of radio-graphing on the low energy γ rays, the fourth embodiment is applicable instead of the collimators 30A and 30C of the nuclear medicine diagnosis instrument of the first embodiment and the third embodiment.

Fifth Embodiment

Next, a fifth embodiment of the present invention will be described. In the present embodiment, instead of the collimators 30A to 30E inclusive in the nuclear medicine diagnosis instruments in the first embodiment to the fourth embodiment inclusive, the collimators structured as illustrated in FIG. 32 to FIG. 35 inclusive are applied.

The collimators 30A to 30E inclusive in the first embodiment to the fourth embodiment inclusive include the radiation passages 31 with the whole side walls configured by the collimator members 30a and 30b or the collimator members 30c and 30d made of shield metal material, that is, lead and tungsten, for example, but will not be limited thereto. With the collimators for the low energy γ rays as an example, a collimator configured by stacking a first stage collimator member to be described later, a middle stage collimator member and a final stage collimator member will be described below. Since the collimator is for low energy γ rays, the detector depth length is 5 mm (approximately equivalent to 8 mm in the NaI scintillator).

Figure 32:
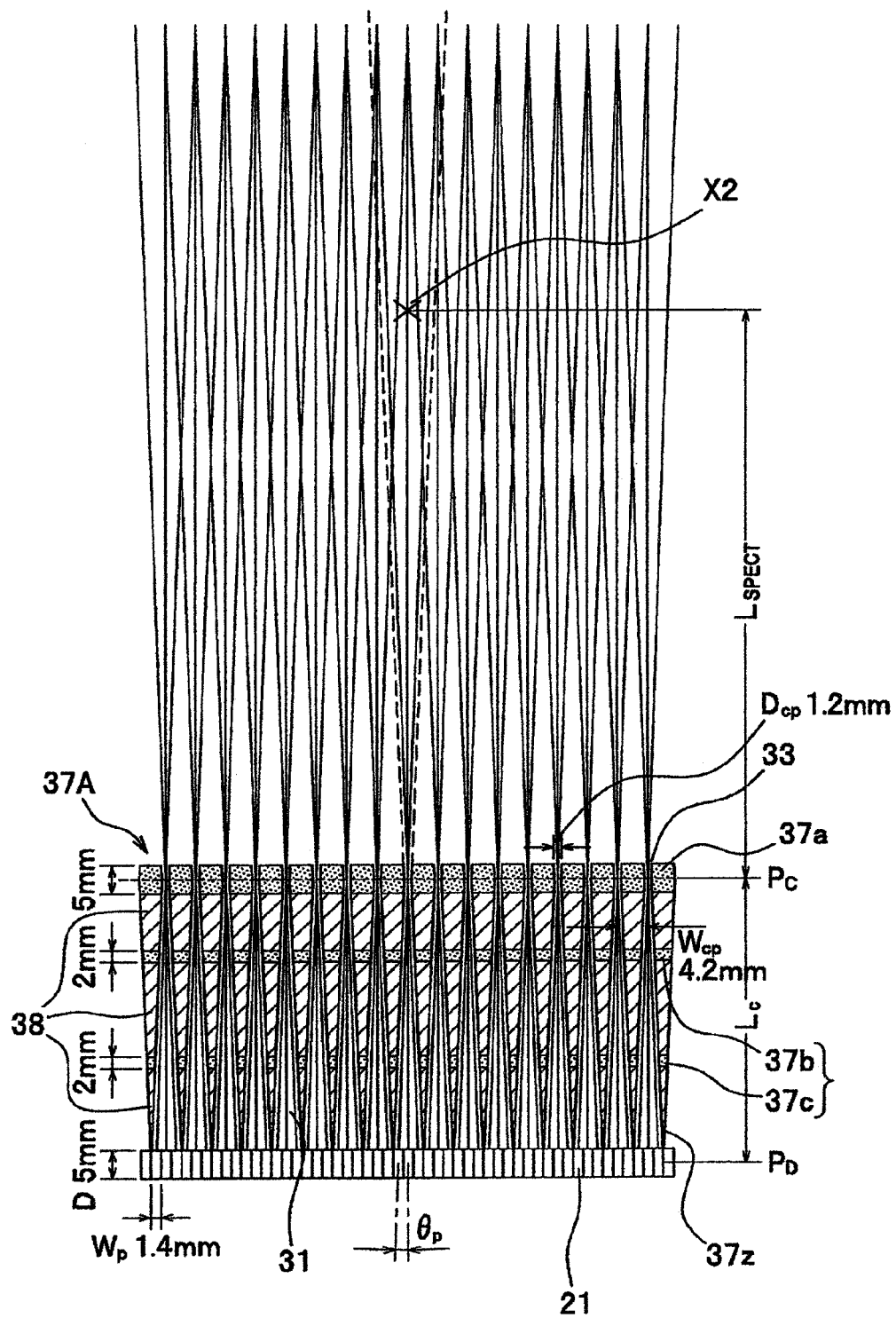
FIG. 32 is a diagram illustrating a collimator in the fifth embodiment.

A collimator 37A illustrated in FIG. 32 is configured by a first stage collimator member 37a configured by tungsten on the γ-ray incident side, a middle stage collimator member 37b, 37c configured by a plurality of lead sheets between the first state collimator member and a final stage collimator member 37z configured by lead on the side of the detector 21 and a spacer member 38 made of resin and the like fulfilling the space between the respective collimator members and configuring the continuous side walls of the radiation passage 31, for example. Three units of detectors 21 can be looked through in the circumferential direction toward the detector side from the respective apertures 33. The projection line from the line source obtained for each detector 21 will include diagonal lines as illustrated in FIG. 32.

In order to decrease penetration percentage of γ rays for the incident lines to not more than 1%, the shield thickness (passing distance) of lead of approximately around 2 mm for $^{99m}$Tc of 140 keV as total thickness for the whole collimators for diagonal incident γ rays, approximately 15 mm for $^{67}$Ga emitting γ rays of 300 keV, approximately 25 mm for $^{131}$I emitting γ rays of 364 keV and approximately 30 mm for $^{18}$F emitting γ rays of 511 keV will provide sufficient shielding performance. In the assumption of $^{99m}$tc, in FIG. 32, lead passing thickness of not less than 2 mm can be provided for any diagonal γ ray so as to eliminate any influence to the adjacent radiation passages 31. In the case of using nuclide with another β-ray energy, the first stage collimator member 37a, the middle stage collimator members 37b and 37c and the final stage collimator member 37z with thickness in conformity of the γ-ray energy thereof will be adoptable. Since the respective collimator members are thickened only in the longitudinal direction, production thereof can be simplified and the required space resolution and sensitivity is obtainable.

Figure 33:
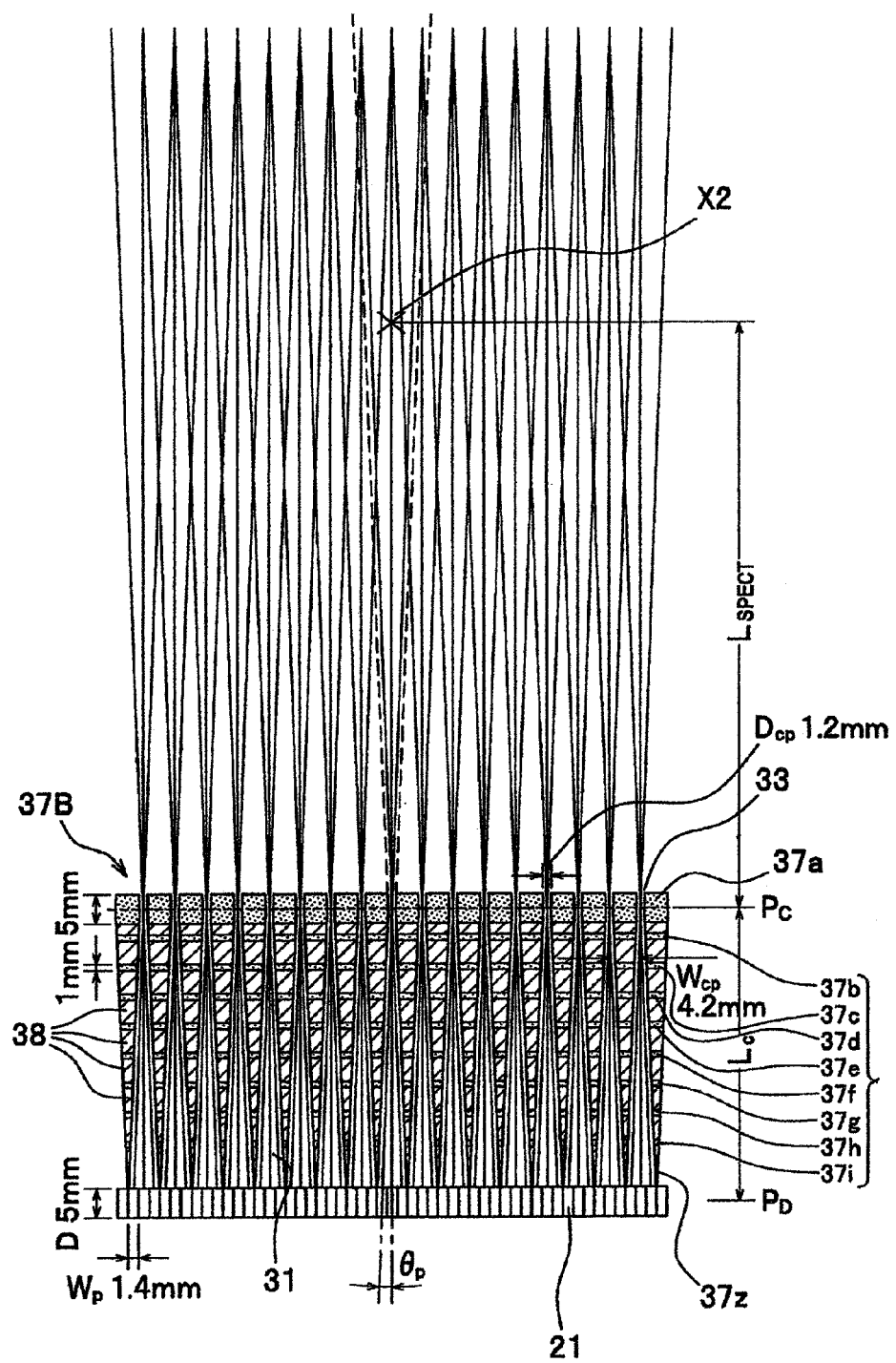
FIG. 33 is a diagram illustrating a collimator in the fifth embodiment.

As illustrated in FIG. 33, the middle stage collimator members 37b to 37i (inclusive) can be arranged in an equal interval.

In addition, a great number of thinner collimator members for radiation passage 31 with different hole diameters are prepared and can be stacked to form a lot of layers. In that case, without tapering the hole itself for radiation passages 31, the collimator of the required aperture angle can be made.

Figure 34:
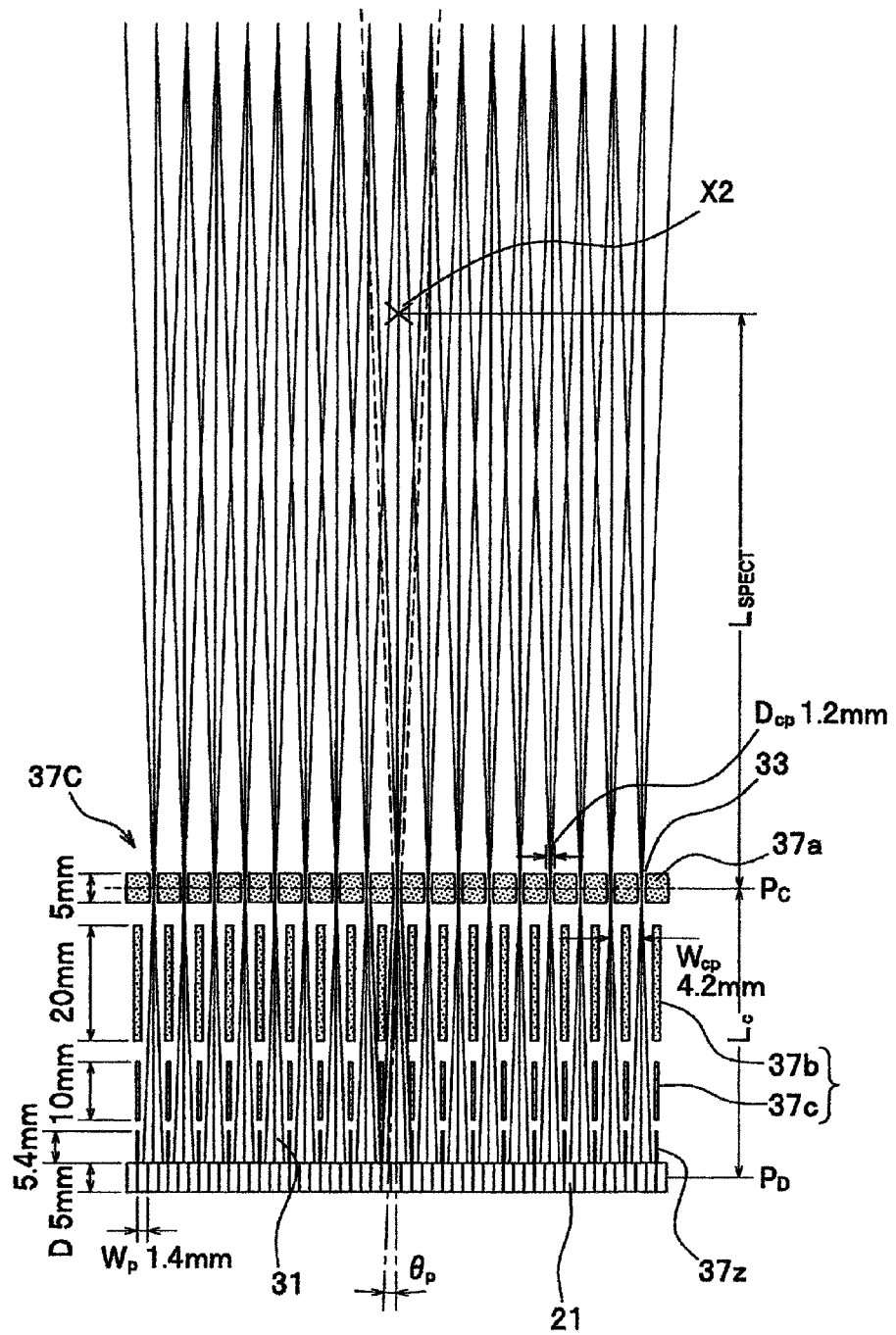
FIG. 34 is a diagram illustrating a collimator in the fifth embodiment.

In addition, the middle stage collimator members 37b and 37c after the first stage collimator member 37a and the final stage collimator member 37z as illustrated in FIG. 34 can be shaped the same as the short parallel hole collimator and can be stacked. FIG. 34 is illustrated by omitting the spacer member 38 between the collimator members. In addition, in configuration, the collimator members 37a to 37z (inclusive) can be stacked without sandwiching the spacer member 38.

In the collimators 37A, 37B and 37C in the exemplifying FIG. 32 to FIG. 34 (inclusive), the shape of each collimator member will not be limited thereto. If only penetration to the adjacent radiation passages 31 can be restrained, the likewise operation and advantages of the collimators 30A to 30E (inclusive) is obtainable.

Since, in structure, a radiation passage 31 of a parallel hole collimator is not formed on each detector 21 unlike a conventional case, collimators can be manufactured with a decreased number of the radiation passage 31 and combination of lead plates provided with holes by mechanical processing so that an effective collimator activating the feature of a semiconductor radiation detector 21 of a pixel type can be realized. Unless the γ ray energy is not so high, all the side walls of the radiation passage does not have to be configured by shield metal member. If the shield performance is sufficient, stainless steel and the like can be used. In addition, processing will become simple by dividing a collimator into a plurality of sheets. Thereby, use of the spacer member 38 can reduce the weight of the collimator. Connection among a spacer member 38, the first stage collimator member 37a, the middle stage collimator members 37b, 37c . . . and the final stage collimator member 37z and the like will become simple. In addition, the soft shield metal material with hardly retainable accuracy such as lead is sandwiched by comparatively hard resin so as to be capable of retaining strength and shape thereof.

In particular, in the collimator 37C, the middle stage collimator members 37a, 37b and the final stage collimator member 37z have a large hole forming a radiation passage 31 and are in the term of a short parallel hole, and can be manufactured easily. In addition, the first stage collimator member 37a is not so thick but the septum is thick and therefore sufficiently manufacturable.

Figure 35:
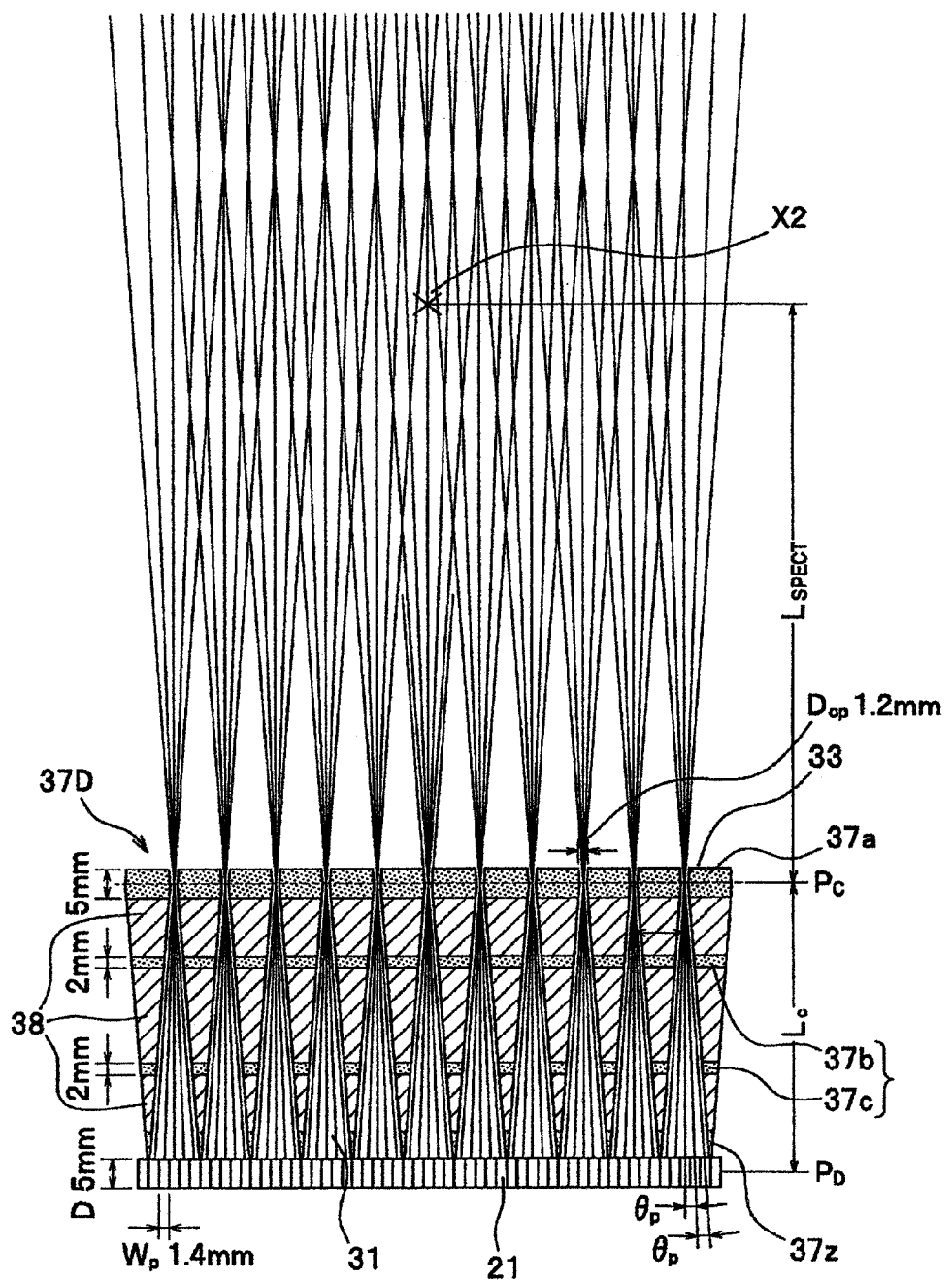
FIG. 35 is a diagram illustrating a collimator in the fifth embodiment.

Moreover, as illustrated in FIG. 35, the depth length D of the detector 21 can be made thin for the low γ-ray energy. Therefore, the rough standard of aperture angle φp derived by the expression (1) can be large. In addition, the number of the detector 21 arranged in the circumferential direction for one radiation passage 31 can be increased to 5 units (inclusive), for example. Four diagonal projection lines in the circumferential direction will become utilizable. In the case of applying the collimator 37D hereof to a gamma camera apparatus of the first embodiment, in order to generate a plane projection image in one angle position for the rotation center axis X2, projection of the "vertical component" in one direction is obtained with five units of angle positions in the circumferential direction of the rotation center axis X1. In addition, applying the collimator 37D to the third embodiment, the step width $\theta_{SPECT}$ around the rotation center axis X2 at the time of SPECT radio-graphing is caused to correspond to the angle θp determined derived by the expression (3) and the rotation steps for all the circumference around the rotation center axis are collected. Then projection in all the directions is obtainable. Therefore, radio-graphing period is not different from the case of using the parallel hole collimator. The number of the aperture 33 in the circumferential direction of the collimator decreases. Therefore, manufacturing will be simplified so that production costs for a collimator can be reduced.

Collimator of Respective Embodiment and Resolution Attainable by Semiconductor Radiation Detector Next, resolution attainable by combination of the collimator and the semiconductor radiation detectors 21 of the pixel type applied to the above described respective first to fifth embodiments (inclusive) will be described.

The SPECT apparatus of a conventional NaI scintillator determines radiation detection positions with calculation of center gravity from output signals of a plurality of photomultiplier tubes for γ-ray position measurement. That is, the measurement apparatus provides analog position outputs. Thickness of the scintillator is around 9 mm to 15 mm. Due to scintillation light distraction subjected to reaction with the incident γ rays and statistical dispersion attainable by calculation of center gravity with photomultiplier tubes, space resolution of (intrinsic resolution) of the detector itself is limited to approximately 3 mm.

The nuclear medicine diagnosis instrument includes digital position outputs such as a discrete detector 21 unit corresponding with image pixel having been developed in the recent years, a gamma camera with a so-called CsI Tl) scintillator of a pixel type and a photodiode ("Technology of Nuclear Medicine", Japanese Society of Radiological Technology, Apr. 30, 2002, Ohm, Ltd.) and a semiconductor radiation detector (non-patent document 1) of a pixel type capable of converting γ rays into electrical signals directly. The nuclear medicine diagnosis instrument including detectors 21 with 1.4-mm width has been developed. The level of 1 mm as the value equivalent to the intrinsic resolution is attainable.

Such reduction of the detector width of the SPECT apparatus with the detector 21 of the pixel type and the gamma camera apparatus makes the intrinsic resolution of the scintillator to the 3-mm limit level. The system resolution Rs of those apparatuses is derived by the above described expression (13).

Geometrical resolution of the collimator becomes larger as distance to a radio-graphing object increases. Even for parallel porous (parallel) LEHR (low energy high resolution) collimator, the space resolution FWHM is as big as around 7 mm for the 10-cm distance and the system resolution is 7 to 8 mm (inclusive). Since the geometrical resolution of the collimator is far larger than the intrinsic resolution of the detector, it is comprehensible that the system resolution is almost determined by geometrical resolution of the collimator. Therefore, it was not possible to take advantage of the advantages of the intrinsic resolution being the feature of the element of the pixel.

A method of taking advantage of the advantages of the intrinsic resolution is close radio-graphing with a pixel matched parallel collimator or a fan beam collimator or a method of using septum-less pinhole collimator.

However, the pinhole collimator will give rise to out-of-focus image in the periphery of vision as described above. Moreover, image expansion and improvement in sensitivity can be expected with the fan beam and the pinhole, but there is a disadvantage that vision (FOV) gets narrow. In order to keep the resolution up to the peripheral vision and radio-graphing the subject 2, a pixel matched parallel hole collimator corresponding to the detector 21 in both of size and position is desirable. Although sensitivity drops, in order to reduce the influence of geometrical resolution of the collimator, a long collimator improving space resolution in the deep portion is required. In the assumption that the width of the detector 21 is 1.4 mm, the collimator needs to be as long as approximately 5 cm in order to attain 4-mm system resolution with distance from the collimator being 10 cm. The collimator length as long as 10 cm is required to attain 3-mm system resolution.

It is extremely difficult to manufacture a long pixel matched parallel collimator including such aperture 33 with small hole diameter and thin septum, in particular, rectangular collimator in section geometry of the radiation passage 31 in the manufacturing method by current casting, giving rise to one of major problems.

However, applying the collimators 37A to 37C (inclusive) in configuration described in the above described fifth embodiment, realization of a high resolution collimator can be simplified.

Moreover, even for low-energy radio-graphing, deterioration in sensitivity in the parallel hole collimator due to loss dead space) of incident area due to septum shadow is one of problems. The septum thickness of the current collimator is limited to 0.2 mm. Therefore, the detector 21 with 1.4-mm width gives rise to dead space equivalent to 26% of the incident area. The present invention can solve such a problem and can take advantage of the excellent intrinsic resolution of the detector of the pixel type.

The present invention can provide a radiation imaging system and a nuclear medicine diagnosis instrument such as a gamma camera apparatus and a SPECT apparatus capable of carrying out performance as excellent as the low-energy γ-ray radio-graphing, in particular, in middle and high energy γ-ray radio-graphing as described above; requiring no replacement of collimator corresponding with energy range for use in the vision nearly similar to the system with the parallel hole collimator; and being highly sensitive and practical and influenced by no septum.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radiation imaging system comprising a camera part capable of rotating around a first rotation center axis as a center, the camera part including a collimator in which a plurality of radiation passages are formed on its incident plane side; and a plurality of radiation detectors of detecting radiations passing in the radiation passage for the respective radiation passages, wherein:

the radiation passage of the collimator has an aperture section so that a section toward the radiation detector side is shaped to get broadened;

the radiation detectors with a predetermined size are arranged in plurality in the rotation direction toward the respective radiation passages; and the camera part which is configured to radio-graph in a plurality of angle positions for the first rotation center axis set corresponding with the size of the radiation detector in the rotation direction upon radio-graphing a projection image from one direction, wherein the radiation passage of the collimator comprises:

a fan-like opening angle $\phi p$ on the circumferential direction side of the radiation passage that is not more than $\phi p = 2 \times \tan^{-1}(Wp/D)$ with width Wp being the width of the detector in the circumferential direction of the radiation detector and the depth length D being a length of the detector in a direction perpendicular to the circumferential direction of the radiation detector.

2. The radiation imaging system according to claim 1, wherein:

among side walls forming a radiation passage of the collimator, a wall plane side with a section at least toward the radiation passage side is shaped to get broadened is configured by arranging multisteps of a collimator member made of a plurality of sheets of shield metal shielding radiation or configured by stacking a great number of layers of collimator member made of a plurality of sheets of shield metal shielding radiation.

3. The radiation imaging system according to claim 1, wherein:

a radiation passage of the collimator has an aperture section on an incident plane side of the radiation being narrowed down so that a section toward the radiation detector side is parallel to an axis direction of the first rotation center axis and shaped to get broadened in a fan-like form in a circumferential direction of the first rotation center axis; and one row in the axis direction and a predetermined plurality of rows in the circumferential direction of the radiation detectors arranged in a planar state in each of the radiation passage.

4. The radiation imaging system according to claim 1, wherein:

the first rotation center axis is positioned apart from the aperture plane only by distance L being integer m times larger than distance Lc between an array plane of the radiation detector of the camera part and an aperture plane being a plane where a plurality of apertures of the collimator are positioned; and step width $\theta p$ in a plurality of angle positions for the first rotation center axis is a value derived by $\theta p = \tan^{-1}(Wp/Lc)$ with width Wp in the circumferential direction of the radiation detector.

5. The radiation imaging system according to claim 1, wherein:

the camera part is capable of rotating around a second rotation center axis in the vicinity of a body axis of an examined body put on a bed in a circumferential direction of an incident plane thereof along the body axis; and by fixing an angle position of the second rotation center axis in a circumferential direction to carry out radio-graphing of a projection position from the one direction.

6. A nuclear medicine diagnosis instrument comprising:

the radiation imaging system according to claim 5 including the camera part; and a data processing apparatus of processing and imaging a radiation detection signal from the radiation imaging system, wherein:

the data processing apparatus configures a projection image of radiation entering an incident plane of the camera part in a diameter direction in one angle position around the second rotation center axis with a plurality of data sets undergoing radio-graphing in a plurality of angle positions for the first rotation center axis and to, thereby, generate a tomographic image.

7. A nuclear medicine diagnosis instrument comprising:

the radiation imaging system according to claim 1 including the camera part; and a data processing apparatus of processing and imaging a radiation detection signal from the radiation imaging system, wherein:

the data processing apparatus uses a plurality of data sets undergoing radio-graphing in a plurality of angle positions for the first rotation center axis in the process of imaging a projection image from one direction.

8. The radiation imaging system according to claim 1, wherein:

the camera part can rotate around a third rotation center axis as a center perpendicular to the first rotation center axis;

a radiation passage of the collimator has an aperture section on an incident plane side of the radiation being narrowed down so that a section toward the radiation detector side is shaped to get broadened in a fan-like form in a circumferential direction of the first rotation center axis and in a circumferential direction of the third rotation center axis;

the radiation detectors with a predetermined size are arranged in plurality in the rotation direction of the first rotation center axis and the third rotation center axis toward the respective radiation passages; and at an occasion of radio-graphing a projection image from one direction, the camera part carries out radio-graphing in a plurality of angle positions for the first rotation center axis set corresponding with the size of the radiation detector in the rotation direction around the first rotation center axis as a center and carries out radio-graphing in a plurality of angle positions for the third rotation center axis set corresponding with the size of the radiation detector in the rotation direction around the third rotation center axis as a center.

9. The radiation imaging system according to claim 8, wherein:

a wall plane side with a section toward the radiation passage of the collimator is shaped to get broadened is configured by arranging multisteps of a collimator member made of a plurality of sheets of shield metal shielding radiation or configured by stacking a great number of layers of collimator member made of a plurality of sheets of shield metal shielding radiation.

10. The radiation imaging system according to claim 8, wherein:

the first and the third rotation center axes are respectively positioned apart from the aperture plane respectively only by distance L being integer m times larger and distance $L_1$ being integer n times larger than distance Lc between an array plane of the radiation detector of the camera part and an aperture plane being a plane where a plurality of apertures of the collimator are positioned;

step width $\theta p$ in a plurality of angle positions for the first rotation center axis is derived by $\theta p = \tan^{-1}(Wp/Lc)$ with width Wp in the circumferential direction of the first rotation center axis of the radiation detector; and step width θa in a plurality of angle positions for the third rotation center axis is derived by θa=tan$^{-1}$(Wa/Lc) with width Wa in the circumferential direction of the third rotation center axis of the radiation detector.

11. A nuclear medicine diagnosis instrument comprising:
the radiation imaging system according to claim 10 including the camera part; and
a data processing apparatus of processing and imaging a radiation detection signal from the radiation imaging system, wherein:
the data processing apparatus uses a plurality of data sets undergoing radio-graphing in a plurality of angle positions for the first rotation center axis in the process of imaging a projection image from one direction and a plurality of data sets undergoing radio-graphing in a plurality of angle positions for the third rotation center axis.

12. A nuclear medicine diagnosis instrument comprising:
the radiation imaging system according to claim 10 including the camera part; and
a data processing apparatus of processing and imaging a radiation detection signal from the radiation imaging system, wherein:
the data processing apparatus uses a plurality of data sets undergoing radio-graphing in a plurality of angle positions for the first rotation center axis and a plurality of data sets undergoing radio-graphing in a plurality of angle positions for the third rotation center axis to configure a projection image entering an incident plane of the camera part in a diameter direction in one angle position around the second rotation center axis and to, thereby, generate a tomographic image.

13. The radiation imaging system according to claim 8, wherein:
a fan-like opening angle φp on the circumferential direction side of the first rotation center axis of the radiation passage is not more than φp=2×tan$^{-1}$(Wp/D) with width Wp and depth length D in the circumferential direction of the first rotation center axis of the radiation detector; and
a fan-like opening angle φa on the circumferential direction side of the third rotation center axis of the radiation passage is not more than φa=2×tan$^{-1}$(Wa/D) with width Wa and depth length D in the circumferential direction of the third rotation center axis of the radiation detector.

14. The radiation imaging system according to claim 8, wherein:
an aperture of the collimator is arrayed to shape a rectangular grid in the first rotation center axis direction and also in the third rotation center axis direction.

15. The radiation imaging system according to claim 8, wherein:
the camera part is
capable of rotating around a second rotation center axis in the vicinity of a body axis of an examined body put on a bed in a circumferential direction of an incident plane thereof along the body axis; and
by fixing an angle position of the second rotation center axis in a circumferential direction to carry out radio-graphing of a projection position from the one direction.

16. A radiation imaging system comprising a camera part capable of rotating around a body axis of an examined body put on a bed, the camera part including a collimator in which a plurality of radiation passages are formed on its incident plane side; and a plurality of radiation detectors of detecting radiations passing in the radiation passage for the respective radiation passages;
a second rotation center axis being a center axis for rotation around the body axis being set along a body axis in the vicinity of the body axis; and
at an occasion of radio-graphing a tomographic image of an subject, the camera part carrying out radio-graphing in a plurality of angle positions with a predetermined step width θp around the second rotation center axis as a center, wherein:
the radiation passage of the collimator has an aperture section on the incident plane side of the radiation being narrowed down so that a section toward the radiation detector side is shaped to get broadened;
the radiation detectors with a predetermined size are arranged in plurality in the rotation direction around the second rotation center axis toward the respective radiation passages;
a fan-like opening angle φp on the circumferential direction side of the second rotation center axis of the radiation passage is not more than φp=2×tan$^{-1}$(Wp/D) with width Wp and depth length D in the circumferential direction of the radiation detector;
the second rotation center axis is positioned apart from the aperture plane only by distance L a natural number m' times larger than distance Lc between an array plane of the radiation detector of the camera part and an aperture plane being a plane where a plurality of apertures of the collimator are positioned; and
the step width θp is a value derived by θp=tan$^{-1}$(Wp/Lc) with width Wp in the circumferential direction of the radiation detector.

17. The radiation imaging system according to claim 16, wherein:
among side walls forming a radiation passage of the collimator, a wall plane side with a section at least toward the radiation passage side is shaped to get broadened is configured by arranging multisteps of a collimator member made of a plurality of sheets of shield metal shielding radiation or configured by stacking a great number of layers of collimator member made of a plurality of sheets of shield metal shielding radiation.

18. The radiation imaging system according to claim 16, wherein:
a radiation passage of the collimator has an aperture section on an incident plane side of the radiation being narrowed down so that a section toward the radiation detector side is parallel to an axis direction of the second rotation center axis and shaped to get broadened in a fan-like form in a circumferential direction of the second rotation center axis; and
one row in the axis direction and a predetermined plurality of rows in the circumferential direction of the radiation detectors arranged in a planar state in each of the radiation passage.

19. A nuclear medicine diagnosis instrument comprising:
the radiation imaging system according to claim 18 including the camera part; and
a data processing apparatus of processing and imaging a radiation detection signal from the radiation imaging system, wherein:
the data processing apparatus to configures a projection image of radiation entering an incident plane of the camera part in a diameter direction in one angle position around the second rotation center axis with a plurality of data sets undergoing radio-graphing in a plurality of angle positions for the first rotation center axis and a plurality of data sets undergoing radio-graphing in a plurality of angle positions for the third rotation center axis and, thereby, generates a tomographic image.

20. A nuclear medicine diagnosis instrument comprising:
the radiation imaging system according to claim 16 including the camera part; and
a data processing apparatus of processing and imaging a radiation detection signal from the radiation imaging system, wherein:
the data processing apparatus uses a plurality of data sets undergoing radio-graphing in a plurality of angle positions for the second rotation center axis to configure a projection image entering an incident plane of the camera part in a diameter direction in one angle position around the second rotation center axis and to, thereby, generate a tomographic image.

21. The radiation imaging system according to claim 16, wherein:
the camera part can rotate around a third rotation center axis as a center obliquely crossing an axis perpendicular to the incident plane passing a center of an incident plane of the camera part and a perpendicular to the second rotation center axis;
a radiation passage of the collimator has an aperture section on an incident plane side of the radiation being narrowed down so that a section toward the radiation detector side is shaped to get broadened in a fan-like form in a circumferential direction of the second rotation center axis and in a circumferential direction of the third rotation center axis;
the radiation detectors with a predetermined size are arranged in plurality in the rotation direction of the second rotation center axis and the third rotation center axis toward the respective radiation passages;
a fan-like opening angle $\phi a$ on the circumferential direction side of the third rotation center axis of the radiation passage is not more than $\phi a = 2 \times \tan^{-1}(Wa/D)$ with width Wa and depth length D in the circumferential direction of the radiation detector;
the third rotation center axis is positioned apart from the aperture plane only by distance $L_1$ integer n times larger than distance Lc between an array plane of the radiation detector of the camera part and an aperture plane being a plane where a plurality of apertures of the collimator are positioned; and
the camera part is gyrated in step width $\theta a$ derived by $\theta a = \tan^{-1}(Wa/Lc)$ with width Wa in the circumferential direction of the radiation detector in a plurality of angle positions for the third rotation center axis with an incident plane thereof directed to the subject side and in an angle position of the step width $\theta p$ in the circumferential direction of the second rotation center axis and carries out radio-graphing.

* * * * *